United States Patent
Gogoi

(10) Patent No.: US 9,401,944 B2
(45) Date of Patent: Jul. 26, 2016

(54) LAYERED ADAPTIVE HTTP STREAMING

(71) Applicant: QUALCOMM Incorporated, San Diego, CA (US)

(72) Inventor: Tony Gogoi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 344 days.

(21) Appl. No.: 14/102,573

(22) Filed: Dec. 11, 2013

(65) Prior Publication Data

US 2015/0113159 A1 Apr. 23, 2015

Related U.S. Application Data

(60) Provisional application No. 61/894,259, filed on Oct. 22, 2013.

(51) Int. Cl.

| | |
|---|---|
| G06F 15/16 | (2006.01) |
| H04L 29/06 | (2006.01) |
| H04L 29/08 | (2006.01) |
| H04N 21/2343 | (2011.01) |
| H04N 21/238 | (2011.01) |
| H04N 21/24 | (2011.01) |
| H04N 21/845 | (2011.01) |

(52) U.S. Cl.
CPC ............ *H04L 65/608* (2013.01); *H04L 65/80* (2013.01); *H04L 67/02* (2013.01); *H04N 21/23805* (2013.01); *H04N 21/234327* (2013.01); *H04N 21/2402* (2013.01); *H04N 21/845* (2013.01)

(58) Field of Classification Search
CPC ........... H04N 21/234327; H04L 65/60; H04L 65/608
USPC ................................................. 709/219, 231
See application file for complete search history.

(56) References Cited

U.S. PATENT DOCUMENTS

| | | | |
|---|---|---|---|
| 8,301,794 B2 | 10/2012 | Salomons | |
| 8,386,621 B2 | 2/2013 | Park et al. | |
| 2011/0096828 A1 | 4/2011 | Chen et al. | |
| 2011/0126236 A1* | 5/2011 | Arrasvuori | H04N 21/4532 725/46 |
| 2012/0023155 A1* | 1/2012 | Myers | H04N 21/234327 709/203 |
| 2012/0084454 A1* | 4/2012 | Lindquist | H04N 7/17318 709/231 |
| 2012/0117261 A1 | 5/2012 | Bouazizi | |
| 2012/0259946 A1 | 10/2012 | Stockhammer et al. | |
| 2013/0166768 A1 | 6/2013 | Gouache et al. | |
| 2014/0215017 A1* | 7/2014 | Yeh | H04L 65/4084 709/219 |

* cited by examiner

*Primary Examiner* — Frantz Jean
(74) *Attorney, Agent, or Firm* — The Marbury Law Group, PLLC

(57) ABSTRACT

Systems, methods, and devices of the various embodiments enable HTTP streaming that downloads different layers of the same media interval at different points of time before the play out time of that media interval. The various embodiments provide a download sequence that enables downloads of portions of a media interval to continue at different points in time until the play out position of the media presentation reaches a certain point with respect to the media interval. In an embodiment, the download sequence may rapidly adapt to changing network bandwidth conditions and may help ensure no stall occurs in media play out under minimum conditions. In an embodiment, the download sequence may provide an increased smoothing effect to reduce the rate of adaptation to changes in bandwidth, which may reduce the fluctuations in quality in the presence of repeated abrupt network changes.

18 Claims, 42 Drawing Sheets

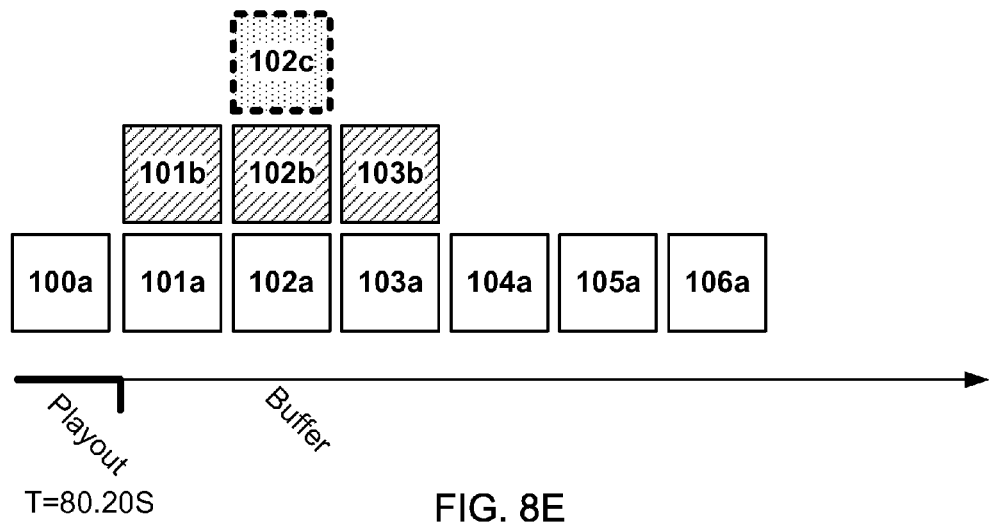
T=80.20S  FIG. 8E
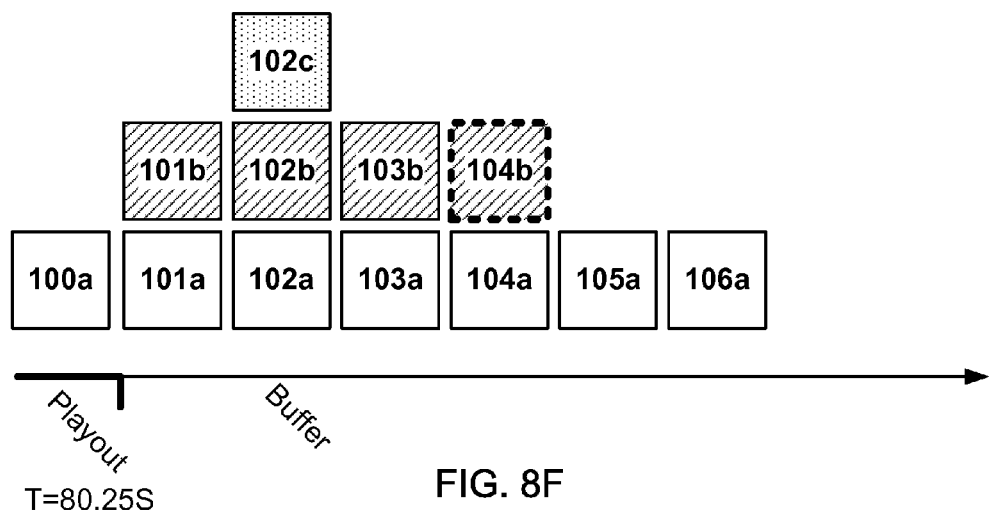
T=80.25S  FIG. 8F
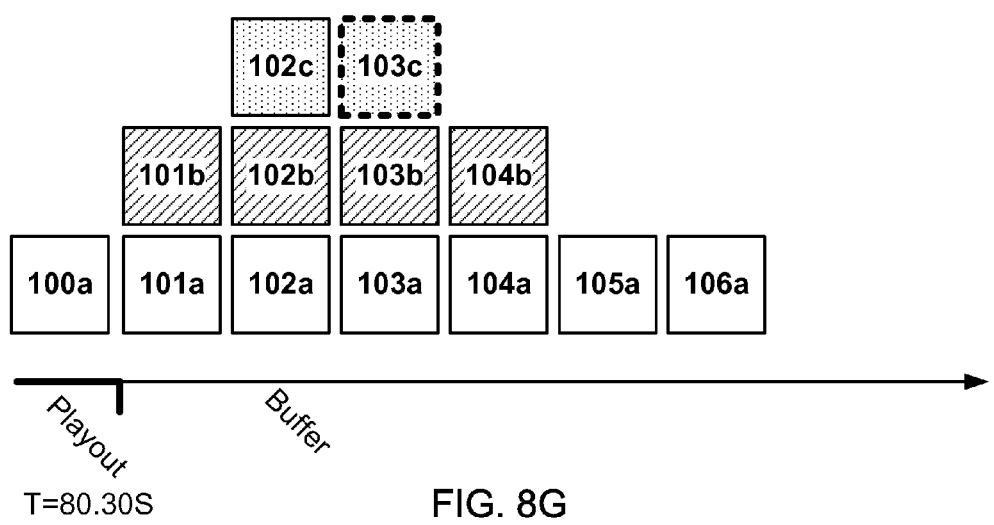
T=80.30S  FIG. 8G

SMOOTHENER ON

SMOOTHENER OFF

SMOOTHENER ON

SMOOTHENER OFF

LAYERED ADAPTIVE HTTP STREAMING

RELATED APPLICATIONS

This application claims the benefit of priority to U.S. Provisional Patent Application No. 61/894,259 entitled "Layered Adaptive HTTP Streaming" filed Oct. 22, 2013, the entire contents of which are hereby incorporated by reference.

BACKGROUND

Dynamic Adaptive Streaming over HTTP ("DASH") is a streaming standard supporting adaptive streaming using the HTTP protocol. In one variant of DASH, media intervals may be composed of one or more layered chunks, and each additional layered chunk added to a base layer chunk may increase the quality of the media presentation for that media interval. Each media presentation may be encoded using a scalable encoder such that each media interval includes a base layer chunk and one or more enhanced layer chunks. Typically, a DASH media presentation comprises multiple media components (referred to as "adaptation-sets" in the DASH specification), such as audio, video, and/or text components. The component that may contribute the most to a bandwidth requirement for a DASH media presentation is typically the video component. In part due to its bandwidth requirements, the video component may be scalably encoded to allow for layered adaptive streaming.

In layered HTTP streaming, all the chunks (i.e., layers) corresponding to a given media interval need not be downloaded at once. The ability to download different chunks at different times may present problems based on the algorithm used to control chunk downloading. An adaptive streaming algorithm would strive to strike a fine balance between adapting rapidly to bandwidth changes while also avoiding a stall. It is also desirable to smoothen or dampen quality of presentation with respect to bandwidth fluctuations. An algorithm that adapts to bandwidth changes too rapidly would cause a degradation of the quality of presentation due to rapid changes in the quality of presentation in the presence of repeated bandwidth changes including abrupt changes. Additionally, an algorithm that relies exclusively on accurate bandwidth estimates to make download decisions may not be able to guarantee that no stall will occur as bandwidth estimates made at the client typically lag the actual available network bandwidth. For example, such an algorithm may perceive available bandwidth to be higher than it actually is for period of time causing the playout position to reach the download position resulting in a stall. Other more cautious algorithms may present less than optimal play out quality by defaulting to only downloading base layer chunks and/or enhanced layer chunks with a bandwidth requirement much lower than the available bandwidth.

SUMMARY

The systems, methods, and devices of the various embodiments enable HTTP streaming that downloads different layers of the same media interval at different points of time before the play out time of that media interval. The various embodiments provide a download sequence that enables downloads of portions of a media interval to continue at different points in time until the play out position of the media presentation reaches a certain point with respect to the media interval. In an embodiment, the download sequence may rapidly adapt to changing network bandwidth conditions and may help ensure no stall occurs in media play out under minimum conditions while also smoothening or dampening out bandwidth fluctuations. In an embodiment, the download sequence may provide an increased smoothing effect to reduce the rate of adaptation to changes in bandwidth, which may reduce the fluctuations in quality in the presence of repeated abrupt network changes.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

FIGS. 8A-8K illustrate downloaded layers of media intervals of a media presentation over time according to an embodiment in a scenario a low steady state bandwidth is followed by an abrupt increase in bandwidth. The minimum network condition is used in the download constraint.

DETAILED DESCRIPTION

Figure 1:
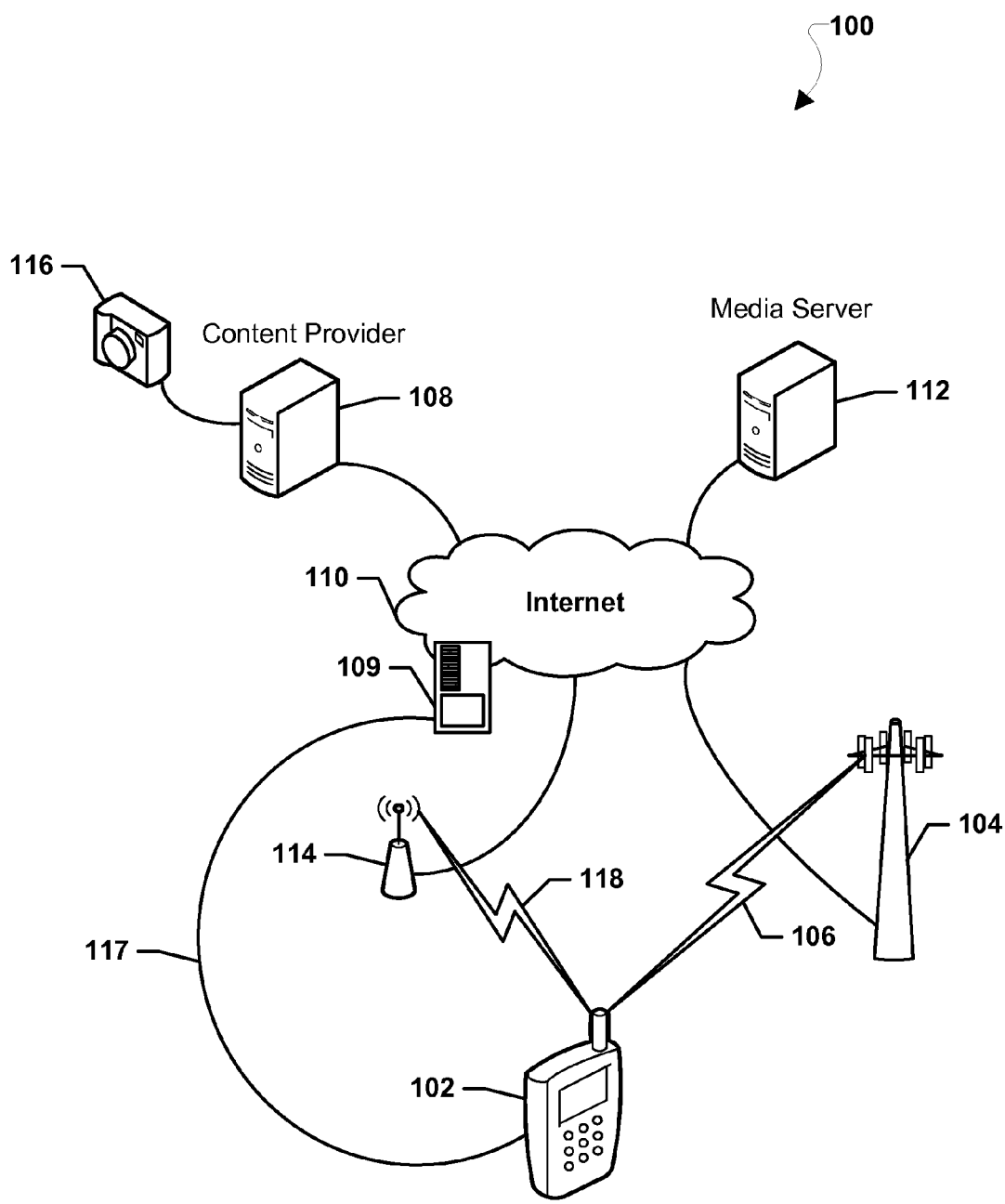
FIG. 1 is a communication system block diagram of a communication network suitable for use with the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

As used herein, the terms "mobile device" and "receiver device" are used interchangeably herein to refer to any one or all of cellular telephones, smart phones, personal or mobile multi-media players, personal data assistants (PDA's), laptop computers, tablet computers, smart books, palm-top computers, wireless electronic mail receivers, multimedia Internet enabled cellular telephones, wireless gaming controllers, personal computers, television set top boxes, televisions, cable television receivers, and similar personal electronic devices which include a programmable processor and memory and circuitry for presenting media content.

The various embodiments are described herein using the term "server." The term "server" is used to refer to any computing device capable of functioning as a server, such as a master exchange server, web server, mail server, document server, content server, or any other type of server. A server may be a dedicated computing device or a computing device including a server module (e.g., running an application which may cause the computing device to operate as a server). A server module (e.g., server application) may be a full function server module, or a light or secondary server module (e.g., light or secondary server application) that is configured to provide synchronization services among the dynamic databases on mobile devices. A light server or secondary server may be a slimmed-down version of server type functionality that can be implemented on a mobile device thereby enabling it to function as an Internet server (e.g., an enterprise e-mail server) only to the extent necessary to provide the functionality described herein.

The systems, methods, and devices of the various embodiments enable HTTP streaming that downloads different layers of the same media interval at different points of time before the play out time of that media interval. The various embodiments provide a download sequence that strikes a fine balance between adapting to bandwidth changes while at the same time smoothing or dampening out rapid or large changes in quality of presentation. The embodiments enable downloads of portions of a media interval to continue at different points in time until the play out position of the media presentation reaches a certain point with respect to the media interval. In an embodiment, the download sequence may rapidly adapt to changing network bandwidth conditions and may help ensure no stall occurs in media play out under minimum network conditions while also smoothing or dampening out fluctuations in the quality of presentation due to abrupt bandwidth changes. As an example, a minimum network condition may be equal to the bandwidth requirement of a base layer of a media presentation that includes both base layers and enhanced layers. The ability to rapidly adapt to changing network bandwidth conditions and ensure no stall occurs in media play out under minimum network conditions may enable the client to ensure no stall occurs and network usage efficiency occurs (e.g., complete chunks are downloaded without needing to abort a chunk download due to bandwidth fluctuations) without accurate bandwidth estimates so long as the minimum network conditions are met. In an embodiment, the download sequence may provide an increased smoothing effect to reduce the rate of adaptation to changes in bandwidth, which may to reduce the fluctuations in quality in the presence of repeated abrupt network changes. In an embodiment, when adapting to increased network bandwidth, the quality of presentation may be increase closer to the position at which downloaded data is currently being consumed or rendered.

The various embodiments may enable downloading a layered media presentation at a client (e.g., a DASH client) by determining whether downloading a next layer of a media interval of the media presentation meets certain criteria based on an estimated bandwidth available for downloading the next layer, previously download layers in the media interval, and the media interval's adjacent media intervals.

By ensuring a layer of the media interval meets the criteria before downloading the layer, the various embodiments may enable adaptive HTTP streaming that adapts to increased network bandwidth availability by downloading more data per media interval resulting in increased media presentation quality when the network bandwidth is high, adapts to decreased network bandwidth by decreasing the quality of the media presentation without causing a stall when a minimum network condition is met, and does not fluctuate rapidly when bandwidth changes rapidly. The various embodiments may also reduce wasted network resources because downloaded data does not need to be received to be thrown away.

To determine whether to download a next layer of a media interval, in the various embodiment a check may be performed to determine whether the media interval meets a base layer constraint. The base layer constraint may be a requirement that at least one layer of the media interval of the media presentation is already downloaded. In this manner, enhanced layers may not be downloaded for a media interval for which the base layer has not already been downloaded.

An additional constraint that may be checked in the various embodiments to determine whether to download a next layer of the media interval may be a download time constraint. The download time constraint may be a requirement that a play out time for the media interval of the media presentation is not earlier than the current play out time plus an estimated time of completion of downloading the next layer of the media interval of the media presentation. For example, the download time constraint may be a requirement that the play out time of the media interval be greater than or equal to the current play out time plus a constant (R) plus the result of multiplying the estimated time to download the layer by a factor (K), where K is greater than or equal to 1 and R is greater than or equal to 0. Play out time for the media interval may be the time at which downloaded data for the media interval begins to be consumed for processing and rendering, which may be a time before the actual time at which the media interval is rendered on a device. The estimated time of completion of downloading the next layer may be estimated based on the current bandwidth available for downloading the next layer and a calculated value to allow for variance in bandwidth estimations. The estimated time of completion of downloading the next layer may also be estimated based on a minimum network bandwidth, for example the bandwidth required for downloading only the base layer. This approach may make the selection of layers (i.e., chunks) more conservative (i.e., less aggressive), and may not rely on bandwidth estimations to guarantee no stall when the minimum network condition is met. The minimum network bandwidth required for downloading only the base layer may be referred to as a minimum network condition because when the available bandwidth remains below the bandwidth required for downloading the base layer a stall may be inevitable. The play out time of the media interval may be the time the media interval is due to play out with respect to the start of the first interval. In an embodiment, when the next layer of the media interval cannot be downloaded before the media interval is due to play out based on a minimum network condition, the next layer may not be requested. In this manner, resources may not be wasted downloading layers that cannot be completely downloaded before play out assuming a minimum network condition is met.

As an example, let us assume request-reply pipelining is not supported so that the request for a chunk can be sent by the client when there are no outstanding bytes to receive for a previous response and rtt is zero.

S=Start of presentation-time of candidate interval.
Q=Bandwidth requirement of layer to download in candidate interval.
d=interval duration.
P=Current playout time (the position at which downloaded data is consumed for further processing).
E=Estimated download time of candidate interval.

Then, the download constraint is satisfied when S>P+E, where:

$$C=(1.0-\lambda)*min\_bandwidth+\lambda*estimated\_bandwidth;$$

$0.0<=\lambda<=1.0$ where $\lambda$ is the confidence on the estimated b/w. $\lambda$ is an example way of quantifying confidence of the estimated bandwidth versus the minimum bandwidth condition.

E is based on the number of bytes to download (or its approximate) and C; and Q. E=d*Q/C.

The download constraint is satisfied when S>=P+E.

When $\lambda=0.0$ is always zero, then no stall may occur and network efficiency is maximized as a situation where partially downloaded chunks do not occur as long as the minimum network condition is met, and slower adaptation to bandwidth fluctuations may be achieved.

When $0.0<\lambda<=1.0$, then no stall may occur, data corresponding to a partially downloaded enhanced layer may need to be stopped (or paused) in the event of a sudden bandwidth decrease. At regular intervals (preferably short), if the currently downloading layer is an enhanced layer and the download constraint fails while monitoring the download of the enhanced layer, then the download may be stopped (or paused) and the algorithm triggered again. Triggering the algorithm would then result in either a base layer for a new interval being downloaded, or an enhanced layer at a position further into the future with respect to the current playout position. In this embodiment (where $\lambda>0.0$ and more likely when $\lambda$ is closer to 1.0), the bytes that were downloaded partially for the enhanced layer may be wasted or unused in the event of a sudden network bandwidth decrease resulting in network inefficiency. But this may be the chosen trade-off to adapt to bandwidth increases faster while at the same time avoiding a stall. When monitoring S>=P+E, fails, the download if going on for an enhanced layer may be stopped or paused. As a result, a faster adaptation to bandwidth increases may be achieved but may result in a download being aborted under certain conditions.

In case pipelining is not supported, and a decision to download is made when the previous downloaded has completed, then E=number of bytes to download for the next layer divided by C. For the clarity of illustration of the algorithm behavior, no-pipelining support is assumed and the decision the next layer is done therefore when there is no on-going download for a previous chunk. Also, in the illustrations when $\lambda>0.0$ is used and the download constraint is checked continuously (or periodically), then E will be based on the number of bytes remaining for download for the layer being downloaded. Also, for clarity of illustration, rtt=0 so that time between the request for the chunk and the first byte of the reply to arrive at the client need not be factored into the calculations for the illustrations.

An additional constraint that may be checked in the various embodiments to determine whether to download a next layer of the media interval may be an adjacent media segment layer number constraint. An adjacent media segment layer number constraint may be a requirement that adding the next layer of the media interval of the media presentation does not result in a number of layers in the media interval of the media presentation being more than an interval greater than the number of layers in an adjacent media interval of the media presentation. The interval may be a difference of one or more layers, such as one, two, three, or more layers difference, and may be selectable by a client. In this manner, the number of passes before adding a base layer may be increased, which may be useful in a framework. The adjacent media intervals may be the media interval directly preceding the media interval to which the next layer is to be added and the media interval directly after the media interval to which the next layer is to be added. In an embodiment, when adding the next layer to the media interval would make the absolute value of the difference between either the preceding media interval or the media interval directly after exceed one, the next layer may not be added. In this manner, the maximum allowable difference between layers in media intervals may be held to one.

In an embodiment, when the base layer constraint, download time constraint, and adjacent media segment layer number constraint are all met, a check may be performed to determine whether an upswitch constraint is met before requesting the next layer of the media segment. The upswitch constraint may be a requirement that, when adding the next layer of the media interval of the media presentation results in the number of layers in the media interval of the media presentation being higher than a number of layers in the preceding media interval of the media presentation, the total bandwidth of the media interval of the media presentation does not exceed the estimated bandwidth. In an embodiment, when adding the next layer results in the media interval having the same or less layers than its preceding media interval the upswitch constraint may be inapplicable, or deemed to have been met, because even with adding the next layer the media interval will have the same or less quality than its preceding media interval. The upswitch constraint may ensure that fluctuations in quality of presentation due to downloading a layer of a media interval that would represent an unsustainable increase in the quality of the media presentation are avoided because the estimated bandwidth does not support sustained play out of media intervals with layers above the estimated bandwidth.

In an embodiment, when the upswitch constraint is met, an additional smoothing constraint may be checked prior to requesting the next layer. The smoothing constraint may be a requirement that an aggregate bandwidth over a period of time exceeds a threshold amount. In an embodiment, the client may look back at historical estimated bandwidth values over a period of time, such as a 10 second period of time, and determine whether the aggregate bandwidth over that period of time is below, at or above a threshold amount. The aggregate bandwidth over the period may be determined as an average of the estimated bandwidth over the time period. As an example, the aggregate bandwidth may be a simple average of the bandwidth measurement over the time period. As another example, the aggregate bandwidth may be a weighted average of the bandwidth measurements over the time period, such as providing greater weight to the measured/estimated bandwidth during more recent time increments within the period of time and less weight to earlier bandwidth measurements/estimates. When the aggregate bandwidth over the period of time has been below the threshold amount, this may indicate that the future bandwidth is unlikely to be sufficient to sustain play out of the next layer with higher quality during later media intervals, and the next layer may not be downloaded. The smoothing constraint may be inapplicable or deemed to have been met when adding the next layer does not result in the media interval having more layers than the preceding media interval because even with adding the next layer the media interval will have the same or less quality than its preceding media interval. In an embodiment, a smoothener (e.g., a smoothener function implementing the smoothening effect) may be turned on or off enabling smoothening to be selectively applied.

The layer that is added may correspond to the first interval past the playout position which satisfies all the constraints. In this manner, priority may be given to quality for intervals closer to the playout position and priority may be given to account for network variation in intervals further into the future with respect to the current playout position.

Bandwidth estimates may be obtained based on past network bandwidth history and may not match the actual current available bandwidth of the network. The various embodiments may account for bandwidth estimates lagging the actual available bandwidth by not relying exclusively on bandwidth estimates for adapting to available network bandwidth. Because there may be some lag before a client may detect a decreased network bandwidth when current bandwidth is estimated by monitoring the observed bandwidth in a recent time interval, in an embodiment estimated bandwidth may not be a criteria considered when network bandwidth decreases, other than be a requirement that the bandwidth meet a minimum network condition. In an embodiment, the estimated bandwidth may only be used to prevent increasing the number of layers of an interval when it may be inevitable that the number of layers will have to decrease in a later interval at the current estimated bandwidth.

The goals of rapidly adapting to network bandwidth changes and providing a smooth quality of play out may be in conflict. Thus, in an embodiment the implementation of the smoothening effect may be selectable, for example implemented or not implemented based on one or more client settings. Thus, in an embodiment a smoothener may be turned "on" or "off". When the smoothener is on the client may undergo less changes in quality of presentation than when the smoothener is off because network bandwidth estimates may be used to delay increases in quality of a presentation interval, thereby smoothing the quality of presentation.

In an embodiment, once the next layer of the media interval is determined to meet one or more of these criteria (i.e., compliance with one or more of the base layer constraint, download time constraint, adjacent media segment layer number constraint, upswitch constraint, and smoothing constraint), the client may send a request (e.g., an HTTP Get( ) request message) for the next layer of the media interval.

In an embodiment, during a period of time after sending the request for the next layer of the media interval, the client may determine whether downloading a next layer of any media interval earlier in time up to the currently playing out media interval also meets the criteria. As an example, when the server hosting the media presentation does not support pipelining, the client may wait until the requested layer has completed downloading to determine whether downloading a next layer of any media interval earlier in time up to the currently playing out media interval also meets the criteria. As another example, when the server hosting the media presentation does support pipelining, the client may wait until the requested layer is about to complete downloading to determine whether downloading a next layer of any media interval earlier in time up to the currently playing out media interval also meets the criteria.

As the examples illustrate, in the various embodiments the client may wait any period of time (or no period of time) before determining whether downloading a next layer of any media interval earlier in time up to the currently playing out media interval also meets the criteria. Waiting longer though may provide the advantage that the bandwidth estimates may be closer in time to when the next layer may be chosen for downloading. For example, in a scenario in which a pipelined connection is established for downloading video and the period of time to wait is set to zero, a client may make a download request for an enhanced layer based on a download decision made according to the various embodiments and the present bandwidth condition at that time. Although the next pipelined download request may be sent by the client immediately because the wait period is zero, the server may not process the request until all the bytes of the response associated with an earlier request are sent by the server. During the time the server is waiting to process the next pipelined download request for the enhanced layer, the bandwidth may drop to a level which might have resulted in a different download decision, such as selecting a base layer over the enhanced layer according to the various embodiments, from the download decision made when the earlier next pipelined download request was sent. As a result of the reduced bandwidth and the delay at the server, it may be possible that the play out position catches up with the media interval of the enhanced layer being downloaded, thus resulting in the enhanced layer being of no use as play out needs to continue without waiting for the enhanced layer to complete downloading.

Regardless of the time period that the client waits before determining whether downloading a next layer of any media interval earlier in time up to the currently playing out media interval also meets the criteria, in the various embodiments, when any next layers of the earlier-in-time media intervals meet all of the criteria, those next layers may be downloaded.

In an embodiment, when criteria to add an enhanced layer cannot be met for some media intervals, the base layer for the next media interval for which a base layer has not been downloaded yet may be requested. The criteria may then be applied again to the media intervals to determine if any additional layers may be downloaded.

In an embodiment, the process of determining whether criteria for downloading a next layer of a media interval of the media presentation may be applied continuously throughout the download of a media presentation.

The various embodiments may enable rapid adaptation to network bandwidth increases and/or decreases in a damper-like fashion. When network bandwidth increases, the total sum of the bandwidths of the layers downloads for a media interval may lag (e.g., be less than) the available network bandwidth. When network bandwidth decreases, the total quality of the layers downloaded in an interval may be greater than the available bandwidth for some period of time.

In an embodiment in which the minimum network condition is used for the download time constraint rather than actual bandwidth estimates to govern the download of layers, no stall and network usage efficiency may be guaranteed on a decrease of available bandwidth as long as the minimum network condition is met. This may enable no stall and network efficiency to be guaranteed without relying on actual bandwidth estimates which may not be accurate due to a delay in actual bandwidth values converging to observed bandwidth values. In an embodiment in which the minimum network condition is used for the download time constraint rather than actual bandwidth estimates, the actual bandwidth estimates may be used to control quality of playback in determining whether a smoothening constraint and/or upswitch constraint are met because for controlling quality it may be acceptable for calculated bandwidth estimates to lag actual network bandwidth.

In an embodiment in which the minimum network condition is not used for the download time constraint λ is not equal to zero (0<λ<1.0), no stall may still be guaranteed when the download constraint is checked repeatedly for the currently downloading layer (if enhanced layer) against the remaining number of bytes that need to be downloaded for the layer. This embodiment provides for faster adaptation to network bandwidth. However in case of an abrupt bandwidth decrease (while still satisfying the minimum condition), the currently downloading the enhanced layer may be stopped, and the algorithm triggered again to find a new layer to download. This embodiment provides a trade-off where a faster adaptation to network bandwidth is desired while ensuring no stall.

In an embodiment, at start up the client may not be rendering media and may trigger the application of one or more of the various embodiment criteria following start up when media is rendered. For example, a client may be configured to provide a lowest possible start up latency, and may download only one single layer (e.g., the base layer) for each interval until a pre-roll duration is accumulated and then may apply one or more the various embodiment criteria. As another example, a client may assume a high bandwidth during start up and download all layers per interval until a pre-roll duration is accumulated and then may apply one or more the various embodiment criteria to adapt to post start up bandwidth. As a further example, during start up a client may download a certain number of layers per interval, such as half the layers per interval, until a pre-roll duration is accumulated and then may apply one or more the various embodiment criteria to adapt to post start up bandwidth.

In an embodiment, one or more of the various embodiment criteria may be applied at start up even though the client may not be rendering content at start up. A client may have a maximum desired start up latency, which may be an amount of time that the client may be configured to wait before starting play out (e.g., beginning to consume for processing and rendering) of downloaded data. A client may also have a pre-roll duration, which may be a duration of media-data that must be accumulated before play out may start. The pre-roll duration may be used by client applications (e.g., streaming applications) to keep a buffer to account for network variations. Pre-roll may be a hard constraint in that it may take precedence over other constraints, such as a maximum desired start up latency. In an embodiment, during start up for the first media interval of the media presentation an adjacency constraint may only be applied to media intervals later in time than the first media interval because there may not be media intervals earlier in time than the first media interval.

FIG. 1 illustrates a communication network system 100 suitable for use with the various embodiments. The communication network system 100 may include multiple devices, such as a receiver device 102, one or more cellular towers or base stations 104, one or more wireless access point 114, one or more routers 109, and servers 108 and 112 connected to the Internet 110. The receiver device 102 may exchange data via one or more cellular connections 106, including CDMA, TDMA, GSM, PCS, 3G, 4G, LTE, or any other type connection, with the cellular tower or base station 104. The cellular tower or base station 104 may be in communication with a router which may connect to the Internet 110. The receiver device 102 may exchange data via one or more connections 118, including Wi-Fi® or any other type connection, with the wireless access point 114. The wireless access point 114 may be in communication with a router which may connect to the Internet 110. The receiver device 102 may exchange data via one or more wired connections 117 with the router 109 which may connect to the Internet 110. In this manner, via the connections to the cellular tower or base station 104, wireless access point 114, router 109, and/or Internet 110, data may be exchanged between the receiver device 102 and the server(s) 108 and 112. In an embodiment, server 108 may be a content provider server and/or encoder providing media for output via a DASH client. In an embodiment, the server 108 may receive the media from a media capture device 116, such as a camera. In an embodiment, server 112 may be media server which may receive media output from a content server or encoder and control the provisioning of media to the receiver device 102.

Figure 2:
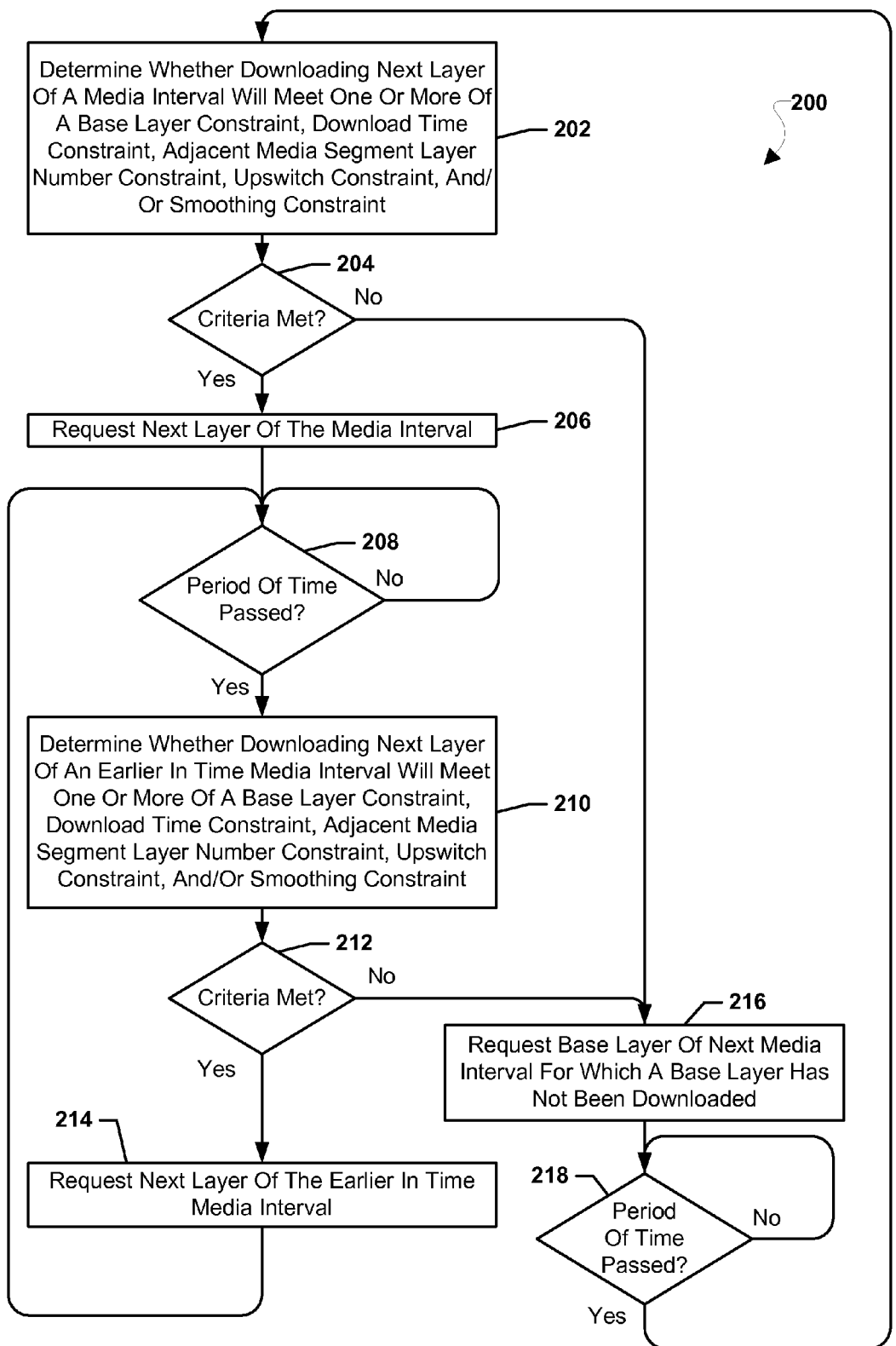
FIG. 2 is a process flow diagram illustrating an embodiment method for downloading a layered media presentation.

FIG. 2 illustrates an embodiment method 200 for downloading a layered media presentation. In an embodiment, the operations of method 200 may be performed by a media client, such as a DASH client, running on a processor of a receiver device.

In block 202 the client may determine whether downloading a next layer of a media interval will meet one or more of a base layer constraint, a download time constraint, an adjacent media segment layer number constraint, an upswitch constraint, and/or a smoothing constraint. A base layer constraint may be a download criteria requiring that at least one layer of the media interval of the media presentation is already downloaded (e.g., in non-pipelined HTTP or pipelined HTTP scenarios) or nearly downloaded (e.g., in pipelined HTTP scenarios). In an embodiment, the base layer constraint criteria may be met for a media interval when at least a base layer of the media presentation has been successfully downloaded. A download time constraint may be a download criterion requiring that a play out time for the media interval of the media presentation is earlier than a current play out time plus an estimated time of completion of downloading the next layer of the media interval of the media presentation. Play out time for a media interval may be the time at which downloaded data for the media interval begins to be consumed for processing and rendering, which may be a time before the actual time at which the media interval is rendered on a device. In an embodiment, an estimated download time may be based on a current bandwidth estimate (e.g., a weighted average of bytes downloaded in an interval of time, etc.) and the bandwidth required for the next layer. The estimated bandwidth may also include additional factors to account for network variation. In an embodiment, an additional factor may be a weighting factor based on a confidence level in a current bandwidth measurement. In an embodiment, in order to meet the download time constraint download criteria, the current play out position plus the estimated download time must be less than the schedule play out time for the media interval.

An adjacent media segment layer number constraint may be a download criteria requiring that adding the next layer of the media interval of the media presentation does not result in a number of layers in the media interval of the media presentation being more than one interval greater than a number of layers in an adjacent media interval of the media presentation. An upswitch constraint may be a download criteria requiring that when adding the next layer of the media interval of the media presentation results in the number of layers in the media interval of the media presentation being higher than a number of layers in a preceding media interval of the media presentation, a total bandwidth of the media interval of the media presentation is not greater than an estimated bandwidth. A smoothing constraint may be a download criterion requiring that that an aggregate bandwidth over a period of time exceeds a threshold.

In an embodiment, the base layer constraint, the download time constraint, the adjacent media segment layer number constraint, the upswitch constraint, and the smoothing constraint may be selectively applied by the client based on client settings. For example, the client may determine whether the base layer constraint, the adjacent media segment layer number constraint, the download time constraint, and the upswitch constraint are met by a next layer of the media interval, but may not check the smoothing constraint because a smoothener may be turned off. Turning on or off a smoothener is merely one example of selecting a constraint to check or not check, and a client may select the base layer constraint, the download time constraint, the adjacent media segment layer number constraint, the upswitch constraint, the smoothing constraint, one or more other constraints, or any combination thereof.

In determination block 204 the client may determine whether the criteria are met. If the criteria are met (i.e., determination block 204="Yes"), the client may request the next layer of the media interval in block 206. For example, the client may send an HTTP Get( ) request for the next enhanced layer of the media interval above the base layer of the media interval.

In determination block 208 the client may determine whether a period of time has passed. The period of time may be a wait period determined to enable the client to account for the actual time involved in downloading a requested item before requesting another item. The period of time may be any time period and may change based on the characteristics of the client (e.g., supporting or not supporting pipelining) and/or whether memory usage has exceeded a threshold and a further wait period may be needed until downloaded data is consumed freeing up available memory. If the time period has not passed (i.e., determination block 208="No"), the client may continue to determine whether the time period has passed in determination block 208. If λ>0.0 is used, then if the download is for an enhanced layer, that download is monitored continuously against the download time constraint for the remaining bytes to download for the enhanced layer. If the download-time constraint fails while monitoring, then the download of the enhanced layer may be aborted (or paused) and the period of time would be deemed to have passed thus resulting in the algorithm choosing a new layer to download.

If the time period has passed (i.e., determination block 208="Yes"), in block 210 the client may determine whether downloading a next layer of a an earlier in time media interval will meet one or more of a base layer constraint, a download time constraint, an adjacent media segment layer number constraint, an upswitch constraint, and/or a smoothing constraint. In this manner, the client may look backward toward the play out point to check whether another media interval also meets the criteria.

In determination block 212 the client may determine whether the criteria are met. If the criteria are met (i.e., determination block 212="Yes"), the client may request the next layer of the earlier in time media interval in block 206. For example, the client may send an HTTP Get( ) request for the next enhanced layer of the earlier in time media interval above the base layer of the earlier in time media interval. In determination block 208 the client may determine whether the period of time has passed and in block 210 the client may determine whether downloading the next layer of another earlier in time media interval will meet one or more of a base layer constraint, a download time constraint, an adjacent media segment layer number constraint, an upswitch constraint, and/or a smoothing constraint. In this manner, as long as the criteria are met by earlier in time media intervals, additional layers may be added to media intervals up to the play out point.

If the criteria are not met (i.e., determination block 204 or 212="No"), the client may request a base layer of the next media interval for which a base layer has not been downloaded in block 216. For example, the client may send an HTTP Get( ) request for the base layer of the next latest in time media interval for which no layers have yet been downloaded. In determination block 218 the client may determine whether a period of time has passed. As discussed above, the period of time may be a wait period determined to enable the client to account for the actual time involved in downloading a requested item before requesting another item. The period of time may be any time period and may change based on the characteristics of the client (e.g., supporting or not supporting pipelining) and/or whether memory usage has exceeded a threshold and a further wait period may be needed until downloaded data is consumed freeing up available memory. If the time period has not passed (i.e., determination block 218="No"), the client may continue to determine whether the time period has passed in determination block 218. If the time period has passed (i.e., determination block 218="Yes"), in block 202 the client may determine whether downloading a next layer of a media interval will meet one or more of a base layer constraint, a download time constraint, an adjacent media segment layer number constraint, an upswitch constraint, and/or a smoothing constraint. In this manner, the client may continually check the various selected criteria to determine whether additional layers may be downloaded.

FIGS. 3A, 3B, 3C, and 3D illustrate an embodiment method 300 for downloading a layered media presentation in which a base layer constraint, a download time constraint, an adjacent media segment layer number constraint, an upswitch constraint, and selectively a smoothing constraint checked. In an embodiment, the operations of method 300 may be performed by a client, such as a DASH client, running on a processor of a receiver device. As discussed above, in block 216 (FIG. 3A) the client may request a base layer of the next media interval for which a base layer has not been downloaded. In block 302 the client may receive the requested base layer. In determination block 303 the client may determine whether a period of time has passed. The period of time may be a wait period determined to enable the client to account for the actual time involved in downloading a requested item before requesting another item. This period of time may be any time period and may change based on the characteristics of the client (e.g., supporting or not supporting pipelining) and/or the availability of layers of the media presentation (e.g., from one server or multiple servers). As an example, when the server hosting the media presentation fully supports pipelining the period of time may be shorter than when the server hosting the media presentation does not or only partially supports pipelining. When the server fully supports pipelining the base layer for an earlier in time media interval may have been completed (or considered to have been completed) in a shorter period of time to keep the pipeline full. If the time period has not passed (i.e., determination block 303="No"), the client may continue to wait and periodically determine whether the time period has passed in determination block 303.

In block 304 the client may identify the current play out media interval, and in block 305 the client may select the next later-in-time media interval. In this manner, after downloading a base layer the client may select the media interval closest to the play out position to determine whether that media interval and/or any later-in-time media intervals meet applicable constraints for downloading of additional layers. In block 306 the client may determine the next needed layer of the selected media interval. For example, the media interval may have four possible layers, a base layer and three enhancement layers, and the client may determine that the second enhancement layer is needed because the base layer and the first enhancement layer are already downloaded. In block 308 the client may estimate the current network bandwidth (C). Current network bandwidth may be estimated in any way. For example, the current network bandwidth estimate may be a weighted average of bytes downloaded in an interval of time plus a constant to account for network variation or may be a value provided to the client from another source on the receiver device. In block 310 the client may estimate the time of completion of downloading the next layer. In an embodiment, the estimated time of completion may be the length in time of the media interval times the bandwidth of the next layer divided by the bandwidth corresponding to the minimum network condition.

In determination block 312 the client may determine whether the play out time for the selected media interval is not earlier than a current play out time plus the estimated time of completion of the downloading the next layer. In this manner, the client may check a download time constraint.

If the download time constraint is met (i.e., determination block 312="Yes"), in block 314 (FIG. 3B), the client may determine a number of downloaded layers (L) for the directly preceding media interval, in block 316 the client may determine a number of downloaded layers (R) for the directly following media interval, and in block 318 the client may determine the number of downloaded layers (N) for the selected media interval.

In determination block 320 the client may determine both whether the number of downloaded layers (N) plus one for the selected media interval is less than or equal to the number of downloaded layers (L) plus one for the directly preceding media interval (e.g., N+1≤L+1) and the number of downloaded layers (N) plus one for the selected media interval is less than or equal to the number of downloaded layers (R) for the directly following media interval plus one (e.g., N+1≤R+1). In this manner, the client may check an adjacent media segment layer number constraint.

If the adjacent media segment layer number constraint is met (i.e., determination block 320="Yes"), in block 322 the client may determine whether the number of downloaded layers (N) plus one for the selected media interval is greater than the number of downloaded layers (L) for the directly preceding media interval (e.g., N+1≥L). In this manner, the client may determine whether potentially adding a layer to the selected media interval may increase the quality of the media presentation for the selected media interval over the preceding media interval. If the quality will not be increased (i.e., determination block 322="No"), the client may request the next layer of the selected media interval in block 330 (FIG. 3C). For example, the client may send an HTTP Get( ) request for the next layer of the selected media interval. In this manner, when quality may not be increased over a preceding media interval, layers may be added to the selected media interval without checking additional criteria.

If the quality will be increased (i.e., determination block 322="Yes"), in determination block 324 (FIG. 3B) the client may determine whether the bandwidth of the number of downloaded layers (N) plus one layers is greater than the current network bandwidth (C). In this manner, the client may check an upswitch constraint.

If the upswitch constraint is met (i.e., determination block 324="Yes"), the client may determine whether a smoothener is on in determination block 325 (FIG. 3C). In this manner, a smoothing constraint may be selectively checked when the smoothener is on. If the smoothener is not on (i.e., determination block 325="No"), as discussed above, the client may request the next layer of the selected media interval in block 330.

If the smoothener is on (i.e., determination block 325="Yes"), the client may determine the aggregate bandwidth over a period in block 326. The aggregate bandwidth over the period may be determined as an average of the estimated bandwidth over the time period. As an example, the aggregate bandwidth may be a simple average of the bandwidth measurement over the time period, such as ten seconds. As another example, the aggregate bandwidth may be a weighted average of the bandwidth measurements over the time period, such as providing greater weight to the measured/estimated bandwidth during more recent time increments within the period of time and less weight to earlier bandwidth measurements/estimates. In determination block 328 the client may determine whether the aggregate bandwidth is greater than or equal to a threshold. As an example, the threshold may be the required bandwidth for the number of downloaded layers (N) plus one layer. In this manner, the client may determine whether a smoothing constraint is met. If the smoothing constraint is met (i.e., determination block 328="Yes"), the client may request the next layer of the selected media interval in block 330 (FIG. 3C). For example, the client may send an HTTP Get( ) request for the next layer of the selected media interval. In this manner, when quality may be increased over a preceding media interval and a smoothener is on, layers may be added to the selected media interval after checking an upswitch constraint and a smoothing constraint. In block 208 like operations of like numbered blocks of method 200 described above with reference to FIG. 2 may be performed.

If the time period has not passed (i.e., determination block 208="No"), in determination block 331 the client may determine whether λ is greater than 0.0. If λ is equal to 0.0 (i.e., determination block 331="No"), in block 208 the client may continue to determine whether the time period has passed. If λ is greater than 0.0 (i.e., determination block 331="Yes"), in determination block 333 the client may determine whether the play out time for the selected media interval is not earlier than a current play out time plus the estimated time of completion of the downloading of the remaining bytes of the requested next layer. In this manner, the client may check a download time constraint against the bytes remaining for the requested next layer. If the remaining bytes pass the download constraint (i.e., determination block 333="Yes"), in block 208 the client may continue to determine whether the time period has passed.

Figure 3A:
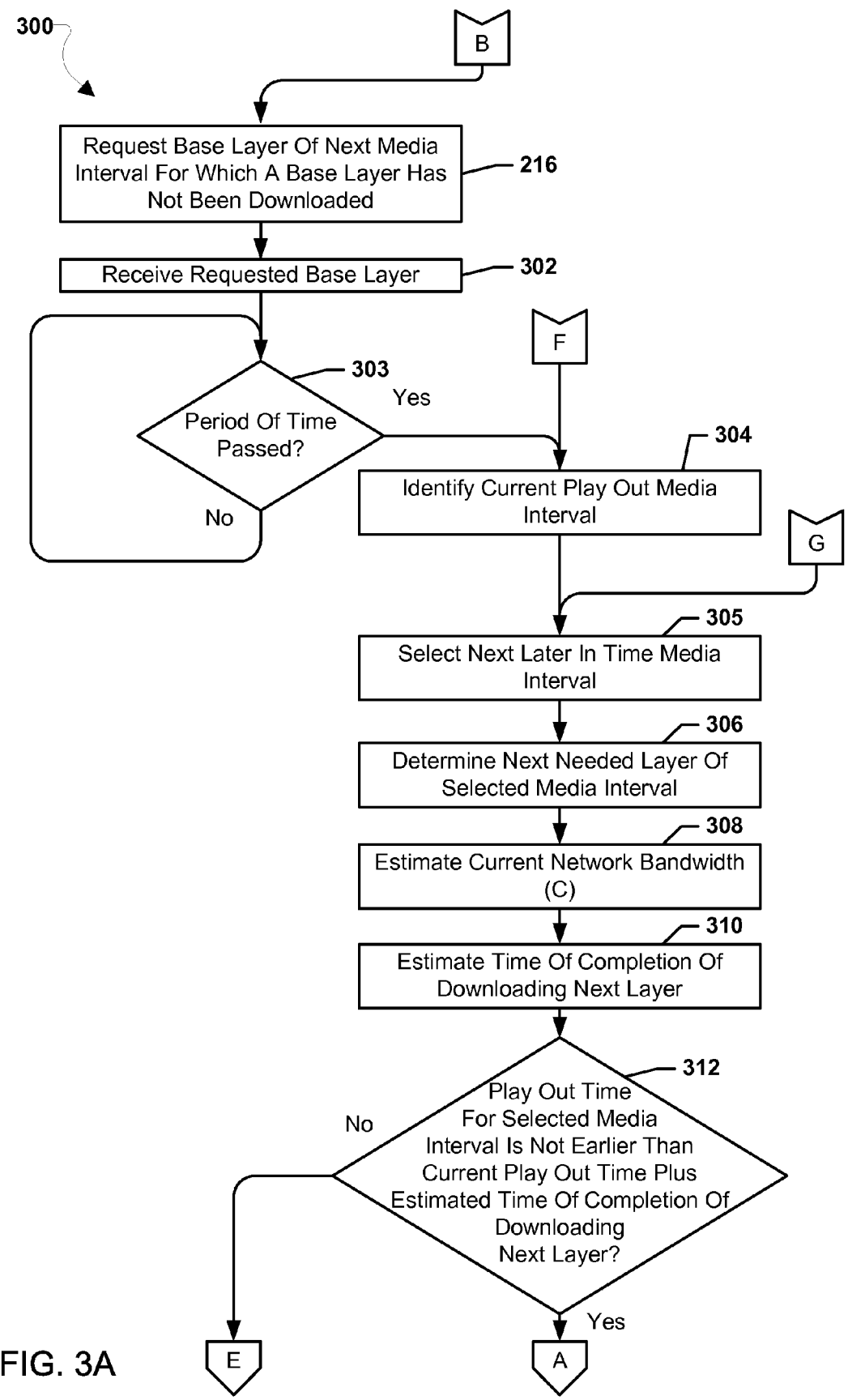
FIGS. 3A, 3B, 3C, and 3D are process flow diagrams illustrating another embodiment method for downloading a layered media presentation.
Figure 3B:
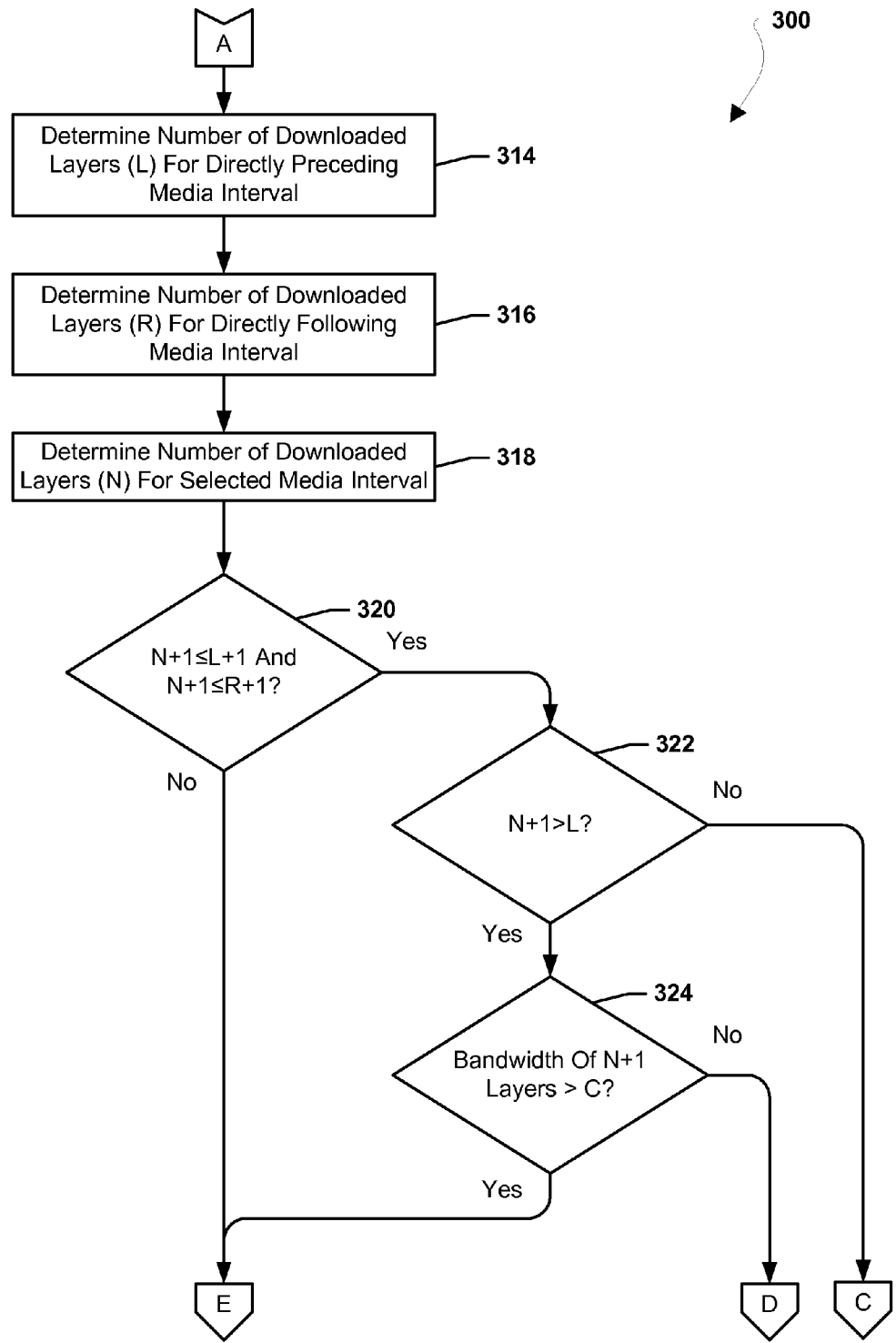
Figure 3C:
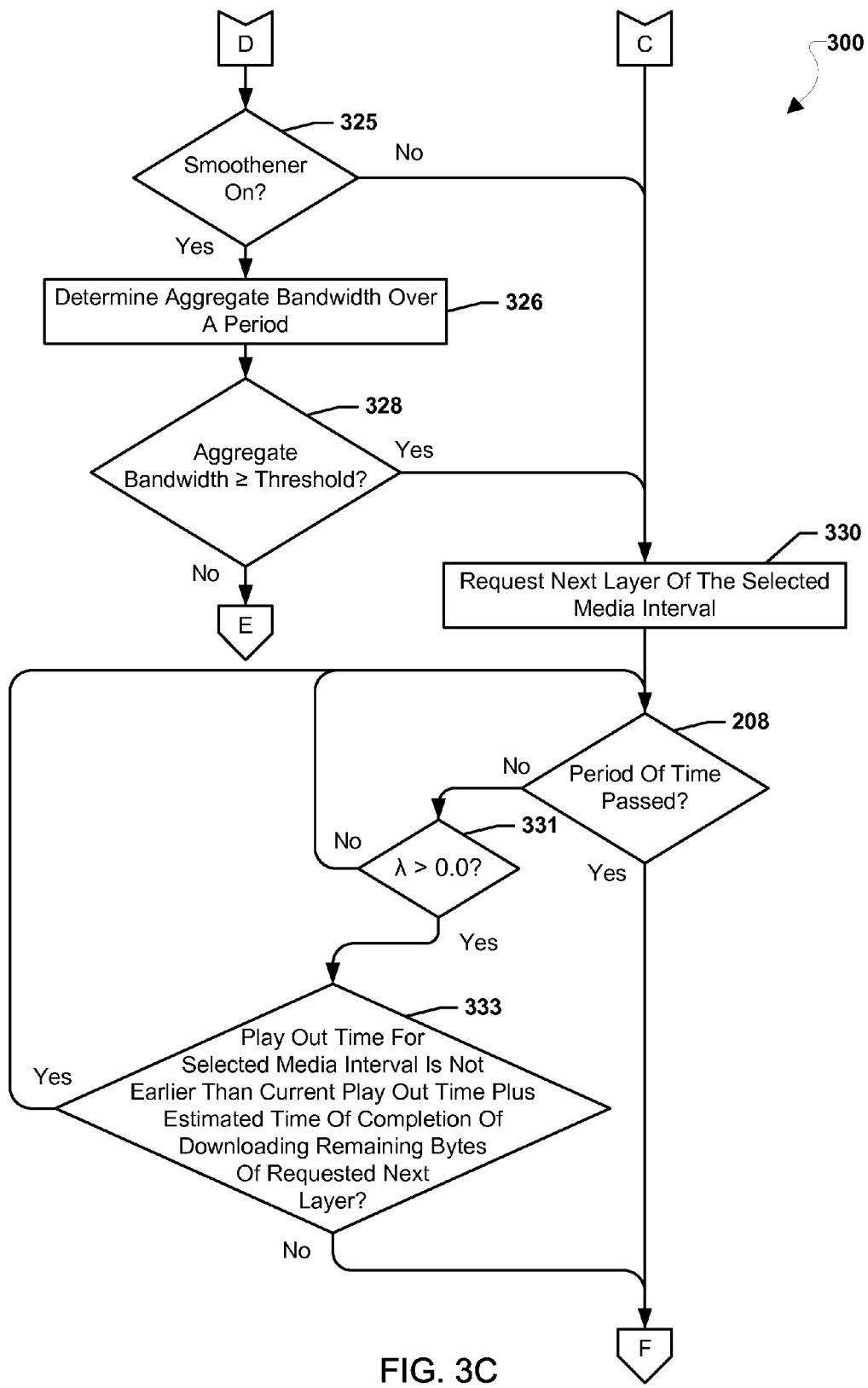

When the remaining bytes fail the download constraint (i.e., determination block 333="No") or the time period has passed (i.e., determination block 208="Yes"), the client may identify the current play out media interval in block 304 (FIG. 3A).

In blocks 305, 306, 308, 310, and 312 the client may perform operations described above to select the next earlier in time media interval, determine the next needed layer of the selected media interval, estimate the current network bandwidth, estimate a time of completion of downloading the next layer, and check a download time constraint.

Figure 3D:
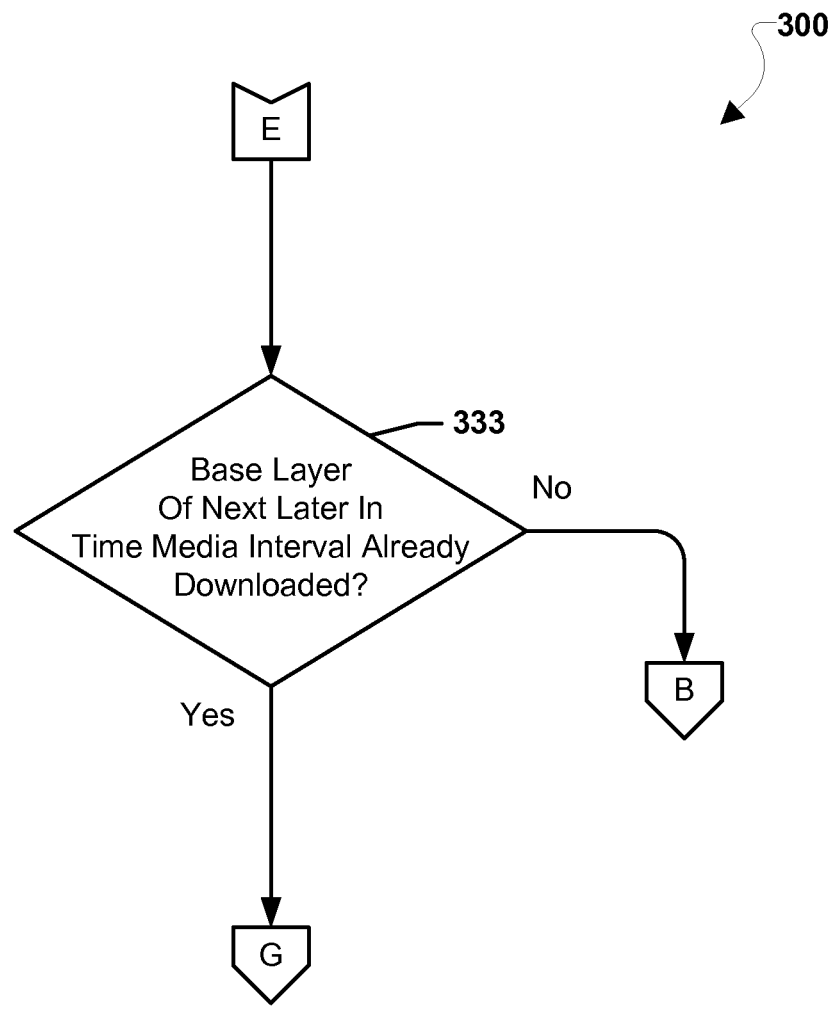

If the download time constraint is not met (i.e., determination block 312="No"), if the adjacent media segment layer number constraint is not met (i.e., determination block 320="No"), if the upswitch constraint is not met (i.e., determination block 324="Yes"), or if the smoothing constraint is not met (i.e., determination block 328="No"), the client may determine whether a base layer of the next later in time media interval is already downloaded in determination block 333 (FIG. 3D). For example, the client may determine whether the base layer for the media interval directly following the selected media interval is not already downloaded. In this manner, the client may check a base layer constraint. If the base layer constraint is not met (i.e., determination block 333="No"), the client may request a base layer of the next media interval for which a base layer has not been downloaded in block 216 (FIG. 3A). If a base layer of the next later in time media interval is already downloaded (i.e., determination block 333="Yes"), the client may select the next later in time media interval in block 305 (FIG. 3A). In block 306 the client may determine the next needed layer of the selected media interval, in block 308 the client may estimate the current network bandwidth, in block 310 the client may estimate the time of completion of downloading the next layer, and in determination block 312 may check a download time constraint. In this manner, while a given media interval may not meet the download time constraint, adjacent media segment layer number constraint, upswitch constraint, and/or smoothing constraint, the media intervals later in time (e.g., to the right in the timeline) may be selected and checked against the download time constraint and/or other constraints, and when the download time constraint and/or other constraints are met, enhanced layers may be added to later in time media intervals (e.g., media intervals to the right in the timeline of the media interval not meeting the download time constraint).

For clarity of illustration of algorithm behavior according to the various embodiments, FIGS. 4A-4S, 5A-5S, 6A-6H, 7A-7E, 8A-8K, 9A-9G described below illustrate scenarios where HTTP-pipelining may not be supported, round-trip time may be zero, and the duration of and the number of each chunk in each layer may be the same. However, these scenarios are provided merely as examples, and in no way limit the general principles of the algorithm behavior according to the various embodiments. The various embodiments may also apply in scenarios where HTTP-pipelining is supported, round-trip time may not be zero, and/or the duration of and the number of each chunk in each layer may be different.

Figure 4A:
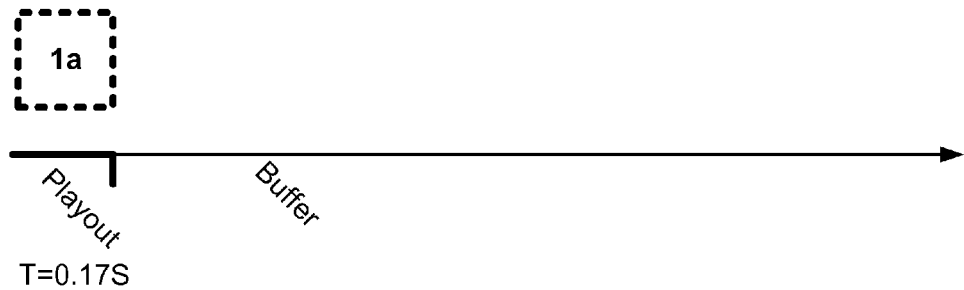
FIGS. 4A-4S illustrate downloaded layers of media intervals of a media presentation over time according to an embodiment in a startup scenario in which an available bandwidth is greater than the sum of the bandwidth requirements of all the layers and a base layer constraint, a minimum network condition is used for a download time constraint, an adjacent media segment layer number constraint, and an upswitch constraint are checked before downloading a layer.
Figure 4B:
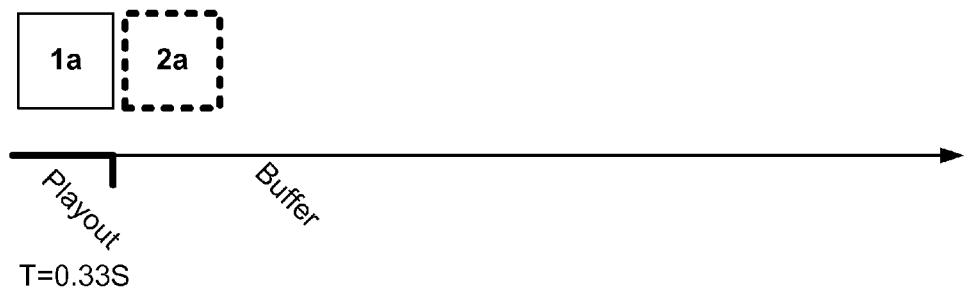
Figure 4C:
Figure 4D:
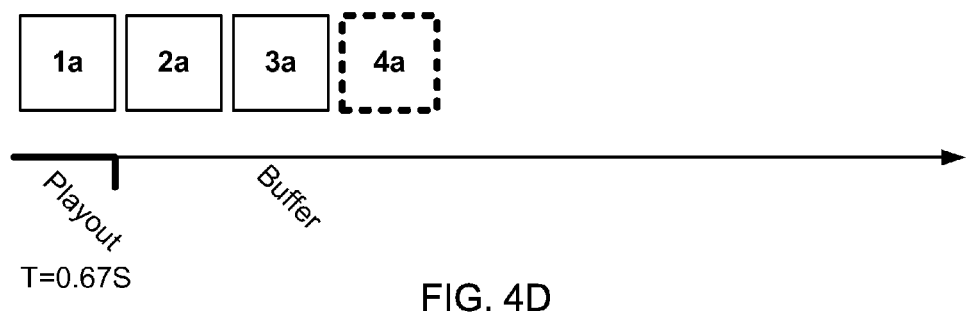
Figure 4E:
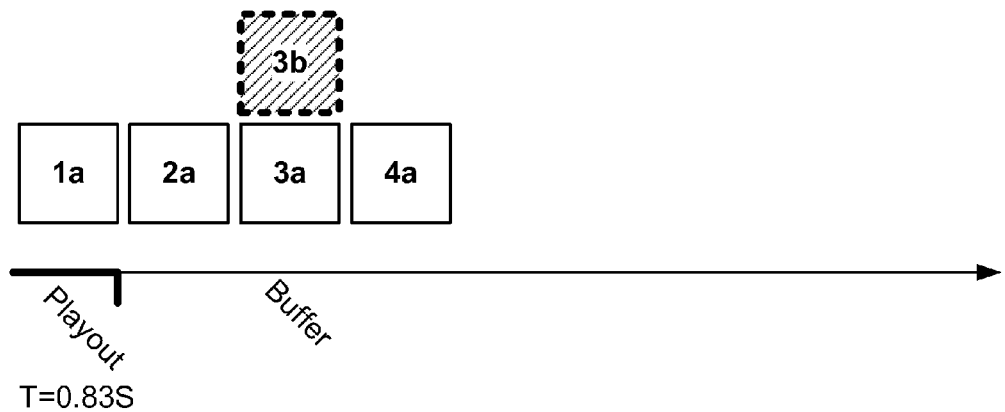
Figure 4F:
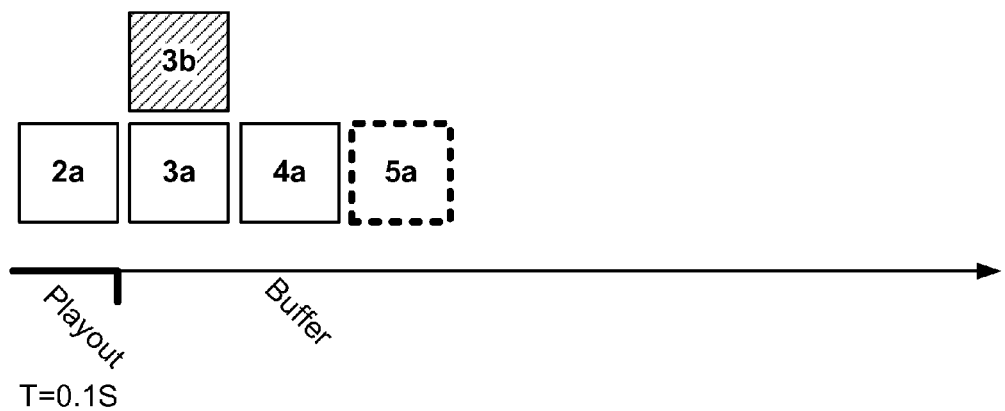
Figure 4G:
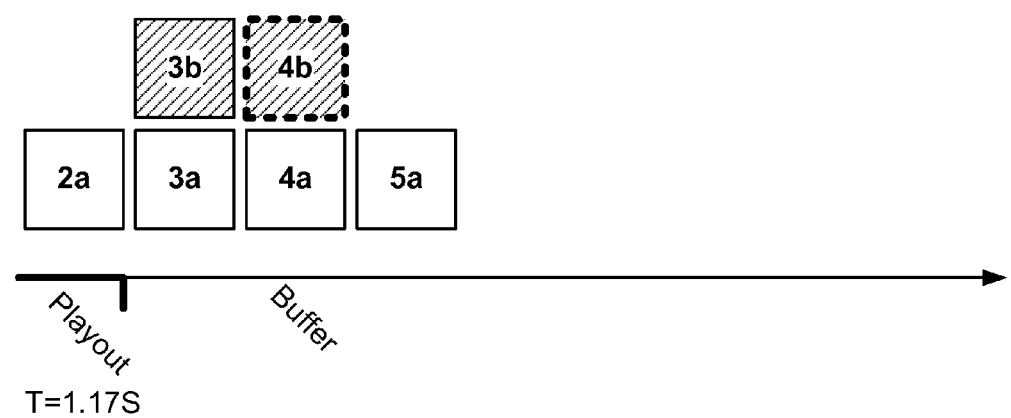
Figure 4H:
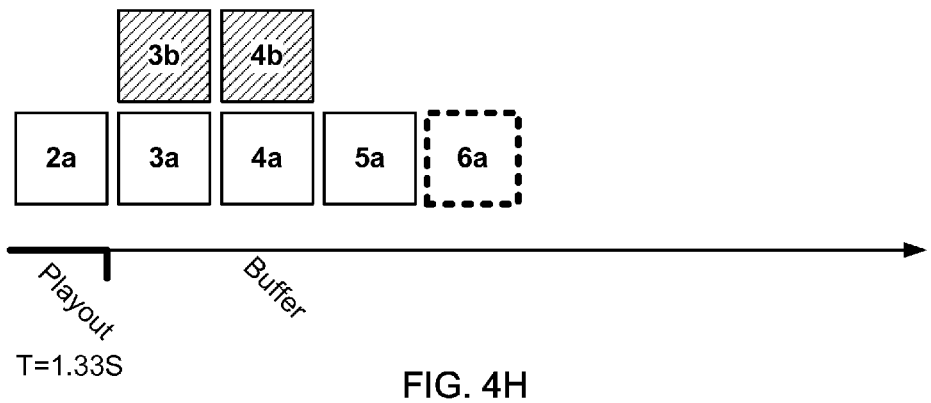
Figure 4I:
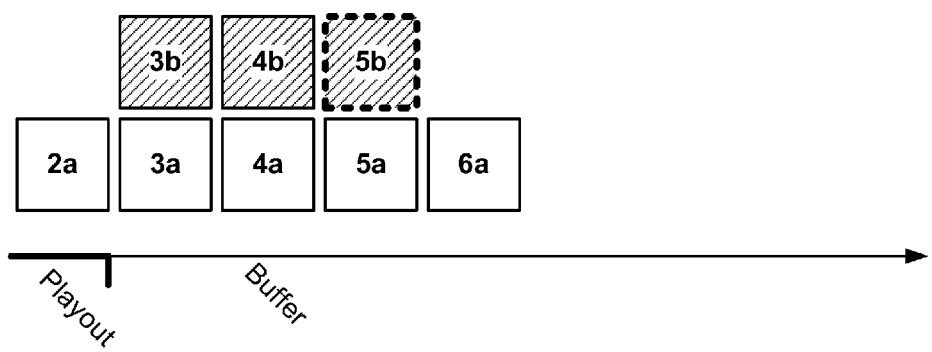
Figure 4J:
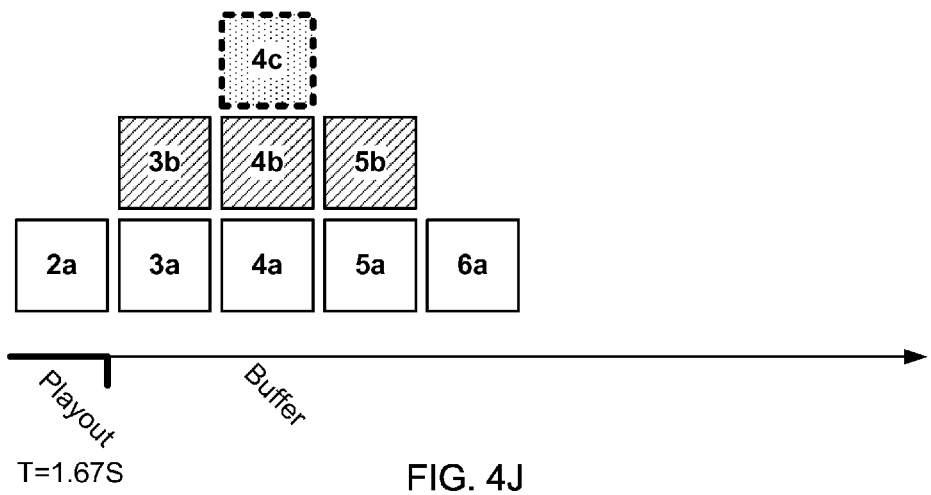
Figure 4K:
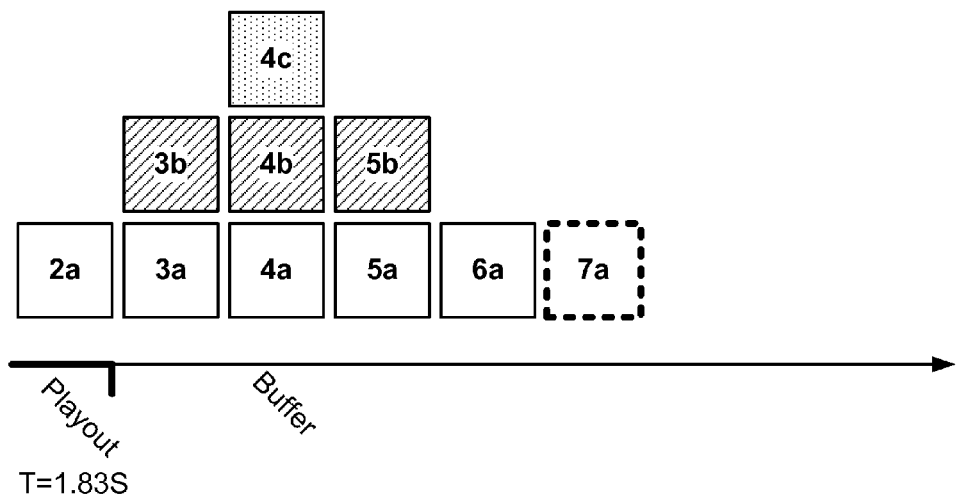
Figure 4L:
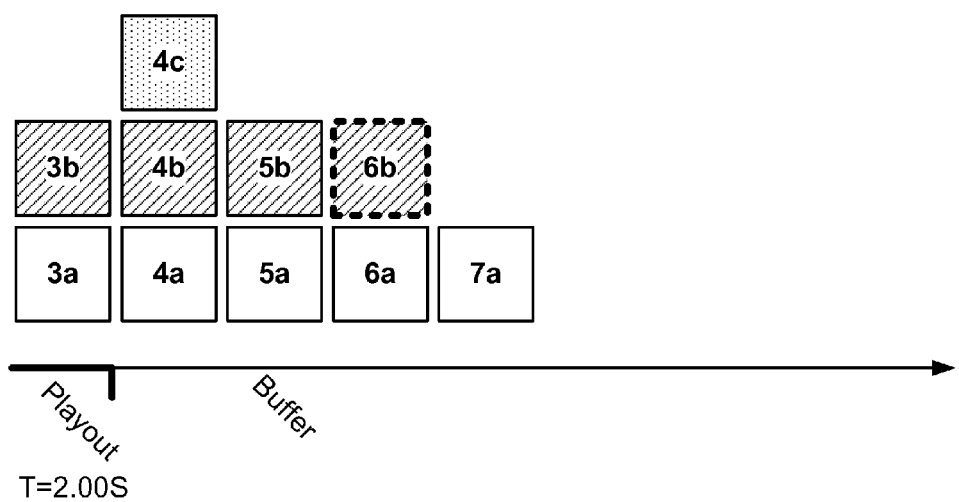
Figure 4M:
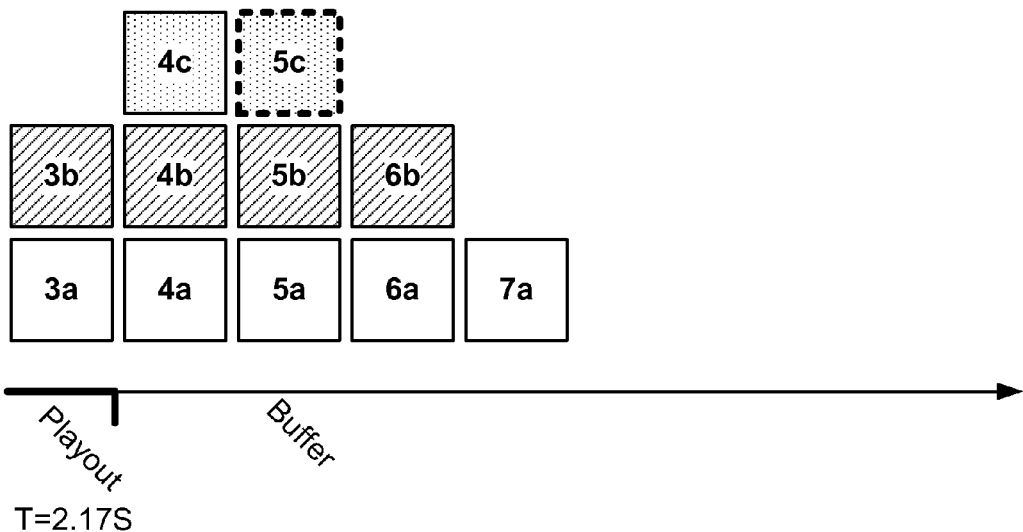
Figure 4N:
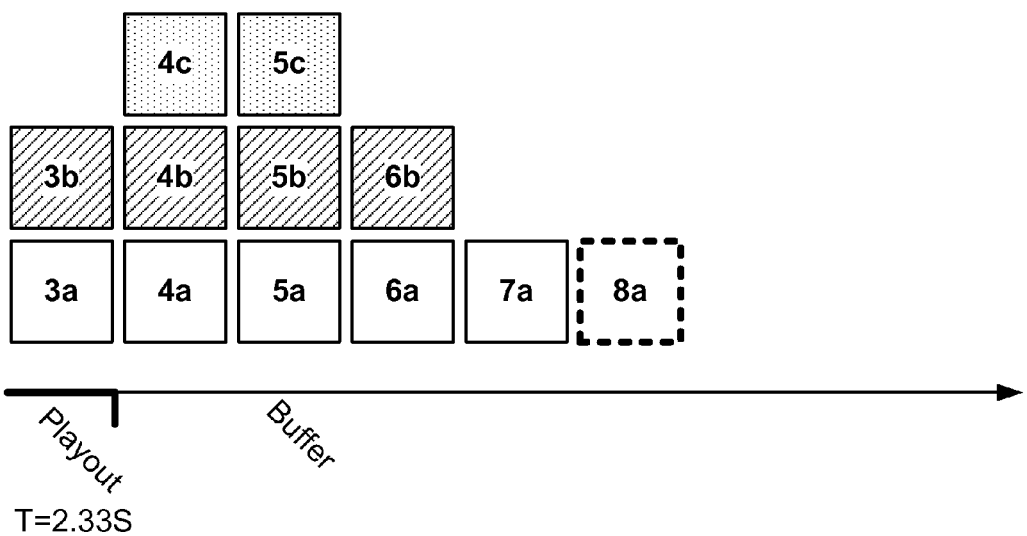
Figure 4O:
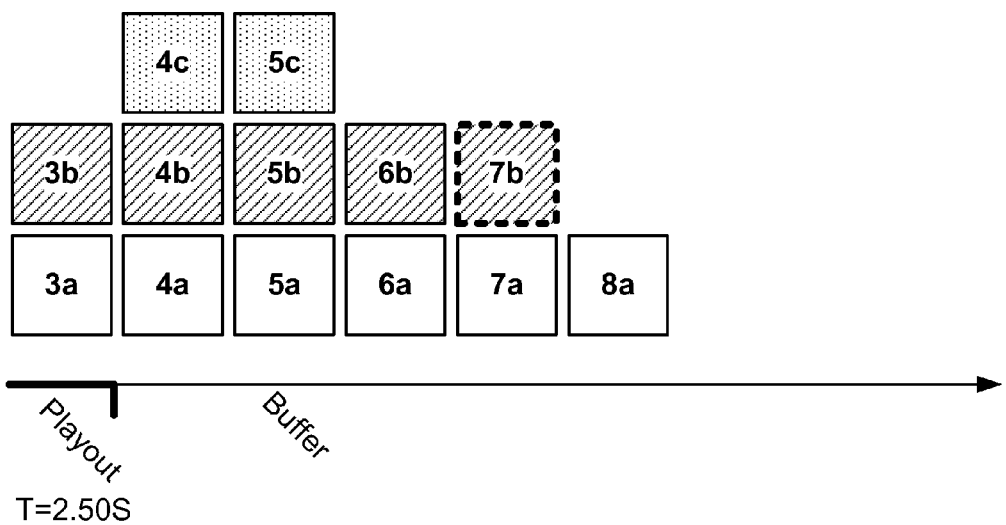
Figure 4P:
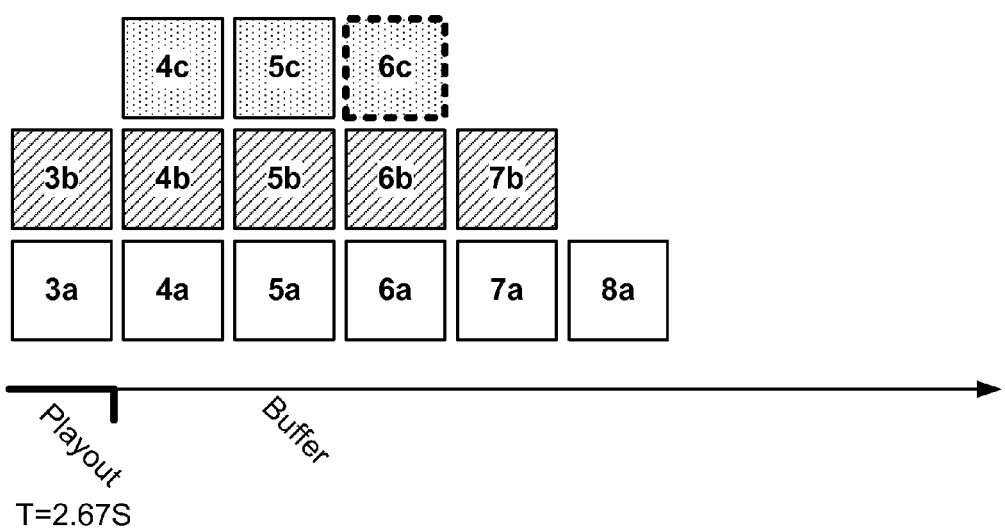
Figure 4Q:
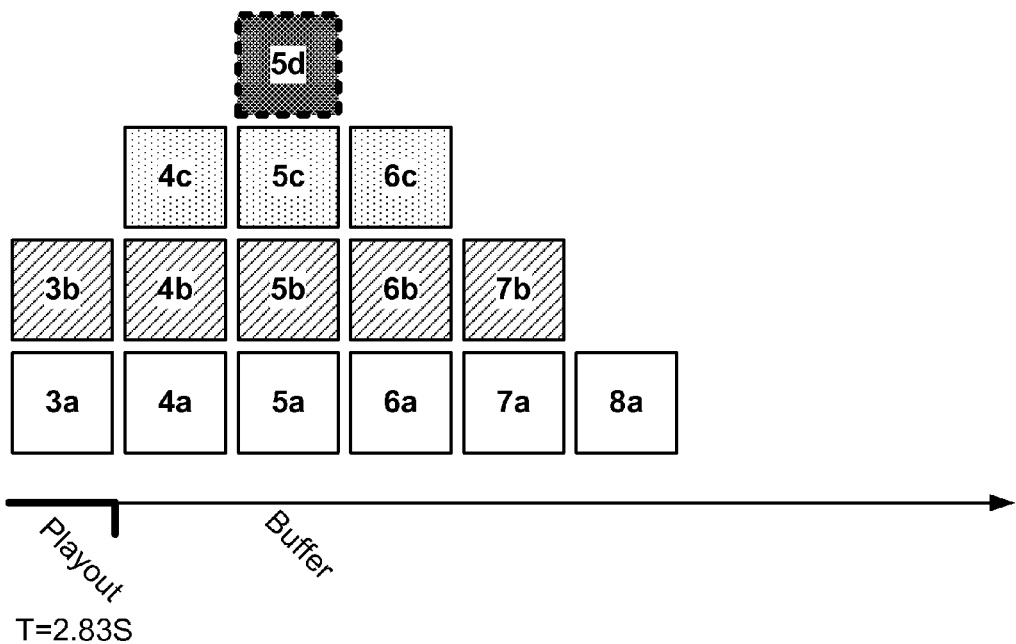
Figure 4R:
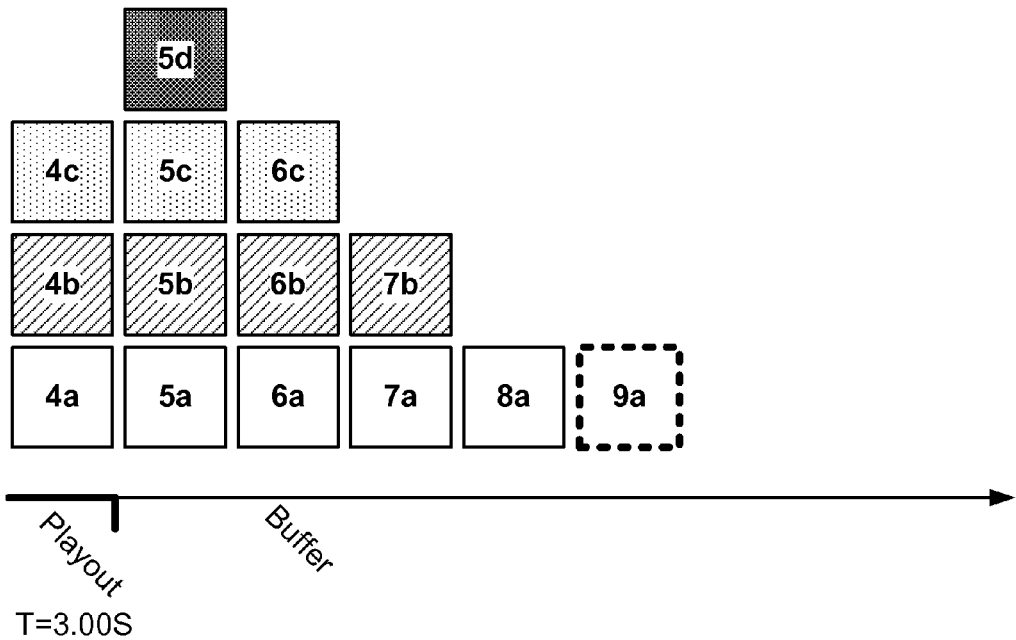
Figure 4S:
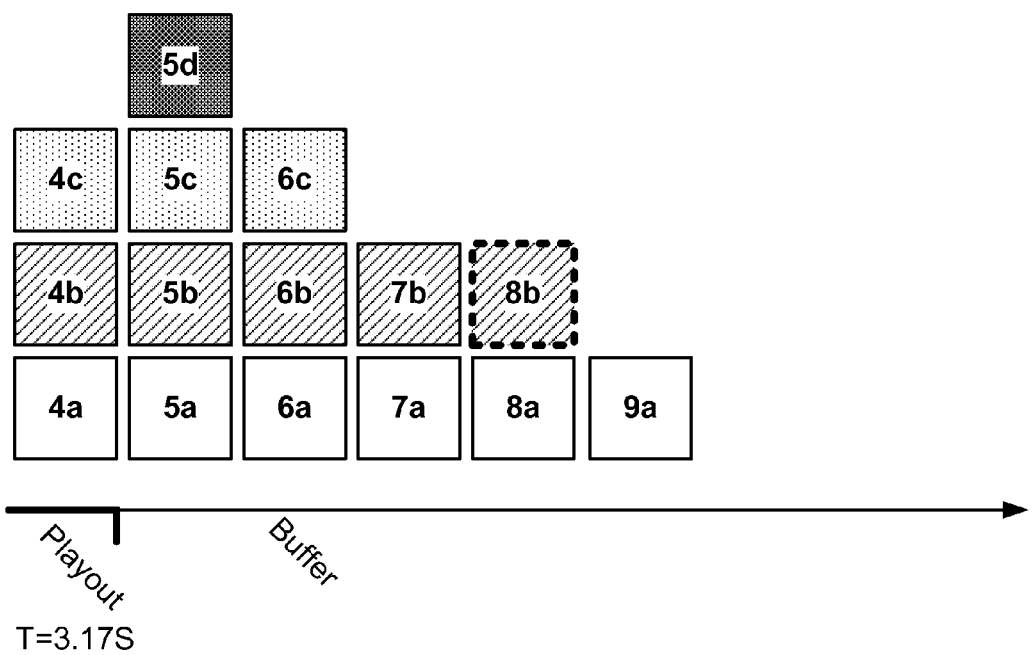

FIGS. 4A-4S illustrate downloaded layers of media intervals of a media presentation over time according to an embodiment in a startup scenario in which an available bandwidth is greater than the sum of the bandwidth requirements of all the layers and a base layer constraint, a download time constraint, an adjacent media segment layer number constraint, and an upswitch constraint are checked before downloading a layer. For illustration purposes each interval of the media presentation includes four layers, a base layer labeled "a", a first enhanced layer labeled "b", a second enhanced layer labeled "c", and a third enhanced layer labeled "d." The layers of the media presentation are each represented as being of equal bandwidth (e.g., 256 kbps each) and each media interval of the media presentation is of an equal duration (e.g., 1 second). Additionally, the network bandwidth may be a constant, such as 1.5 Mbps or 1536 Kbps, and the estimated time to download a layer may be approximately 0.1667 seconds. Using λ=0.0 so that the minimum-network condition is used for the download constraint, C=(1−0.0)*(256 Kbps)+0.0*(1536 Kbps)=256 Kbps. E=1.0 s (K=1.0, R=0.0). Also, in S>P+E, reduces to S>P+1.0. Also for clarity of illustrations assume that pipelining is not supported and the rtt (round trip time) for a request-reply is zero.

FIG. 4A illustrates that at time 0.17 seconds the base layer 1a of the first media interval may complete downloading and the first media interval may be at the play out position. The base layer 1a may have been selected for download at time 0.00 seconds because the base layer constraint was not met because the first media interval did not have a downloaded base layer.

FIG. 4B illustrates that at time 0.33 seconds the base layer 2a of the second media interval may complete downloading. The base layer 2a may have been selected for download at time 0.17 seconds because no other media interval met the base layer constraint, the download time constraint, the adjacent media segment layer number constraint, and the upswitch constraint at that time past the playout position.

FIG. 4C illustrates that at time 0.50 seconds the base layer 3a of the third media interval may complete downloading. The base layer 3a may have been selected for download at time 0.33 seconds because adding a second layer to the second media interval at time 0.33 seconds may have violated the adjacent media segment layer number constraint because there would be two layers in the second interval and no layers in the third.

FIG. 4D illustrates that at time 0.67 seconds the base layer 4a of the fourth media interval may complete downloading. The base layer 4a may have been selected for download at time 0.50 seconds because adding a second layer to the second media interval at time 0.50 seconds may have violated the download time constraint. Adding a layer 3b to the third media interval instead may have violated the adjacent media segment layer number constraint as there would have been two layers in the third interval and none at the fourth.

FIG. 4E illustrates that at time 0.83 seconds the enhanced layer 3b of the third media interval may complete downloading. The enhanced layer 3b may have been selected for download at time 0.67 seconds because adding a second layer to the third media interval at time 0.67 seconds may have met the base layer constraint, the download time constraint, the adjacent media segment layer number constraint, and the upswitch constraint.

FIG. 4F illustrates that at time 1.00 seconds the base layer 5a of the fifth media interval may complete downloading. The base layer 5a may have been selected for download at time 0.83 seconds because adding an enhanced layer to any of intervals past the playout position do not satisfy the base layer constraint, the download time constraint or the adjacent segment layer number constraint.

FIG. 4G illustrates that at time 1.17 seconds the enhanced layer 4b of the fourth media interval may complete downloading. The enhanced layer 4b may have been selected for download at time 1.00 seconds because this is the first interval past the playout position that satisfies all the constraints.

FIG. 4H illustrates that at time 1.33 seconds the base layer 6a of the sixth media interval may complete downloading. The base layer 6a may be selected for download at time 1.17 seconds because adding a layer to any of the intervals past the playout position would not have satisfied all the constraints.

FIG. 4I illustrates that at time 1.50 seconds the enhanced layer 5b may complete downloading. FIG. 4J illustrates that at time 1.67 seconds the enhanced layer 4c may complete downloading. FIG. 4K illustrates that at time 1.83 seconds the base layer 7a may complete downloading. FIG. 4L illustrates that at time 2.00 second the enhanced layer 6b may complete downloading. FIG. 4M illustrates that at time 2.17 seconds the enhanced layer 5c may complete downloading. FIG. 4N illustrates that at time 2.33 second the base layer 8a may complete downloading. FIG. 4O illustrates that at time 2.50 seconds the enhanced layer 7b may complete downloading. FIG. 4P illustrates that at time 2.67 seconds the enhanced layer 6c may complete downloading. FIG. 4Q illustrates that at time 2.83 seconds the enhanced layer 5d may complete downloading. FIG. 4R illustrates that at time 3.00 seconds the base layer 9a may complete downloading. FIG. 4S illustrates that at time 3.17 seconds the enhanced layer 8b may complete downloading. In this manner, FIGS. 4A-4S illustrate downloads and the playout position until 3.17 seconds elapses. Presentation quality of 1 Mbps may be reached when playout position reaches 4.00 seconds.

Figure 5A:
FIGS. 5A-5S illustrate downloaded layers of media intervals of a media presentation over time according to an embodiment in a startup scenario in which an available bandwidth is greater than the sum of the bandwidth requirements of all the layers where the minimum-network condition and the estimated network bandwidth are taken into account for the download constraint.
Figure 5B:
Figure 5C:
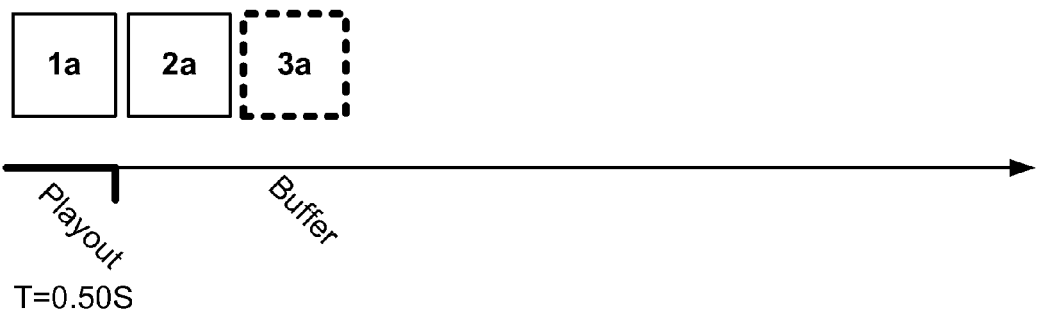
Figure 5D:
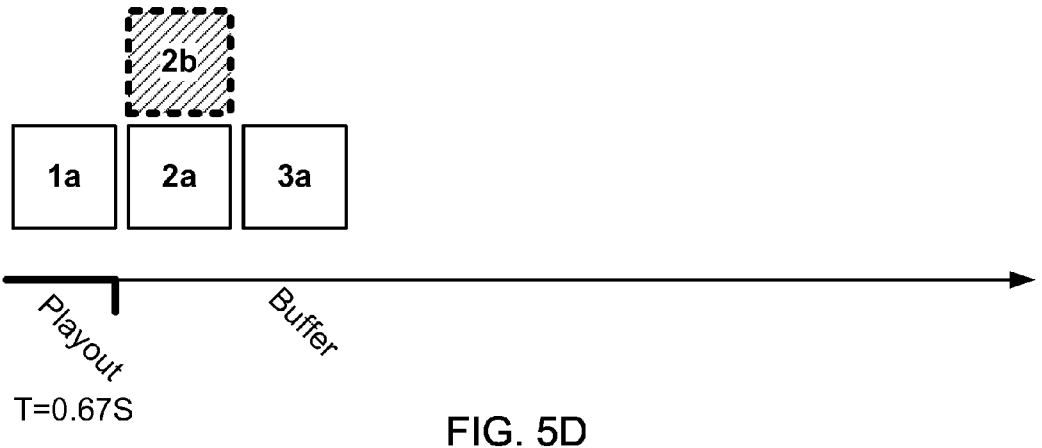
Figure 5E:
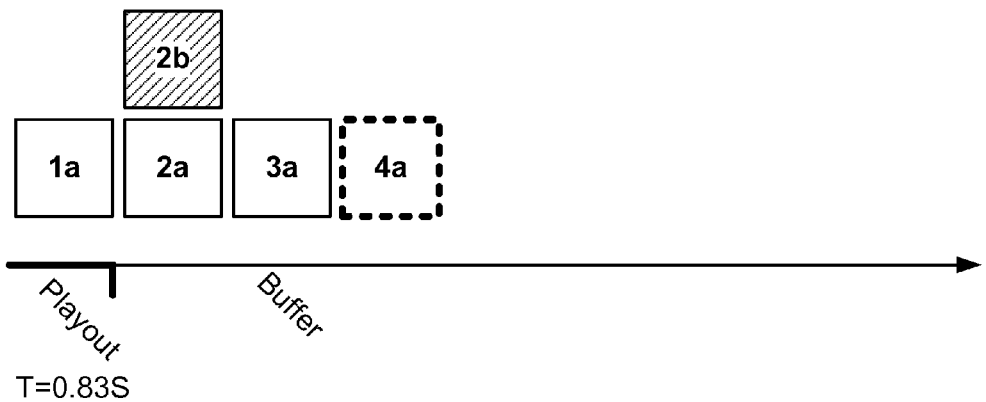
Figure 5F:
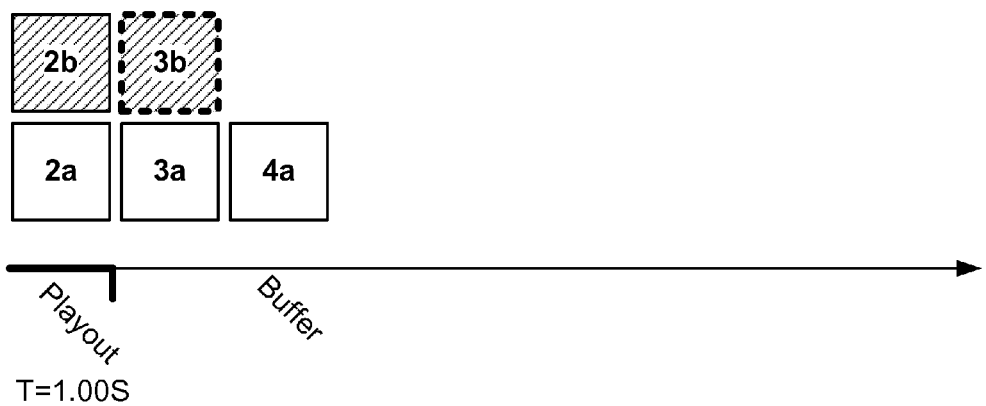
Figure 5G:
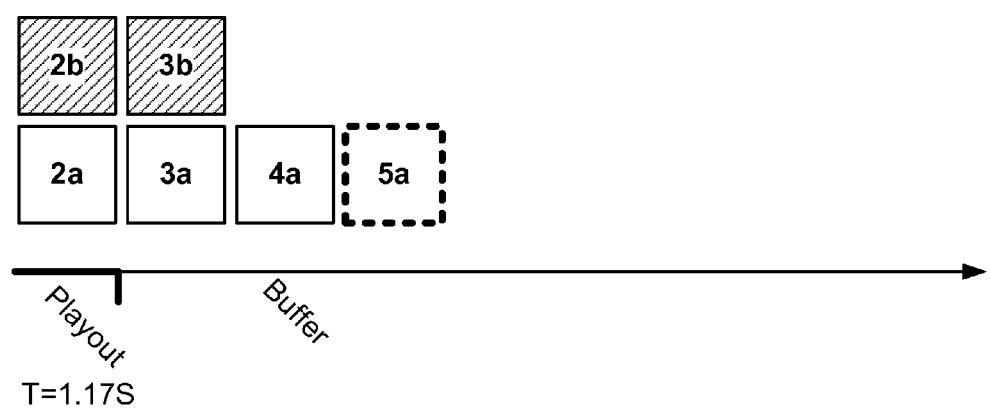
Figure 5H:
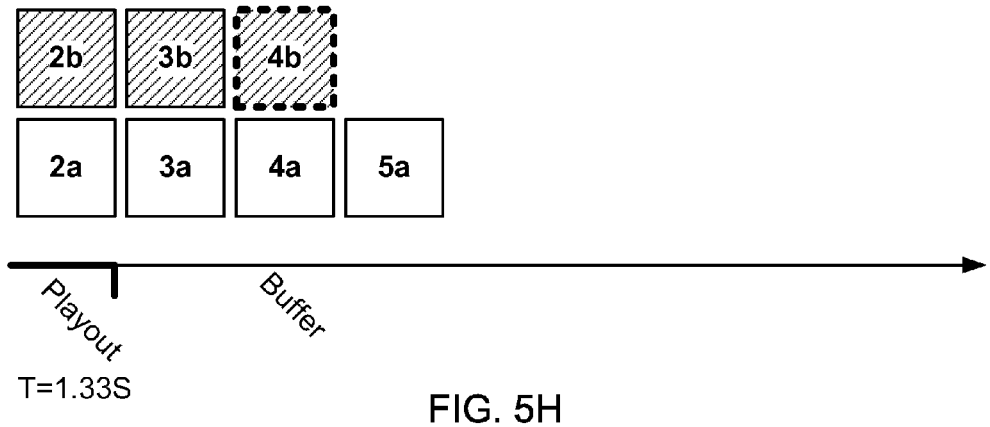
Figure 5I:
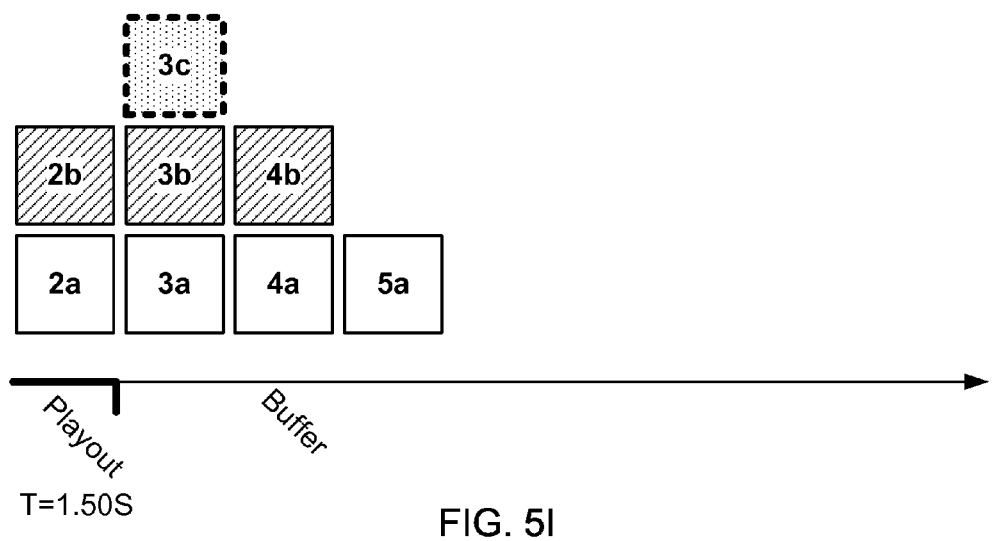
Figure 5J:
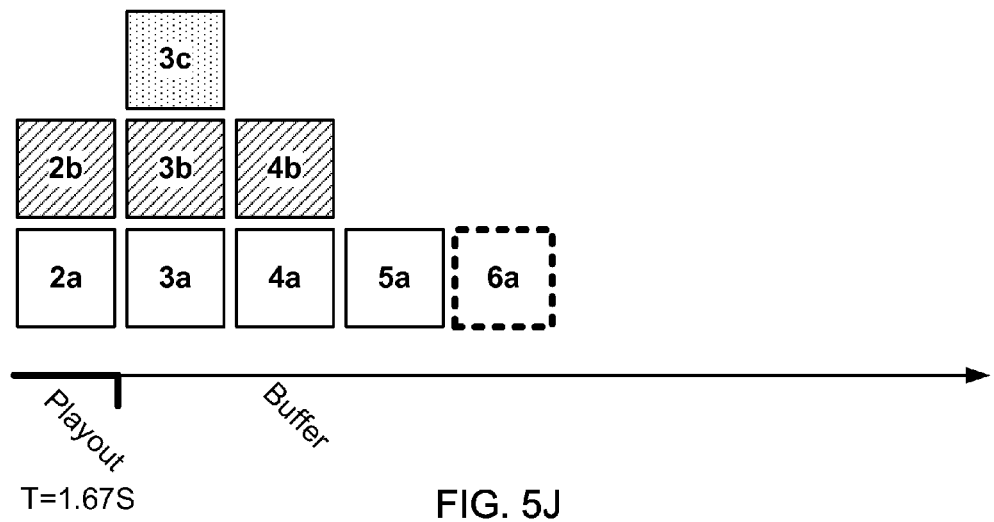
Figure 5K:
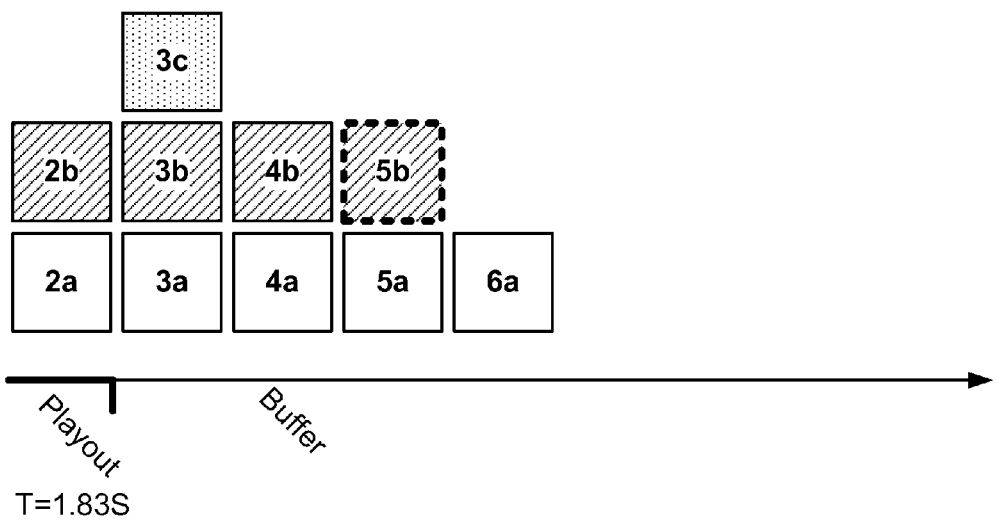
Figure 5L:
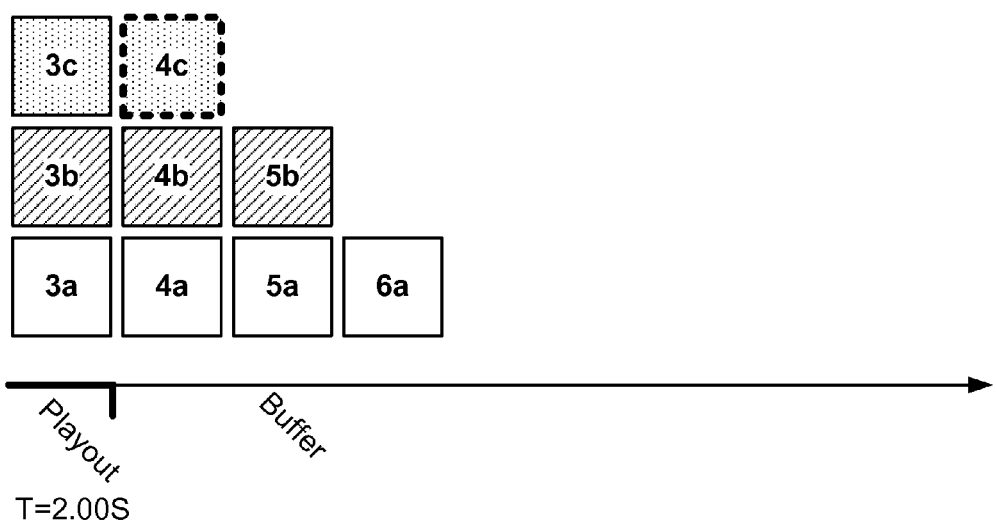
Figure 5M:
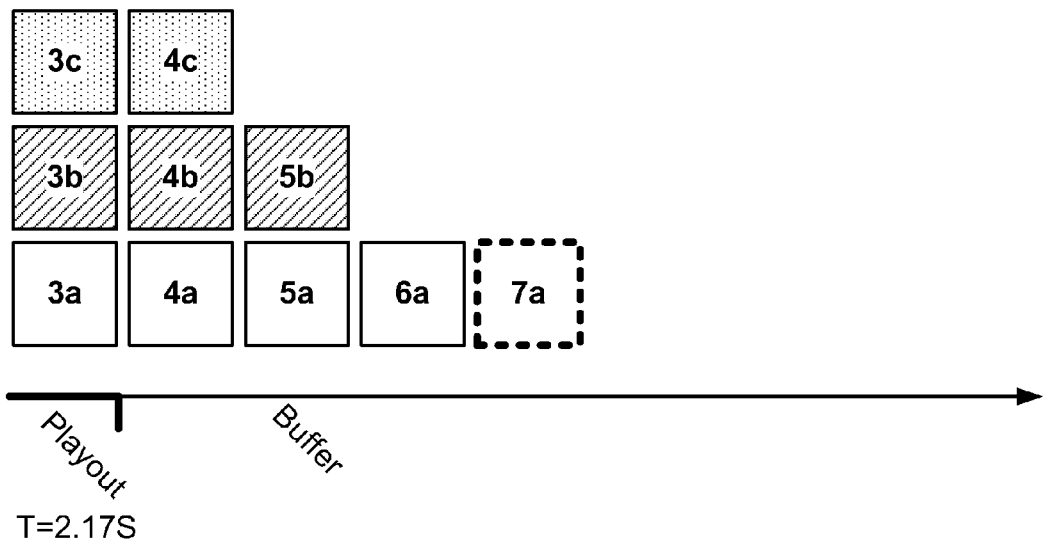
Figure 5N:
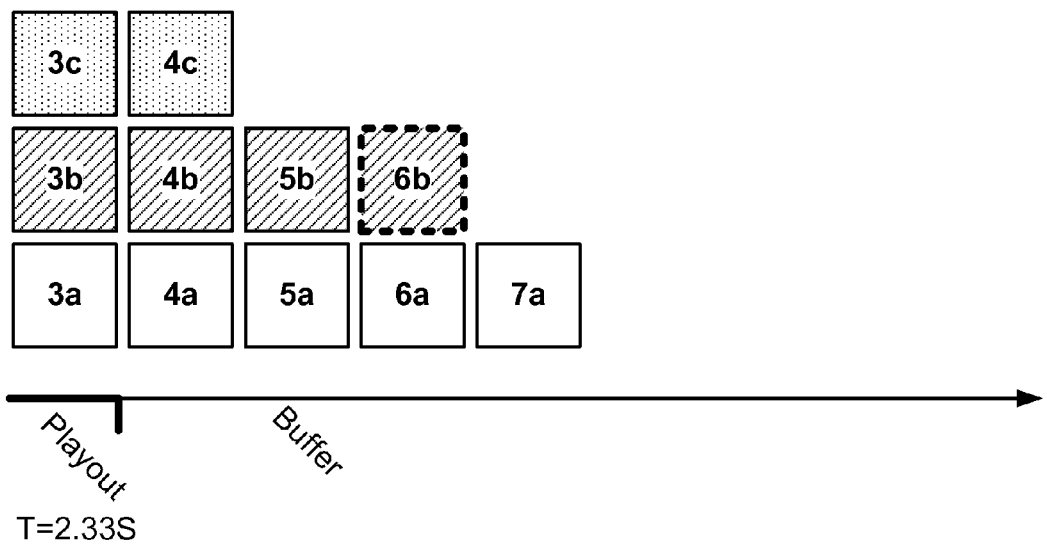
Figure 5O:
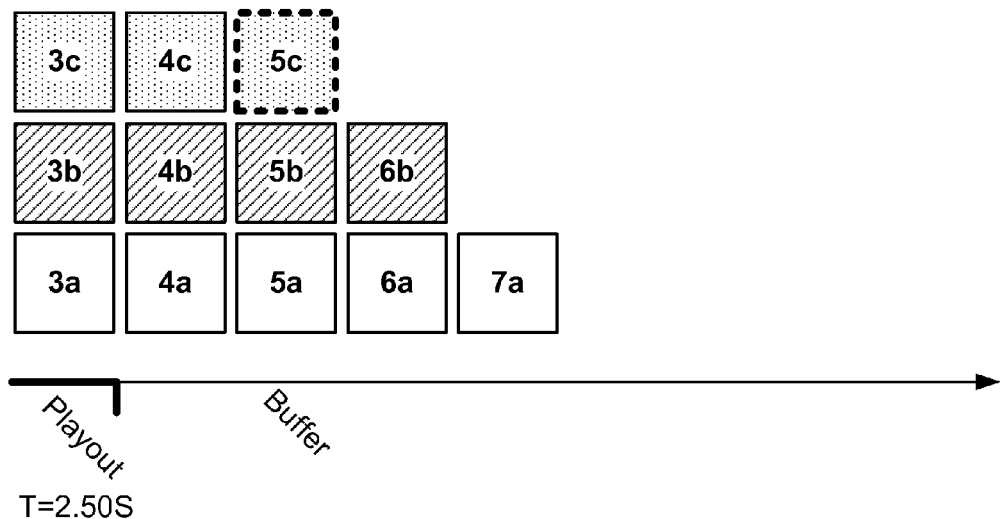
Figure 5P:
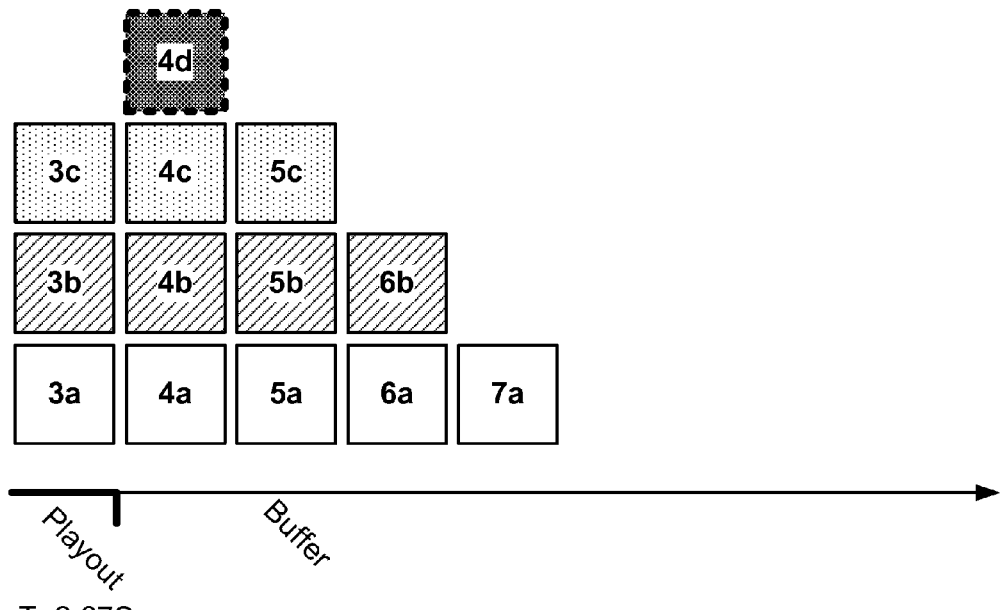
Figure 5Q:
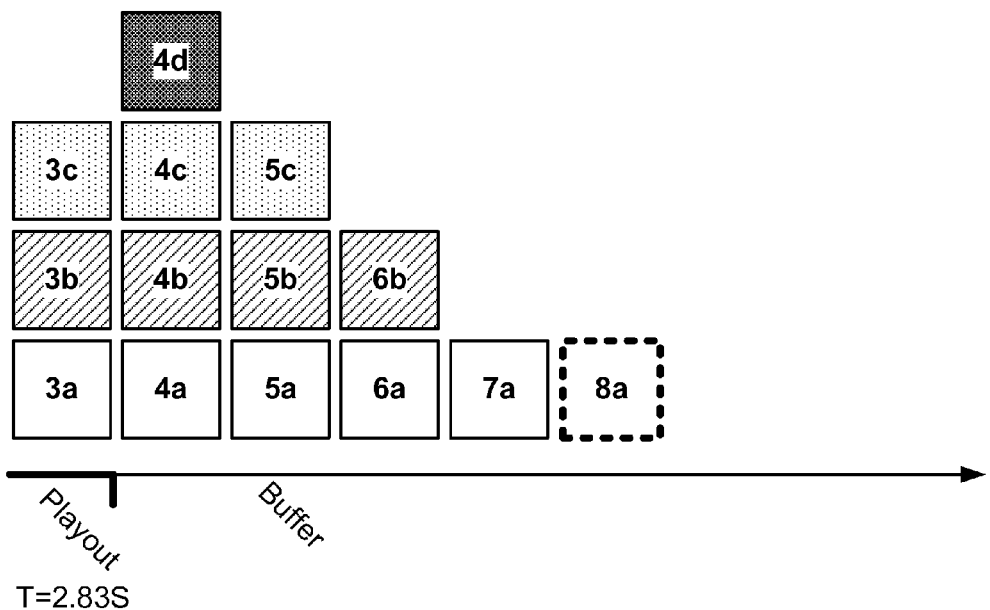
Figure 5R:
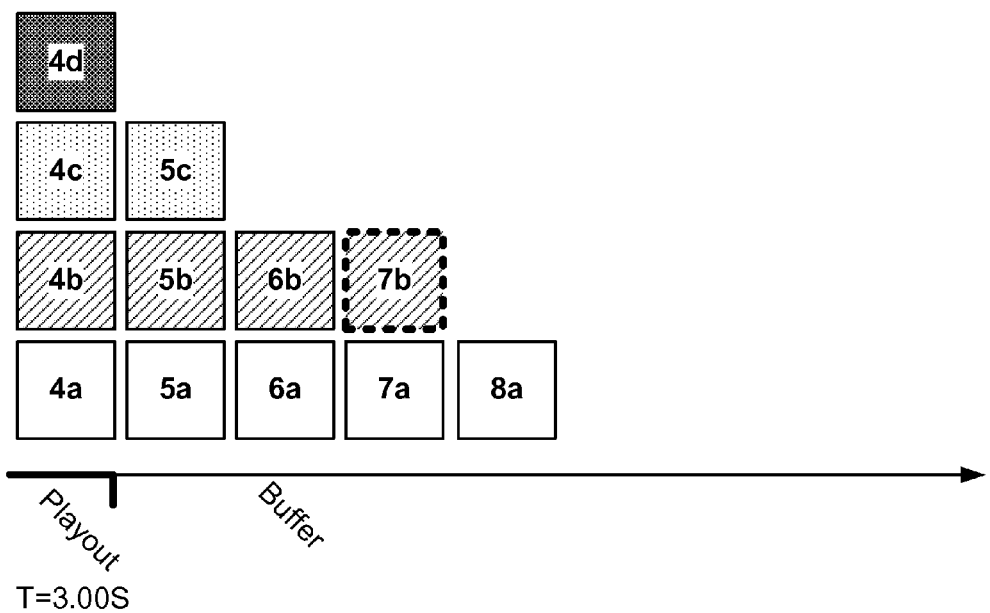
Figure 5S:
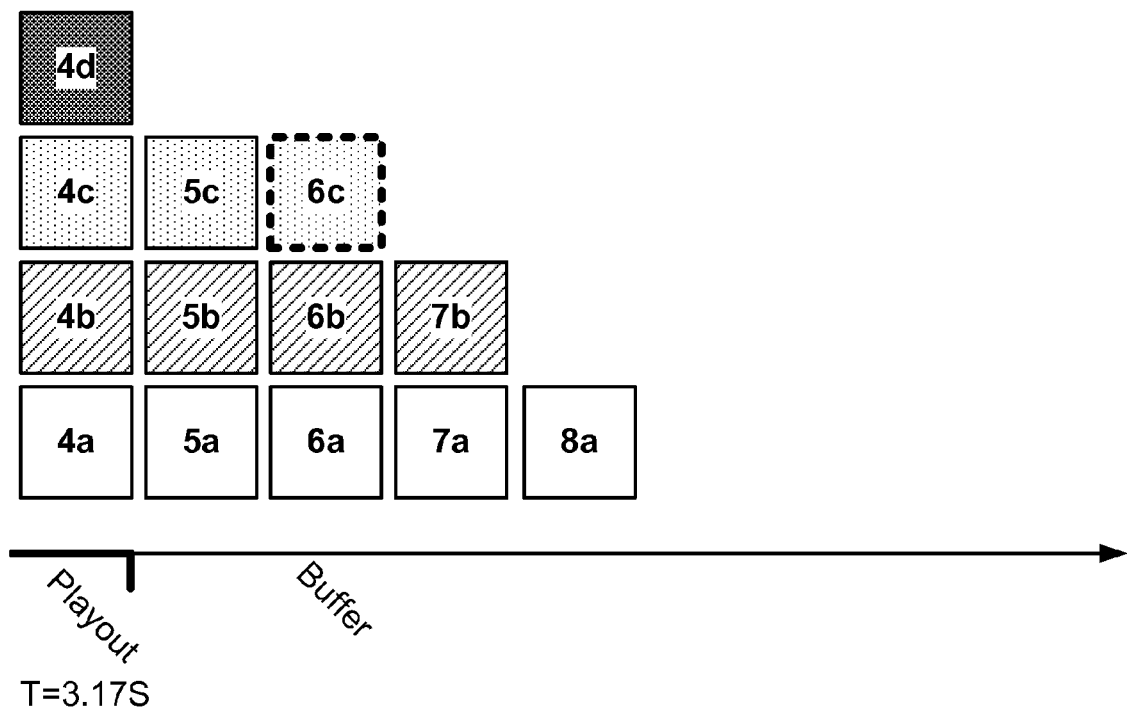

FIGS. 5A-5S illustrate downloaded layers of media intervals of a media presentation over time according to an embodiment in an startup scenario in which an available bandwidth is greater than the sum of the bandwidth requirements of all the layers and a base layer constraint, a download time constraint, an adjacent media segment layer number constraint, and an upswitch constraint are checked before downloading a layer. For illustration purposes each interval of the media presentation includes four layers, a base layer labeled "a", a first enhanced layer labeled "b", a second enhanced layer labeled "c", and a third enhanced layer labeled "d." The layers of the media presentation are each represented as being of equal bandwidth (e.g., 256 kbps each) and each media interval of the media presentation is of an equal duration (e.g., 1 second). Additionally, the network bandwidth may be a constant, such as 1.5 Mbps or 1536 Kbps, and the estimated time to download a layer may be approximately 0.1667 seconds. Using non-zero λ for faster ramp up, example λ=0.5 (using 0.0<λ<=1.0). So, C=(1−0.5)*(256 Kbps)+0.5*(1536 Kbps)=896 Kbps. E=0.286 s (K=1.0, R=0.0). Also for clarity of illustration assume that pipelining is not supported and the rtt (round trip time) for a request-reply is zero FIG. 5A illustrates that at time 0.17 seconds the base layer 1a of the first media interval may complete downloading and the first media interval may be at the play out position. The base layer 1a may have been selected for download at time 0.00 seconds because the base layer constraint was not met because the first media interval did not have a downloaded base layer.

FIG. 5B illustrates that at time 0.33 seconds the base layer 2a of the second media interval may complete downloading. The base layer 2a may have been selected for download at time 0.17 seconds because no other media interval met the base layer constraint, the download time constraint, the adjacent media segment layer number constraint, and the upswitch constraint at that time.

FIG. 5C illustrates that at time 0.50 seconds the base layer 3a of the third media interval may complete downloading. The base layer 3a may have been selected for download at time 0.33 seconds because adding a second layer to the second media interval at time 0.33 seconds may have violated the adjacent media segment layer number constraint because there would be two layers in the second interval and no layers in the third.

FIG. 5D illustrates that at time 0.67 seconds the enhanced layer 2b of the second media interval may complete downloading. The enhanced layer 2b may have been selected for download at time 0.50 seconds because adding a second layer to the second media interval at time 0.50 seconds may have met the base layer constraint, the download time constraint, the adjacent media segment layer number constraint, and the upswitch constraint.

FIG. 5E illustrates that at time 0.83 seconds the base layer 4a of the fourth media interval may complete downloading. The base layer 4a may have been selected for download at time 0.67 seconds because adding a layer to the second media interval or third media interval may have violated the adjacent media segment layer number constraint at time 0.67 seconds.

FIG. 5F illustrates that at time 1.00 seconds the enhanced layer 3b of the third media interval may complete downloading. The enhanced layer 3b may have been selected for download at time 0.83 seconds because this is the first interval past the playout position which satisfies the download time constraint, the adjacent segment layer number constraint and the upswitch constraint.

FIG. 5G illustrates that at time 1.17 seconds the base layer 5a of the fifth media interval may complete downloading. The base layer 5a may be selected for download at time 1.00 seconds because adding a layers to the third or fourth media intervals may have violated at least the adjacent media segment layer number constraint at time 1.00 seconds.

FIG. 5H illustrates that at time 1.33 seconds the enhanced layer 4b of the fourth media interval may complete downloading. The enhanced layer 4b may have been selected for download at time 1.17 seconds because this is the associated with the first interval past the playout position that met the base layer constraint, the download time constraint, the adjacent media segment layer number constraint, and the upswitch constraint.

FIG. 5I illustrates that at time 1.50 seconds the enhanced layer 3c of the third media interval may complete downloading. The enhanced layer 3c may have been selected for download because adding a third layer to the third media interval at time 1.33 seconds may have met the base layer constraint, the download time constraint, the adjacent media segment layer number constraint, and the upswitch constraint and is therefore associated with the first interval past the playout position that satisfies the constraints.

FIG. 5J illustrates that at time 1.67 seconds the base layer 6a of the sixth media interval may complete downloading. The base layer 6a may have been selected for download at time 1.50 seconds because adding a layers to the second, third, fourth, or fifth media intervals may violate at least the adjacent media segment layer number constraint at time 1.50 seconds.

FIG. 5K illustrates that at time 1.83 seconds the enhance layer 7b may complete downloading. FIG. 5L illustrates that at time 2.00 second the enhanced layer 4c may complete downloading. FIG. 5M illustrates that at time 2.17 seconds the base layer 7a may complete downloading. FIG. 5N illustrates that at time 2.33 second the enhanced layer 6b may complete downloading. FIG. 5O illustrates that at time 2.50 seconds the enhanced layer 5c may complete downloading. FIG. 5P illustrates that at time 2.67 seconds the enhanced layer 4d may complete downloading. FIG. 5Q illustrates that at time 2.83 seconds the base layer 8a may complete downloading. FIG. 5R illustrates that at time 3.00 seconds the enhanced layer 7b may complete downloading. FIG. 5S illustrates that at time 3.17 seconds the enhanced layer 6C may complete downloading. In this manner, the illustrations in FIGS. 5A-5S track the download decisions and the playout position until 3.17 seconds elapses. Each time the enhanced layer closest to the playout position that satisfies the base layer constraint, the adjacent segment layer number constraint and the upswitch constraint is downloaded. If no such enhanced layer is found, then a base layer may be added. The media presentation at the play out position may be at 1 Mbps (maximum) at a presentation time of 3.00 seconds.

A comparison of the effect of k=0.0 versus 0.0<λ<=1.0 e.g., λ=0.5 may be made at this point. λ=0.0 implies that the bandwidth estimations are not used of the download constraint to ensure network usage efficiency. 0<λ=1.0 implies that weighting on the estimated bandwidth is taken into consideration in the download time constraint. An implication of taking weighting into consideration may be faster ramp up towards the estimated bandwidth. When λ=0.0, the maximum presentation quality of 1 Mbps started for a presentation-time of 4 seconds which is the start of the interval 5a whereas for λ=0.5, the maximum presentation quality of 1 Mbps started earlier at a presentation time of 3 seconds which is the start of the interval 4a indicating faster ramp up to available bandwidth when 0.0<λ<=1.0. Another implication is that as weighting is placed on the estimated bandwidth and estimated bandwidth estimates can lag the actual network bandwidth, thus continuous monitoring of the download constraint on the current (last) downloading layer may be needed to track bandwidth decreases. Continuous monitoring may be applied such that as the playout position is approaching the start of the interval being currently downloaded the current download may be aborted unless the download is for a base layer.

Coming back to the decision made at 0.50 s, just after making the decision, suppose b/w drops to 256 kbps which is the minimum network condition. Then, the playout position will reach interval 1.0 seconds before enhanced layer 2b is completely downloaded (as download of enhanced layer 2b in this case if allowed to continue will complete when playout time reaches approximately 1.5 s). This may lead to a stall when the presentation time reaches 1.0 s should the client wait for the enhanced layer 2b to complete downloading even when the presentation time has reached the start of the interval associated with 2b. Alternatively, it may lead to network usage inefficiency should instead enhanced layer 2b be aborted and the client cannot make use of a partially downloaded chunk. Thus, when λ>0.0, the download constraint and the current playout position may be monitored at regular intervals, and during regular monitoring the download constraint may fail and the download of enhanced layer 2b may be aborted as layer 2b is an enhanced layer. The algorithm may then be triggered again immediately to select the next layer, which may point to a layer in an interval later than that associated with the interval for which the download was aborted. When λ=0.0, it may not have been possible to download an enhanced layer such that the playout position reaches the start of the layer before the layer downloads completely as long as the minimum network condition is guaranteed. This also indicates that when λ>0.0 a layer that is downloading may need to be aborted before the layer completes downloading to avoid a stall. If a client cannot make use of a partially downloaded chunk, this may result in network inefficiency as the partially downloaded layer cannot be used for playout.

FIGS. 6A-6H illustrate downloaded layers of media intervals of a media presentation over time according to an embodiment in a scenario in which the available bandwidth is greater than a minimum bandwidth requirement and less than the sum of the bandwidth requirements of all the layers and a base layer constraint, a download time constraint, an adjacent media segment layer number constraint, and an upswitch constraint are checked before downloading a layer. For illustration purposes each interval of the media presentation includes four layers, a base layer labeled "a", a first enhanced layer labeled "b", a second enhanced layer labeled "c", and a third enhanced layer labeled "d." The layers of the media presentation are each represented as being of equal bandwidth (e.g., 256 kbps each) and each media interval of the media presentation is of an equal duration (e.g., 1 second). Additionally, the network bandwidth may be a constant (e.g., 640 kbps) that is larger than the sum of the bandwidths of two layers but less than the sum of the bandwidths of three layers. The time to download a layer may be 0.4 seconds. Also, the minimum network condition is used for the download constraint. When the minimum constraint is used, it may be safe to use S>=P+E (instead of S>P+E) and this is used in the illustration. The estimated time to download E may be 1 s.

Figure 6A:
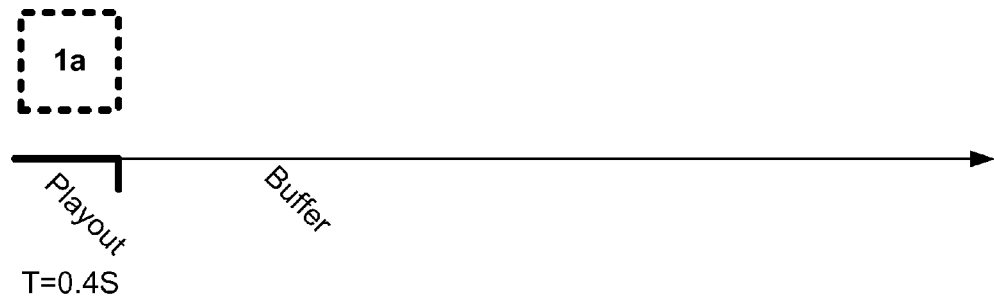
FIGS. 6A-6H illustrate downloaded layers of media intervals of a media presentation over time according to an embodiment in a scenario in which the available bandwidth is greater than a minimum bandwidth requirement and less than the sum of the bandwidth requirements of all the layers. The minimum network condition is used for the download constraint.

FIG. 6A illustrates that at time 0.4 seconds the base layer 1a of the first media interval may complete downloading and the first media interval may be at the play out position. The base layer 1a may have been selected for download at time 0.0 seconds because no other media interval met the base layer constraint, the download time constraint, the adjacent media segment layer number constraint, and the upswitch constraint.

Figure 6B:
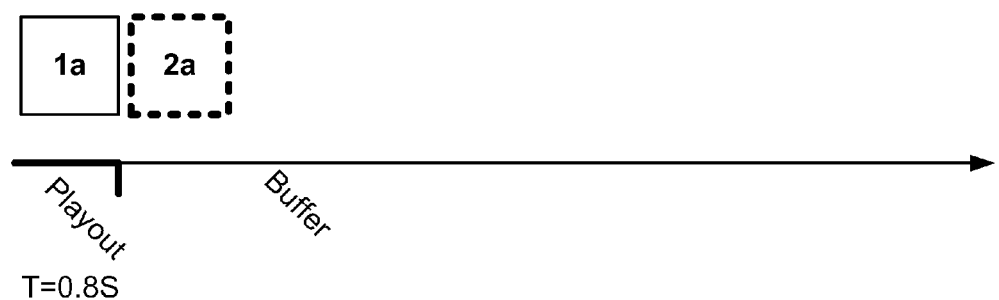

FIG. 6B illustrates that at time 0.8 seconds the base layer 2a of the second media interval may complete downloading. The base layer 2a may have been selected for download at time 0.4 seconds because no other media interval met the base layer constraint, the download time constraint, the adjacent media segment layer number constraint, and the upswitch constraint.

Figure 6C:

FIG. 6C illustrates that at time 1.2 seconds the play out point may move to the second media interval and the base layer 3a of the third media interval may complete downloading. The base layer 3a may have been selected for download at time 0.8 seconds because no other media interval met the base layer constraint, the download time constraint, the adjacent media segment layer number constraint, and the upswitch constraint.

Figure 6D:

FIG. 6D illustrates that at time 1.6 seconds the base layer 4a of the fourth media interval may complete downloading. The base layer 4a may have been selected for download at time 1.2 seconds because adding a second layer to the third media interval at time 1.2 seconds may have violated the adjacent media segment layer number constraint because there would be two layers in the third interval and no layers in the fourth.

Figure 6E:

FIG. 6E illustrates that at time 2.0 seconds the play out point may move to the third media interval and the base layer 5a of the fifth media interval may complete downloading. The base layer 5a may have been selected for download at time 1.6 seconds because adding a second layer to the fourth media interval at time 1.6 seconds may have violated the adjacent media segment layer number constraint because there would be two layers in the fourth interval and no layers in the fifth.

Figure 6F:
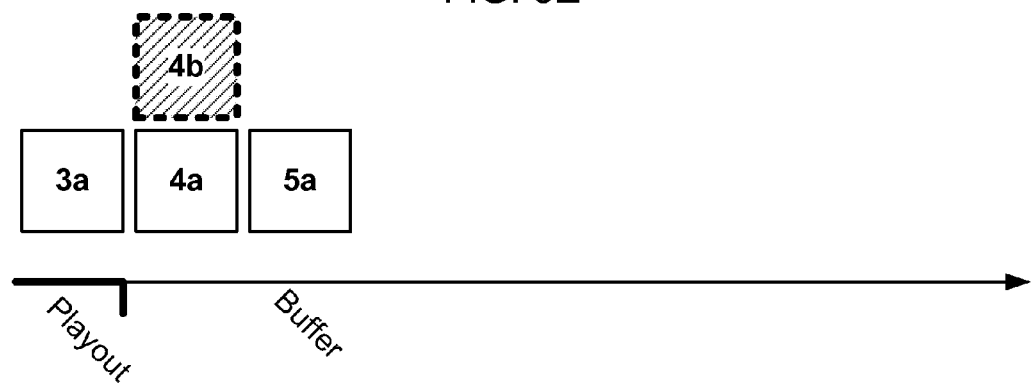

FIG. 6F illustrates that at time 2.4 seconds the enhanced layer 4b of the fourth media interval may complete downloading. The enhanced layer 4b may have been selected for download at time 2.0 seconds because adding a second layer to the fourth media interval at time 2.0 seconds may have met the base layer constraint, the download time constraint, the adjacent media segment layer number constraint, and the upswitch constraint.

Figure 6G:
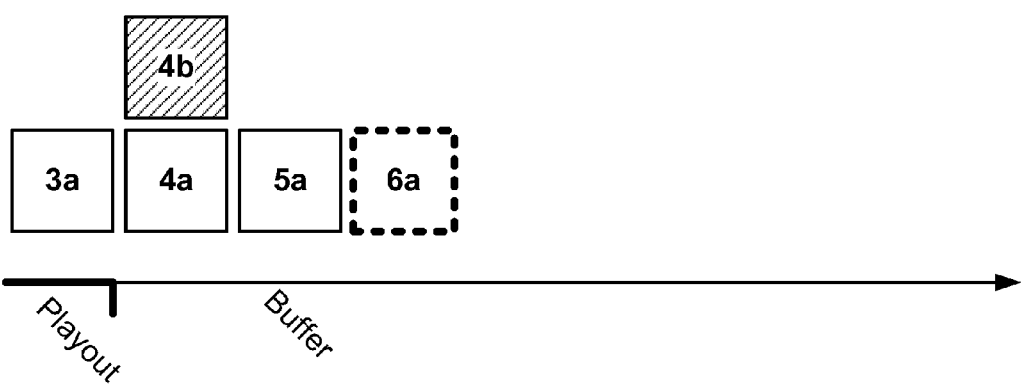

FIG. 6G illustrates that at time 2.8 seconds the base layer 6a of the sixth media interval may complete downloading. The base layer 6a may have been selected for download at time 2.4 seconds because adding a layer to the fourth media interval or fifth media interval may have violated the adjacent media segment layer number constraint at time 2.4 seconds.

Figure 6H:
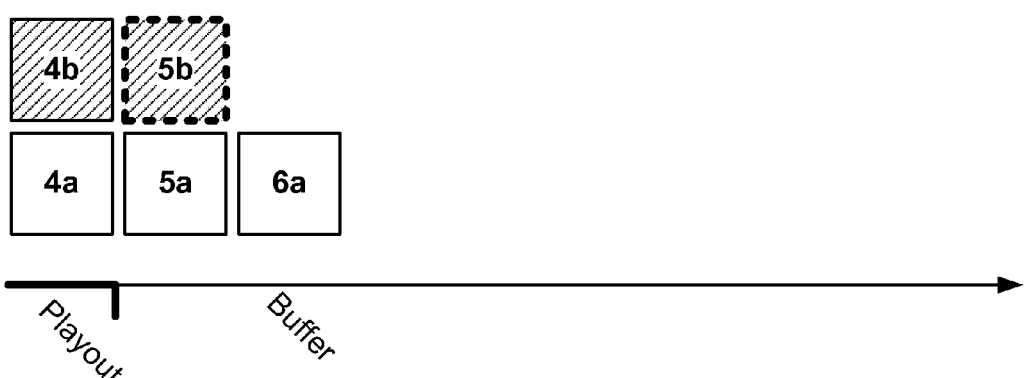

FIG. 6H illustrates that at time 3.2 seconds the play out point may move to the fourth media interval and the enhanced layer 5b of the fifth media interval may complete downloading. The enhanced layer 5b may have been selected for download at time 2.8 seconds because adding a second layer to the fifth media interval at time 2.8 seconds may have met the base layer constraint, the download time constraint, the adjacent media segment layer number constraint, and the upswitch constraint. At time 3.2 seconds the media presentation may reach a steady state of two layers per media interval because adding a third layer would fail at least the download time constraint for any interval.

FIGS. 7A-7E illustrate downloaded layers of media intervals of a media presentation over time according to an embodiment in a scenario in which there is an abrupt bandwidth drop to a minimum network condition from a steady state in which the available bandwidth was greater than the sum of the bandwidth requirements of all the layers and a base layer constraint, a download time constraint, an adjacent media segment layer number constraint, and an upswitch constraint are checked before downloading a layer. For illustration purposes each interval of the media presentation includes four layers, a base layer labeled "a", a first enhanced layer labeled "b", a second enhanced layer labeled "c", and a third enhanced layer labeled "d." The layers of the media presentation are each represented as being of equal bandwidth (e.g., 256 kbps each) and each media interval of the media presentation is of an equal duration (e.g., 1 second). The network bandwidth may be a constant (e.g., 1 mbps) until after 5.8 seconds in play out when the network bandwidth may drop to a minimum network condition (e.g., to 256 kbps). The time to download a layer may be 1.0 seconds at 256 kbps. FIGS. 7A-7E illustrate how in an embodiment an abrupt bandwidth decrease may be dampened to minimum condition without needing to make any tradeoff of stall versus wasted data. This also may give time for the bandwidth to recover from an abrupt decrease by decreasing to minimum playout quality slowly.

Figure 7A:
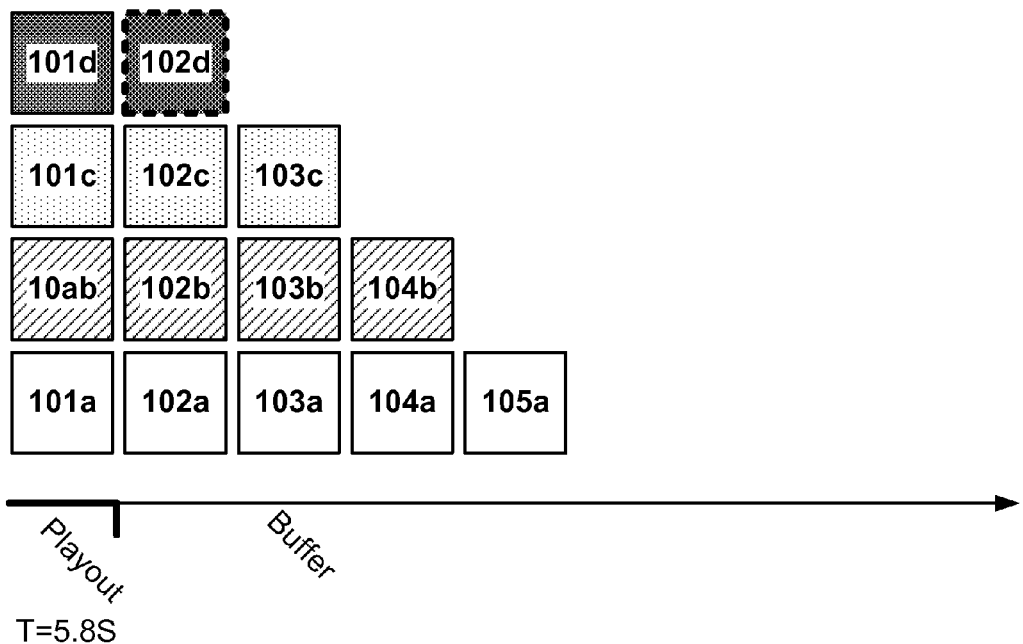
FIGS. 7A-7E illustrate downloaded layers of media intervals of a media presentation over time according to an embodiment in a scenario in which there is an abrupt bandwidth drop to a minimum network condition from a steady state in which the available bandwidth was greater than the sum of the bandwidth requirements of all the layers. The minimum network condition is used for the download constraint.

FIG. 7A illustrates that at time 5.8 seconds, when the network bandwidth is 1 mbps, the play out point may be at interval 101 and the enhanced layer 102d of media interval 102 may complete downloading. The enhanced layer 102d may have be selected for download because adding a fourth layer to media interval 102 at time a time prior to 5.8 seconds may have met the base layer constraint, the download time constraint, the adjacent media segment layer number constraint, and the upswitch constraint.

Figure 7B:
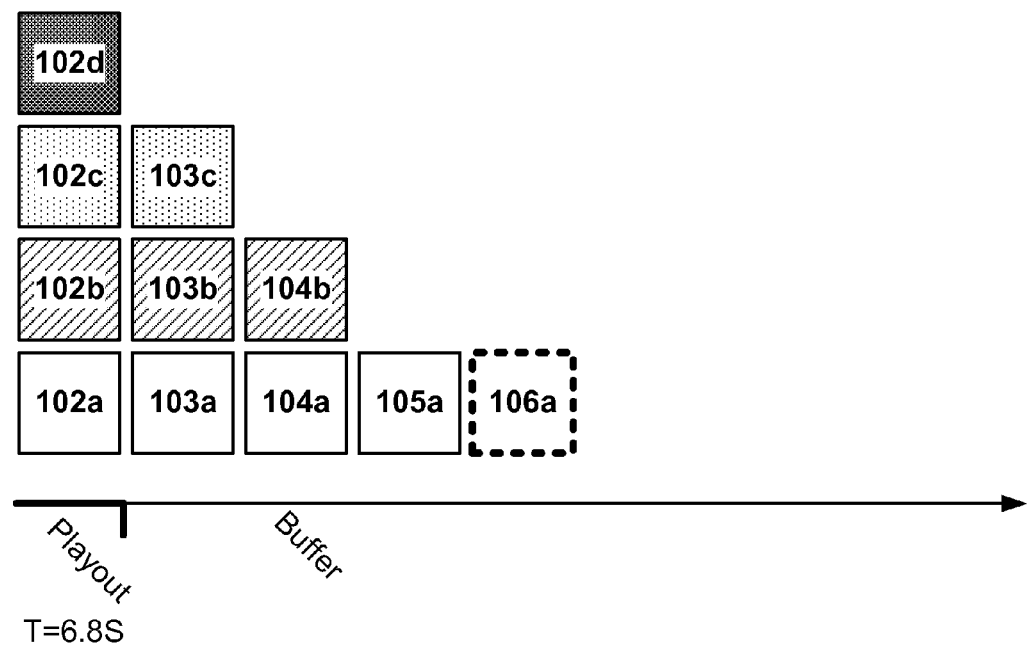

FIG. 7B illustrates that at time 6.8 seconds, when the network bandwidth may have fallen to 256 kbps, the play out point may move to media interval 102 and the base layer 106a of media interval 106 may complete downloading. The base layer 106a may have been selected for download at time 5.8 seconds because no other media interval met the base layer constraint, the download time constraint, the adjacent media segment layer number constraint, and the upswitch constraint.

Figure 7C:
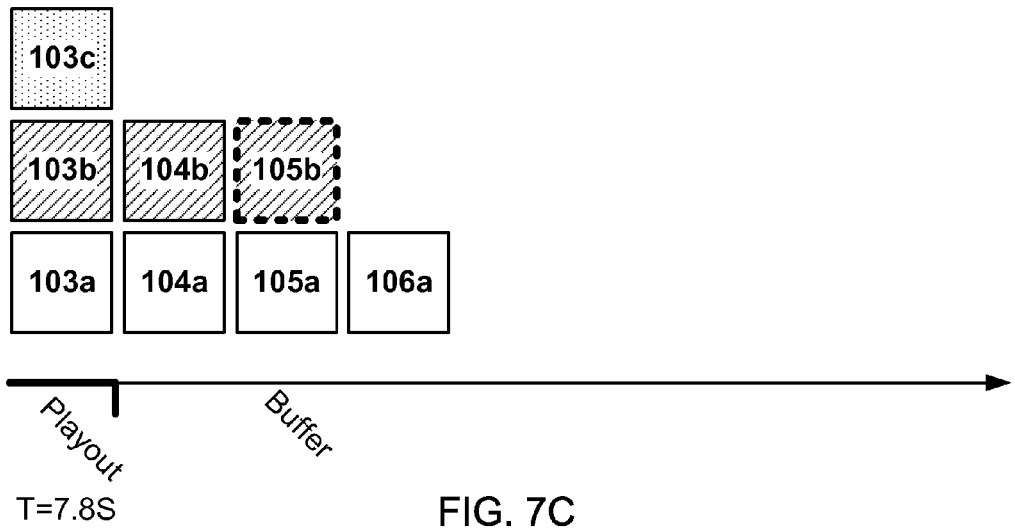

FIG. 7C illustrates that at time 7.8 seconds the play out point may move to media interval 103 and the enhanced layer 105b of media interval 105 may complete downloading. While the overall bandwidth may not support sustaining two layers for the long term, at time 6.8 seconds the base layer constraint, the download time constraint, the adjacent media segment layer number constraint, and the upswitch constraint may all have been met because the quality would not have been increased in interval 105 over the quality in interval 104.

Figure 7D:
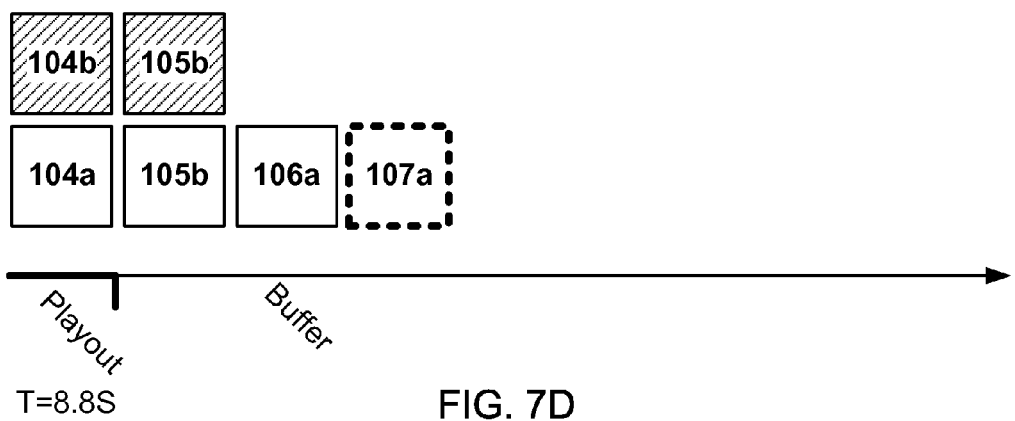

FIG. 7D illustrates that at time 8.8 seconds the play out point may move to media interval 104 and the base layer 107a of media interval 107 may complete downloading. The base layer 107a may have been selected for download at time 7.8 seconds because no other media interval met the base layer constraint, the download time constraint, the adjacent media segment layer number constraint, and the upswitch constraint.

Figure 7E:
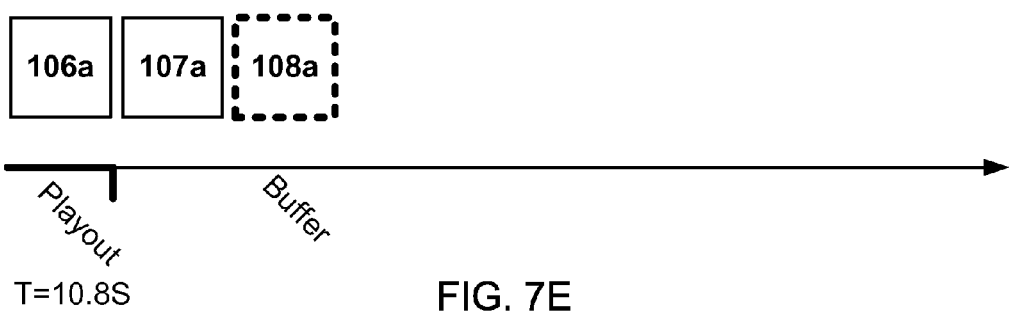

FIG. 7E illustrates that at time 10.8 seconds the play out point may move to media interval 106 and the base layer 108a of media interval 108 may complete downloading. The base layer 108a may have been selected for download at time 8.8 seconds because no other media interval met the base layer constraint, the download time constraint, the adjacent media segment layer number constraint, and the upswitch constraint.

FIGS. 8A-8K illustrate downloaded layers of media intervals of a media presentation over time according to an embodiment in a scenario a low steady state bandwidth is followed by an abrupt increase in bandwidth and a base layer constraint, a download time constraint, an adjacent media segment layer number constraint, and an upswitch constraint are checked before downloading a layer. For illustration purposes each interval of the media presentation includes four layers, a base layer labeled "a", a first enhanced layer labeled "b", a second enhanced layer labeled "c", and a third enhanced layer labeled "d." The layers of the media presentation are each represented as being of equal bandwidth (e.g., 256 kbps each) and each media interval of the media presentation is of an equal duration (e.g., 1 second). The network bandwidth may be at a steady state (e.g., 320 kbps) until after 80.00 seconds in play out when the network bandwidth may jump to a higher bandwidth (e.g., to 5 Mbps). The time to download a layer may be 0.05 seconds at 5 Mbps.

Figure 8A:
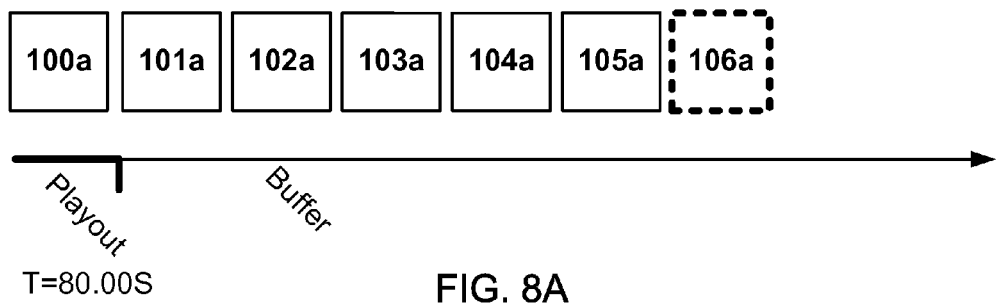

FIG. 8A illustrates that at time 80.00 seconds, when the network bandwidth may be 320 kbps, the play out point may be at interval 100 and the base layer 106a of media interval 106 may complete downloading. The base layer 106a may have been selected for download at a time prior to 80.00 seconds because no other media interval met the base layer constraint, the download time constraint, the adjacent media segment layer number constraint, and the upswitch constraint. At time 80.00 seconds the network bandwidth may climb to 4 mbps.

Figure 8B:
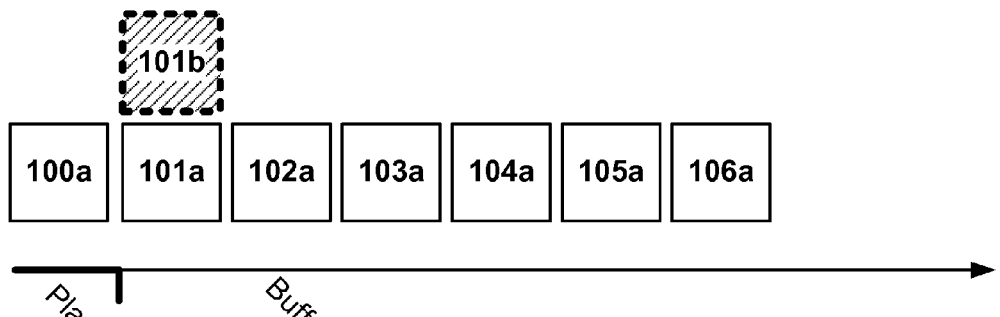

FIG. 8B illustrates that at time 80.05 seconds, when the network bandwidth may have climbed to 4 mbps, the play out point may remain at media interval 100 and enhanced layer 101b may complete downloading. The enhanced layer 101b may have been selected for download at time 80.00 seconds because adding a second layer to media interval 101 at time 80.00 seconds may meet the base layer constraint, the download time constraint, the adjacent media segment layer number constraint, and the upswitch constraint because of the increased bandwidth.

Figure 8C:
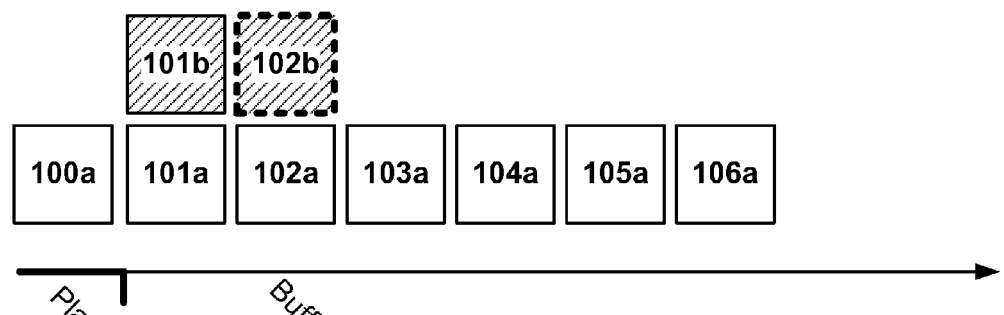

FIG. 8C illustrates that at time 80.10 seconds the enhanced layer 102b may complete downloading. The enhanced layer 102b may have been selected for download at time 80.05 seconds because adding a second layer to media interval 102 at time 80.05 seconds may have met the base layer constraint, the download time constraint, the adjacent media segment layer number constraint, and the upswitch constraint.

Figure 8D:
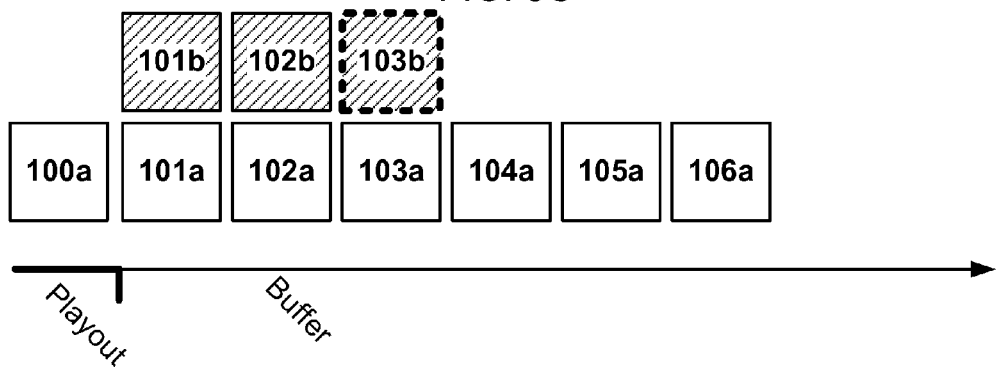

FIG. 8D illustrates that at time 80.15 seconds the enhanced layer 103b may complete downloading. The enhanced layer 103b may have been selected for download at time 80.10 seconds because adding a second layer to media interval 103 at time 80.10 seconds may have met the base layer constraint, the download time constraint, the adjacent media segment layer number constraint, and the upswitch constraint.

FIG. 8E illustrates that at time 80.20 seconds the enhanced layer 102c may complete downloading. The enhanced layer 102c may have been selected for download at time 80.15 seconds because adding a third layer to media interval 102 at time 80.15 seconds may have met the base layer constraint, the download time constraint, the adjacent media segment layer number constraint, and the upswitch constraint.

FIG. 8F illustrates that at time 80.25 seconds the enhanced layer 104b may complete downloading. The enhanced layer 104b may have been selected for download at time 80.20 seconds because adding a second layer to media interval 104 at time 80.20 seconds may have met the base layer constraint, the download time constraint, the adjacent media segment layer number constraint, and the upswitch constraint.

FIG. 8G illustrates that at time 80.30 seconds the enhanced layer 103c may complete downloading. The enhanced layer 103c may have been selected for download at time 80.25 seconds because adding a third layer to media interval 103 at time 80.25 seconds may have met the base layer constraint, the download time constraint, the adjacent media segment layer number constraint, and the upswitch constraint.

Figure 8H:
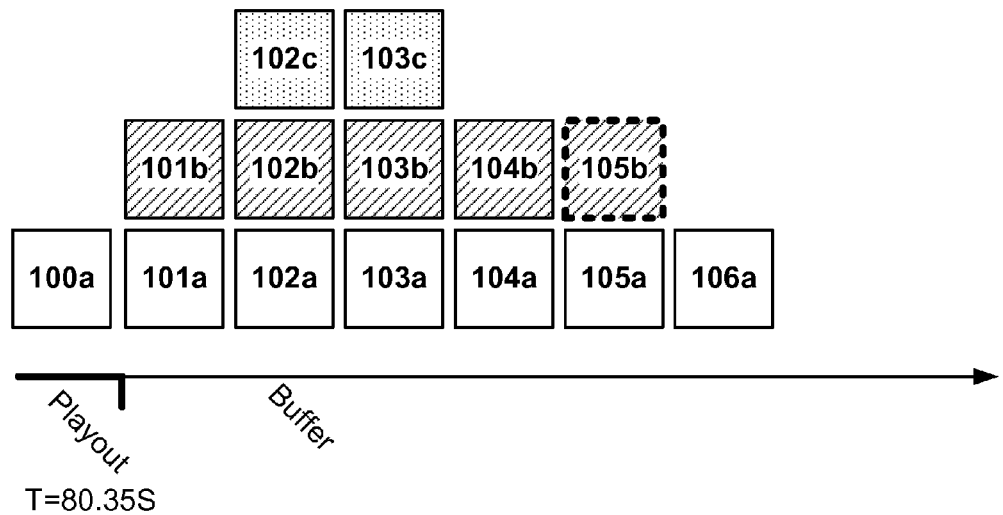

FIG. 8H illustrates that at time 80.35 seconds the enhanced layer 105b may complete downloading. The enhanced layer 105b may have been selected for download at time 80.30 seconds because adding a second layer to media interval 105 at time 80.30 seconds may have met the base layer constraint, the download time constraint, the adjacent media segment layer number constraint, and the upswitch constraint.

Figure 8I:
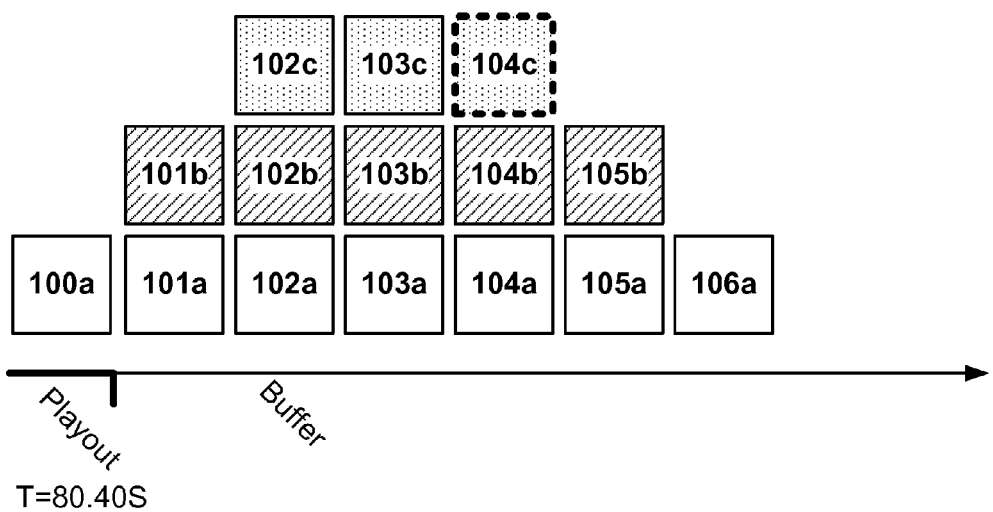

FIG. 8I illustrates that at time 80.40 seconds the enhanced layer 104c may complete downloading. The enhanced layer 104c may have been selected for download at time 80.30 seconds because adding a third layer to media interval 104 at time 80.35 seconds may have met the base layer constraint, the download time constraint, the adjacent media segment layer number constraint, and the upswitch constraint.

Figure 8J:
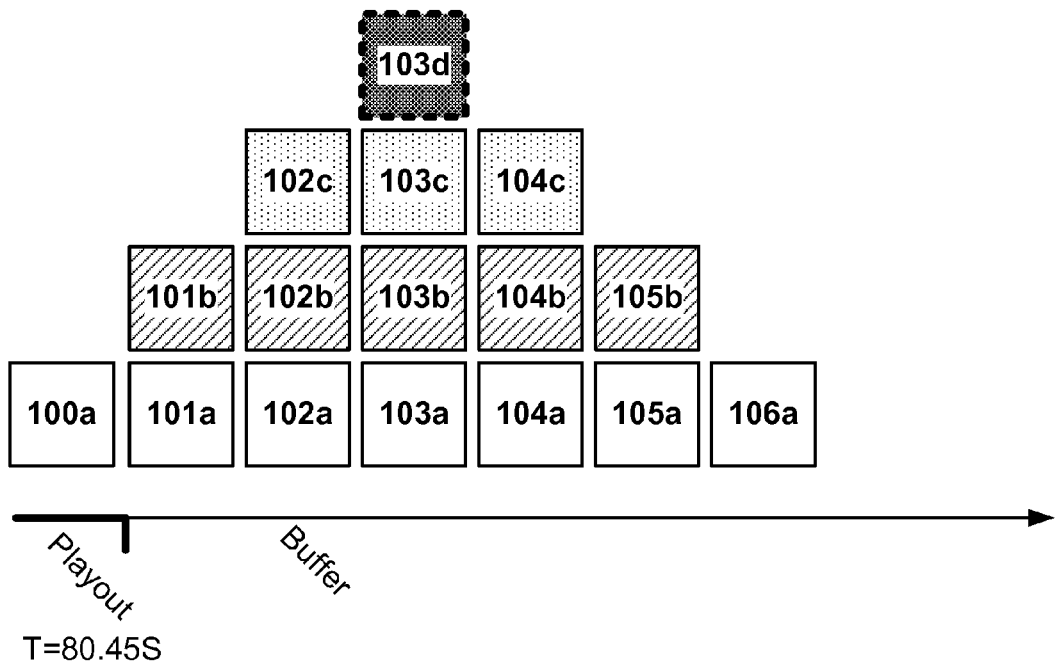

FIG. 8J illustrates that at time 80.45 seconds the enhanced layer 103d may complete downloading. The enhanced layer 103d may have been selected for download at time 80.40 because adding a fourth layer to media interval 103 at time 80.40 seconds may have met the base layer constraint, the download time constraint, the adjacent media segment layer number constraint, and the upswitch constraint.

Figure 8K:
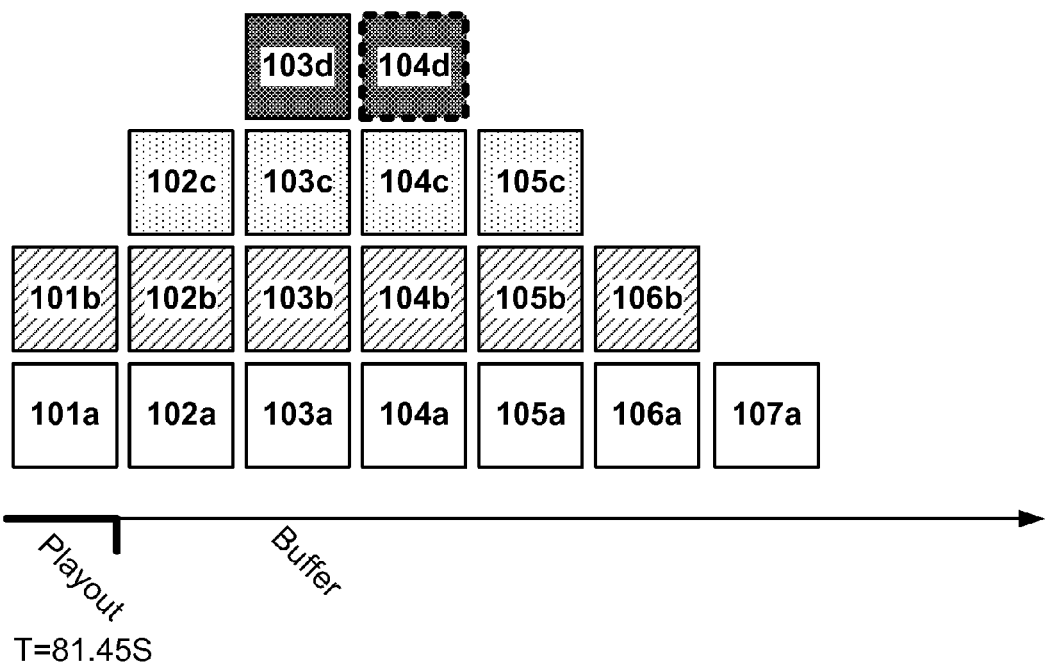

FIG. 8K illustrates that at time 81.45 seconds the play out point may move to media interval 101 and the enhanced layer 104d may complete downloading. The enhanced layer 104d may have been selected for download at time 81.40 seconds because adding a fourth layer to media interval 104 at time 81.40 seconds may meet the base layer constraint, the download time constraint, the adjacent media segment layer number constraint, and the upswitch constraint. The download of layers may continue similarly while the bandwidth remains at 4 mbps and eventually all intervals may be able to be played out at the maximum possible quality as all layers may be received prior to play out.

FIGS. 9A-9G illustrate effects of an embodiment smoothener on the download of layers of media intervals of a media presentation over time under fluctuating network conditions. FIGS. 9A-9G illustrate downloaded layers of media intervals of a media presentation over time in a scenario in which a steady state bandwidth of 768 kbps jumps to 2.5 mbps for one second, then decreases to 0 kbps for four seconds, then jumps to 2.5 mbps for two seconds, before returning to steady state at 768 kbps and the impact of checking a download time constraint, an adjacent media segment layer number constraint, and an upswitch constraint, as well as optionally a smoothing constraint, before downloading a layer. In FIGS. 9A-9G the smoothening time period may be 10 seconds. For illustration purposes each interval of the media presentation includes four layers, a base layer labeled "a", a first enhanced layer labeled "b", a second enhanced layer labeled "c", and a third enhanced layer labeled "d." The layers of the media presentation are each represented as being of equal bandwidth (e.g., 256 kbps each) and each media interval of the media presentation is of an equal duration (e.g., 1 second). $\lambda=0.5$ so that $E=0.18$ s. The download constraint succeeds if $S>P+0.18$.

Figure 9A:
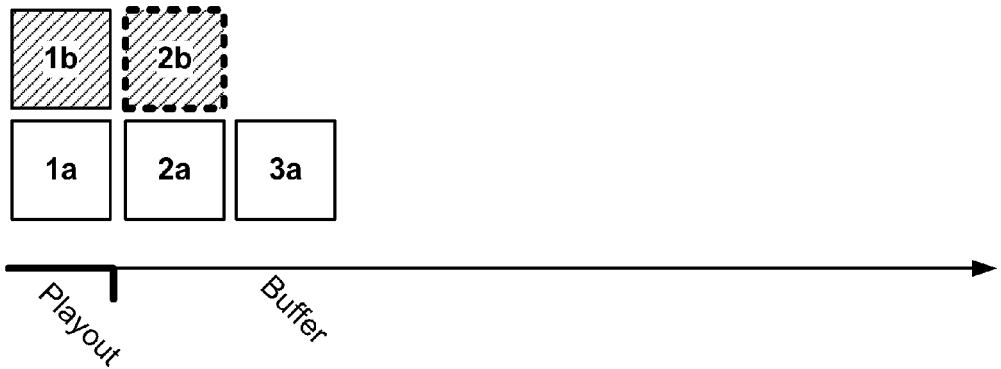
FIGS. 9A-9G illustrate effects of an embodiment smoothener on the download of layers of media intervals of a media presentation over time under fluctuating network conditions.

FIG. 9A illustrates that at time t seconds, when the network bandwidth has been at a steady state of 768 kbps, the play out point may be at interval 1 and the enhanced layer 2b of media interval 2 may complete downloading. The enhanced layer 2b may have been selected for download because adding a second layer to media interval 2 at time t seconds may have met the base layer constraint, the download time constraint, the adjacent media segment layer number constraint, and the upswitch constraint prior to time t seconds. At time t the network bandwidth may jump to 2.5 mbps.

Figure 9B:
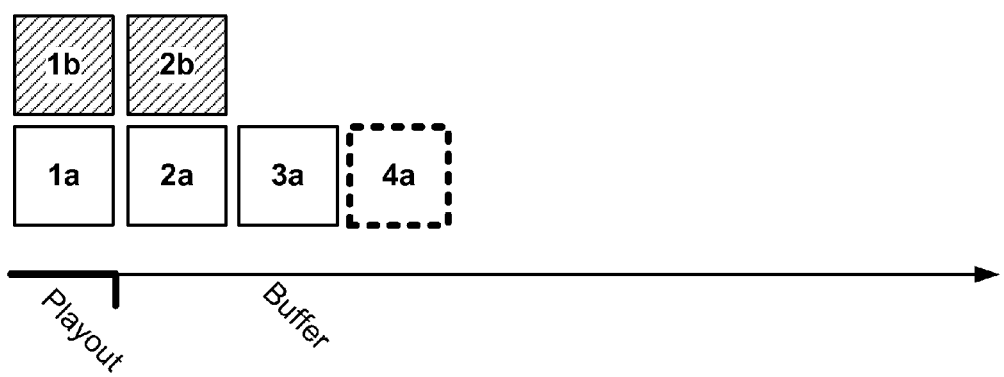

FIG. 9B illustrates that at time t+0.1 seconds, when the network bandwidth has jumped to 2.5 mbps, the play out point may be at interval 1 and the base layer 4a of media interval 4 may complete downloading. The base layer 4a may have been selected for download at time t seconds because no other media interval met the base layer constraint, the download time constraint, the adjacent media segment layer number constraint, and the upswitch constraint at time t seconds.

Figure 9C:
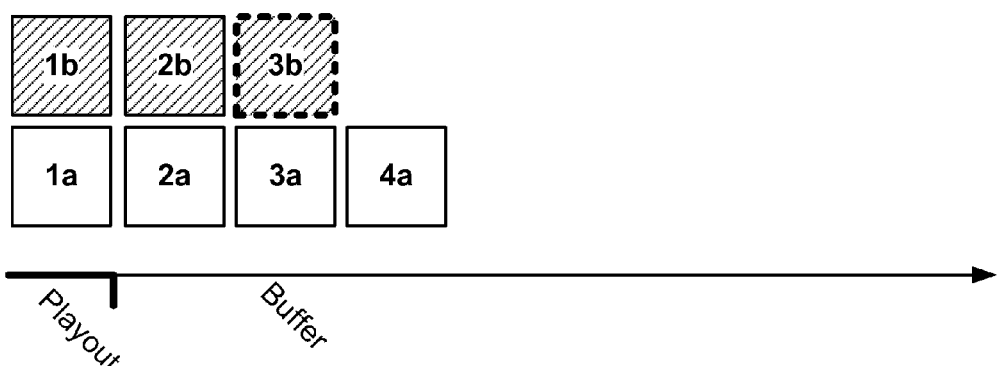

FIG. 9C illustrates that at time t+0.2 seconds and the enhanced layer 3b of media interval 3 may complete downloading. The enhanced layer 3b may have been selected for download at time t+0.1 seconds because adding a second layer to media interval 3 at time t+0.1 seconds may have met the base layer constraint, the download time constraint, the adjacent media segment layer number constraint, and the upswitch constraint.

Figure 9D:
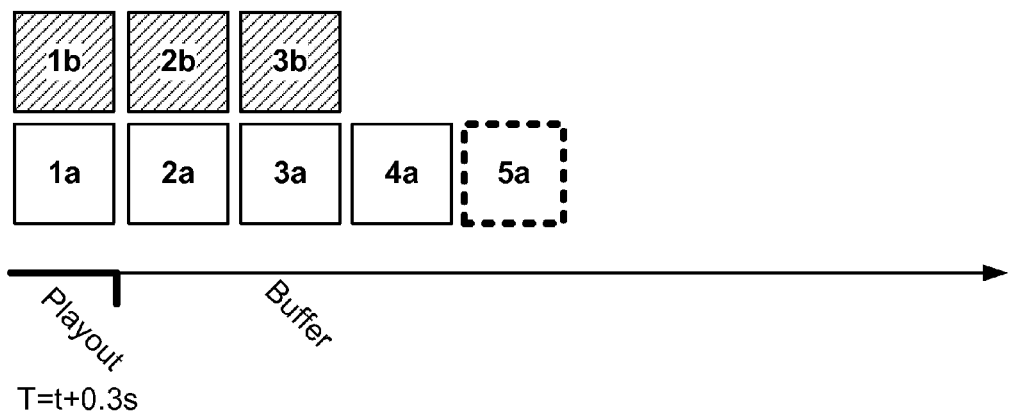
Figure 9D:
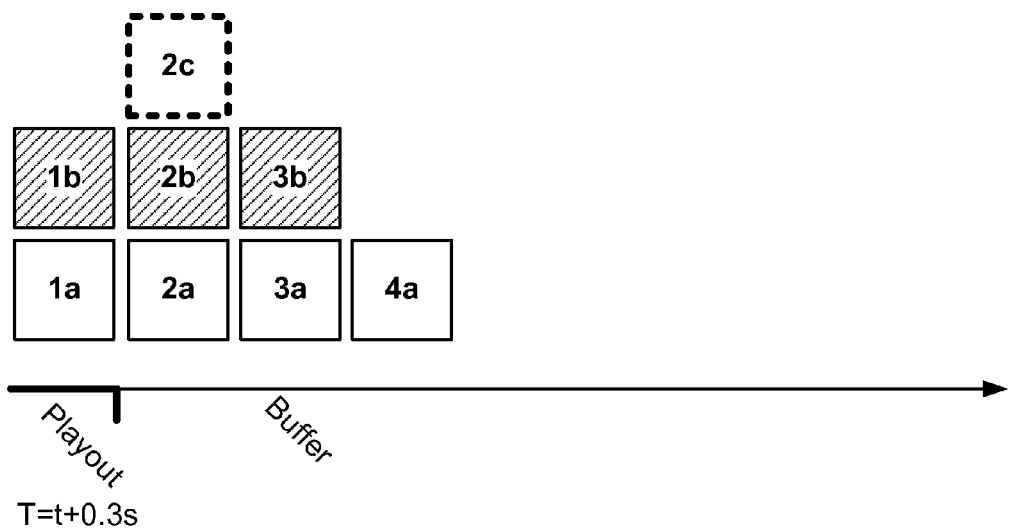

FIG. 9D illustrates the difference in selecting layers to download when a smoothener was on and off prior to time t+0.3 seconds. When a smoothener was on the base layer 5a of media interval 5 may complete downloading at time t+0.3 seconds. The base layer 5a may have been selected for download because no other media interval met the base layer constraint, the download time constraint, the adjacent media segment layer number constraint, the upswitch constraint, and the smoothing constraint at the time prior to t+0.3 seconds. When a smoothener was off the enhanced layer 2c of media interval 2 may complete downloading at time t+0.3 seconds. The enhanced layer 2c may have been selected for download because adding a third layer to media interval 2 at a time prior to t+0.3 seconds may have met the base layer constraint, the download time constraint, the adjacent media segment layer number constraint, and the upswitch constraint, while the smoothing constraint may not have been checked because the smoothener was off.

Figure 9E:
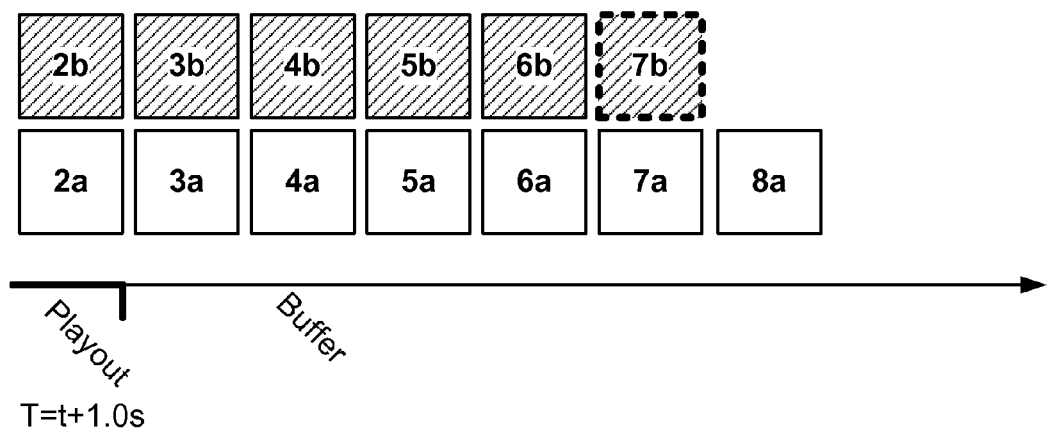
Figure 9E:
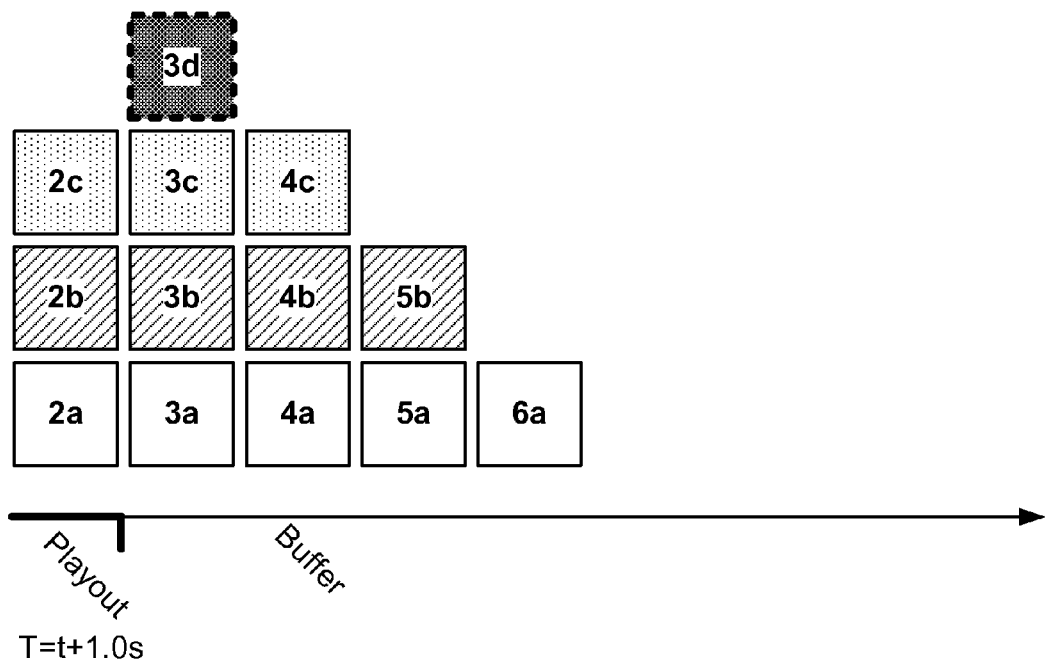

FIG. 9E illustrates the difference in selecting layers to download when a smoothener was on and off prior to time t+1.0 seconds. When a smoothener was on, the enhanced layer 7b of media interval 7 may complete downloading at time t+1.0 seconds. The enhanced layer 7b may have been selected for download because adding a second layer to interval 7 met the base layer constraint, the download time constraint, the adjacent media segment layer number constraint, the upswitch constraint, and the smoothing constraint at a time prior to t+1.0 seconds. When a smoothener was off, the enhanced layer 3d of media interval 3 may complete downloading at time t+1.0 seconds. The enhanced layer 3d may have been selected for download because adding a fourth layer to media interval 3 at a time prior to t+1.0 seconds may have met the base layer constraint, the download time constraint, the adjacent media segment layer number constraint, and the upswitch constraint, while the smoothing constraint may not have been checked because the smoothener was off.

Figure 9F:
Figure 9F:
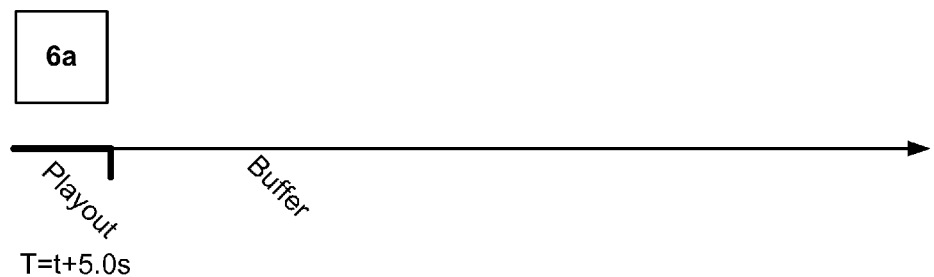

FIG. 9F illustrates the difference in selecting layers to download when a smoothener is on and off at time t+5.0 seconds when there has been a bandwidth of 0 kbps for four seconds and the play out point reaches media interval 6 without more layers downloaded due to zero bandwidth.

Figure 9G:
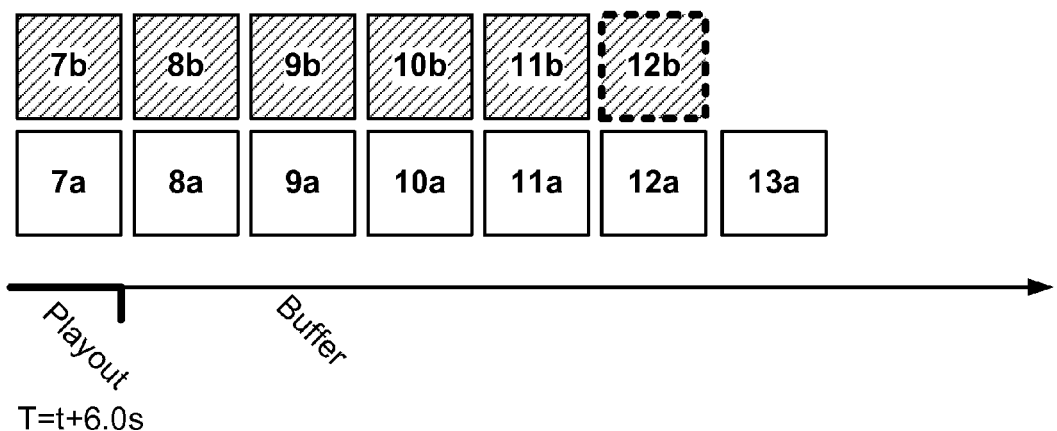
Figure 9G:
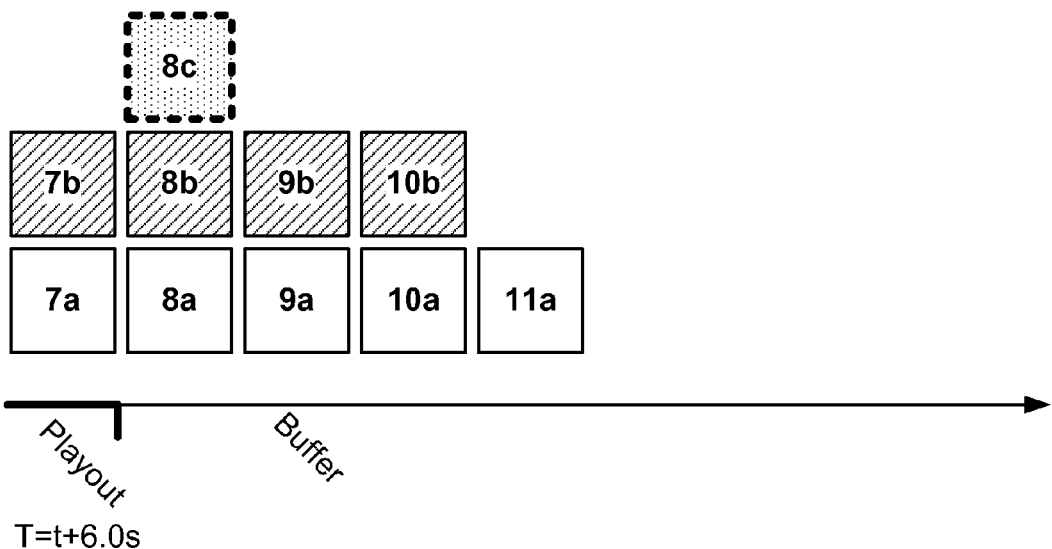

The bandwidth may jump to 2.5 mbps at time t+5.0 seconds. FIG. 9G illustrates the difference in selecting layers to download when a smoothener is on and off at a time prior to t+6.0 seconds after the bandwidth has jumped to 2.5 mbps and the play out point is at media interval 7. When a smoothener was on, the enhanced layer 12b of media interval 12 may compete downloading at time t+6.0 seconds. The enhanced layer 12b may have been selected for download because adding a second layer to interval 12 met the base layer constraint, the download time constraint, the adjacent media segment layer number constraint, the upswitch constraint, and the smoothing constraint at a time prior to t+6.0 seconds. When a smoothener was off, the enhanced layer 8c of media interval 8 may complete downloading at time t+6.0 seconds. The enhanced layer 8c may have been selected for download because adding a fourth layer to media interval 8 at a time prior to t+6.0 seconds may have met the base layer constraint, the download time constraint, the adjacent media segment layer number constraint, and the upswitch constraint, while the smoothing constraint may not have been checked because the smoothener was off.

Even though the illustrations in FIGS. 4A-4S, 5A-5S, 6, 7A-7E, 8A-8K, and 9A-9G above depict playout starting as soon as data download starts, that is for clarity of illustration of the algorithm behavior only. In practice, most streaming applications may have special behavior to account for network variation and jitter. This special behavior may be termed as accumulating pre-roll or buffering, where the pre-roll is the duration of media which should be buffered before playout starts. This special behavior may occur in the middle of playback as well when, due to adverse network conditions, the amount of buffered media data has fallen below a threshold. This may be referred to as re-buffering or re-accumulating pre-roll in the middle of playback. While buffering or re-buffering, the playout position may not advance. The download-constraint while buffering or re-buffering may be referred to as download-constraint-while-buffering, which may be satisfied if the estimated time of download of the layer plus the amount of time elapsed since the start of buffering at startup (or re-buffering during playback) is earlier than the maximum desired startup latency.

Once playout starts, the earliest presentation time for which a layer may be downloaded past the playout position may depend on λ. If λ=0.0, then an enhanced layer in the next interval may not be downloaded. If 0.0<λ<=1.0, an enhanced layer may not be downloaded in the next interval if the value of λ and the estimated bandwidth may cause the download-constraint-while-buffering constraint to not be satisfied for an enhanced layer in the second interval.

The following example rules while accumulating pre-roll may help preventing unnecessary downswitches at startup when playout starts and also prioritize accumulating pre-roll: Buffering-rule 1—Do not download an enhanced layer until sufficient number of base layers have been downloaded such that pre-roll is satisfied; Buffering-rule 2—Number of layers in the first interval <=Number of layers in second interval, meaning the number of layers in the first interval may not exceed number of layers in the second interval; and Buffering-rule 3—When determining whether an enhanced layer(j) may be downloaded (j=0, 1, 2, 3 where 0 is base layer) on the second interval apply the download-constraint-while-buffering for layer j on both first and second interval so that the two layers may complete downloading before the max-desired-startup latency elapses. Playout may start before the maximum-desired startup latency has elapsed if the upswitch constraint would not allow another enhanced layer on the first interval.

When, for example due to adverse conditions, the available bandwidth falls below the minimum network condition for a sufficiently long time such that the amount of media buffer has fallen below a threshold and playout stalls, the same rules discussed above may be applied for re-buffering. The interval associated with the playout position may be considered Interval 1 mentioned above and the second interval (Interval 2) would be the one following the playout position.

FIGS. 10, 11A-11C, and 12A-12I illustrate downloaded layers of media intervals of a media presentation in start up scenarios with different bandwidths. FIGS. 10, 11A-11C, and 12A-12I illustrate downloaded layers of media intervals of a media presentation in which a base layer constraint, a download-time-constraint-while-buffering, an adjacent media segment layer number constraint, and an upswitch constraint are checked before downloading a layer during start up or while re-buffering (re-accumulating pre-roll) in the middle of playback. In FIGS. 10, 11A-11C, and 12A-12I the client may have a maximum desired start up latency of 3.0 seconds which may be the amount of time that the client may be configured to wait before starting play out (e.g., beginning to consume for processing and rendering) of downloaded data. The client may also have a pre-roll duration of 4.0 seconds which may be the duration of media-data that must be accumulated before play out may start and the pre-roll duration may be a hard constraint taking precedence over the maximum desired start up latency. For illustration purposes each interval of the media presentation includes four layers, a base layer labeled "a", a first enhanced layer labeled "b", a second enhanced layer labeled "c", and a third enhanced layer labeled "d." The layers of the media presentation are each represented as being of equal bandwidth (e.g., 256 kbps each) and each media interval of the media presentation is of an equal duration (e.g., 1 second).

Figure 10:
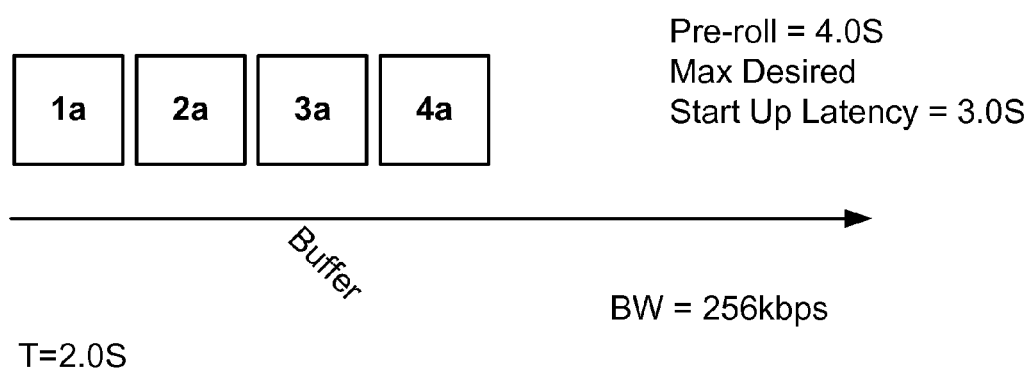
FIGS. 10, 11A-11C, and 12A-12I illustrate downloaded layers of media intervals of a media presentation in start up scenarios with different bandwidths.

FIG. 10 illustrates a scenario in which the network bandwidth may be 256 kbps at start up. After 4.0 seconds elapses from the starting download of the first interval, the play out may start at the first interval because the pre-roll duration of 4.0 seconds is met after 4.0 seconds elapsed. Due to buffering-rule 1, only base layers were downloaded because of the priority to accumulate pre-roll and satisfy the hard constraint after which the maximum desired startup latency elapsed and playout starts. The elapsed time to reach the pre-roll duration may be 4.0 seconds which may exceed the maximum desired start up latency of 3 seconds.

Figure 11A:
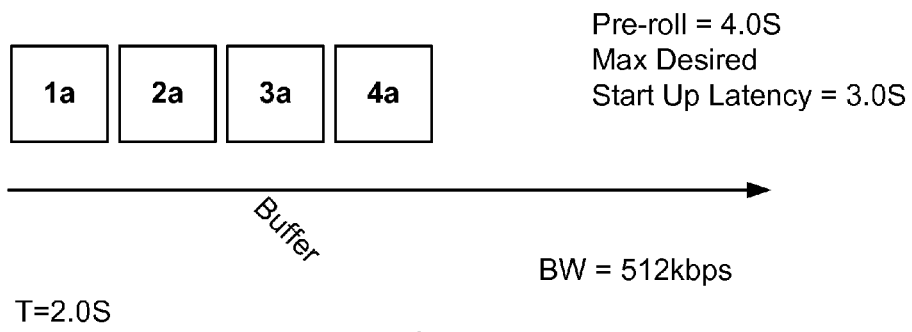
Figure 11B:
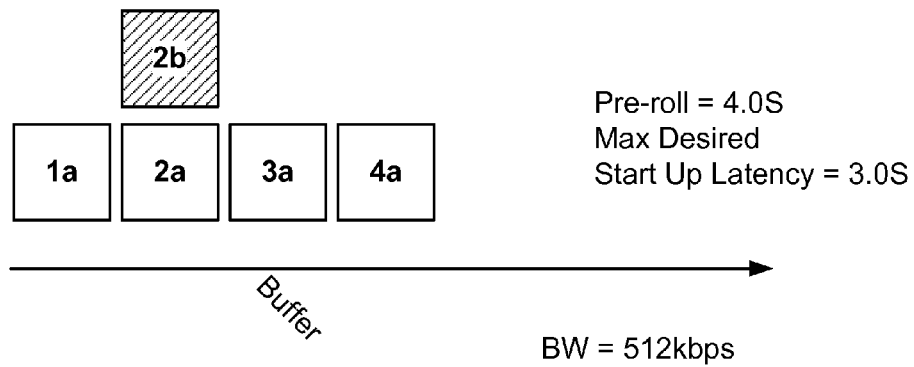
Figure 11C:
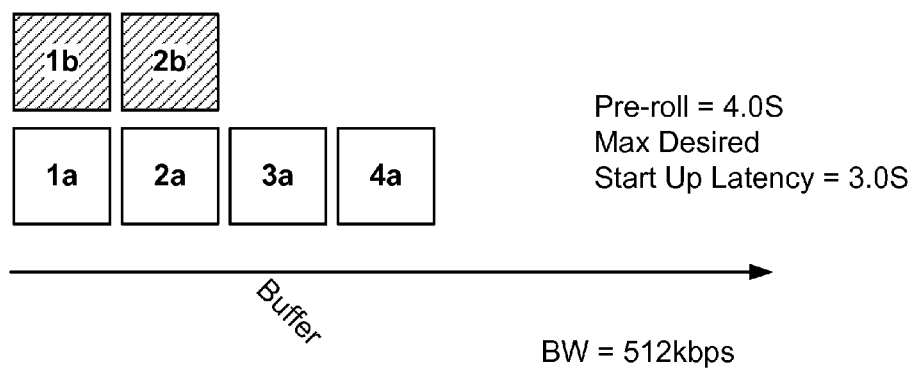

FIGS. 11A-11C illustrates a scenario in which the network bandwidth may be 512 Kbps at start up. In FIG. 11A, after two seconds elapses since starting download of the first layer, pre-roll of 4 seconds would have been downloaded and buffering-rule 1 is now satisfied. At this time, the buffering-rule 2 discussed above may not allow a layer to be downloaded in the first interval, and the download constraint, upswitch constraint, and adjacent layer number constraint allow layer 2b to be downloaded which completes at elapsed time of 2.5 seconds as illustrated in FIG. 11B. All the constraints are then satisfied for the enhanced layer 1*b* in the second interval and it completes downloading after an elapsed time of 3.0 seconds as illustrated in FIG. 11C. Playout starts at elapsed time of 3.0 seconds with a quality of 512 Kbps.

Figure 12A:
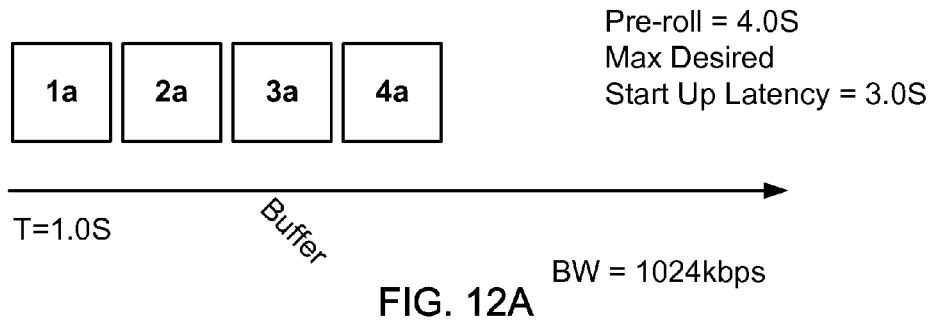
Figure 12B:
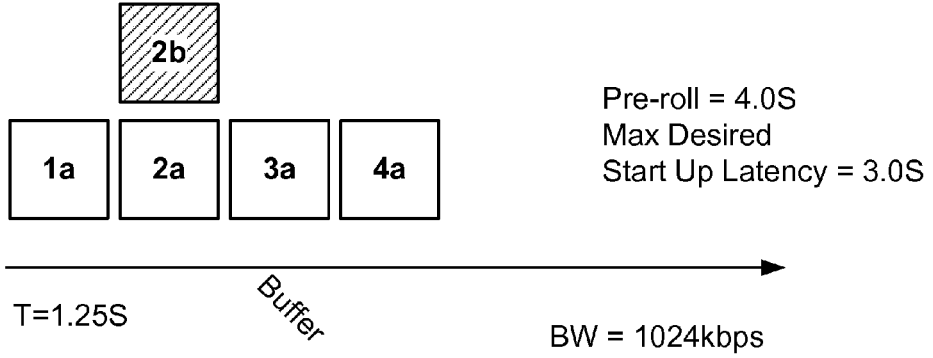
Figure 12C:
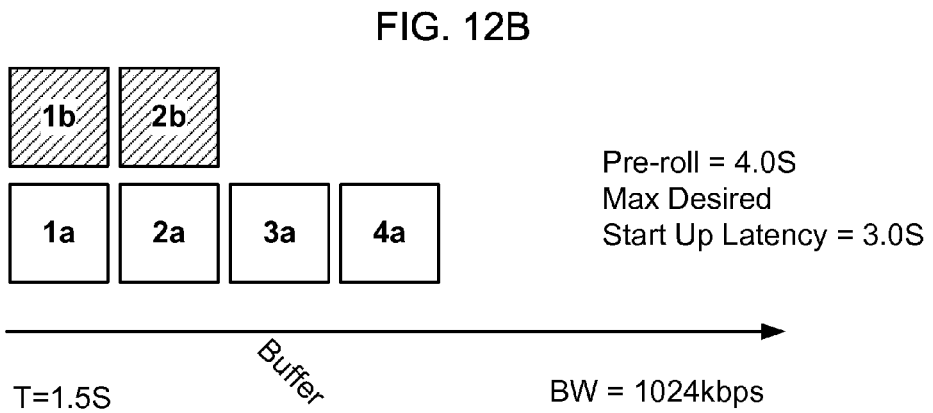
Figure 12D:
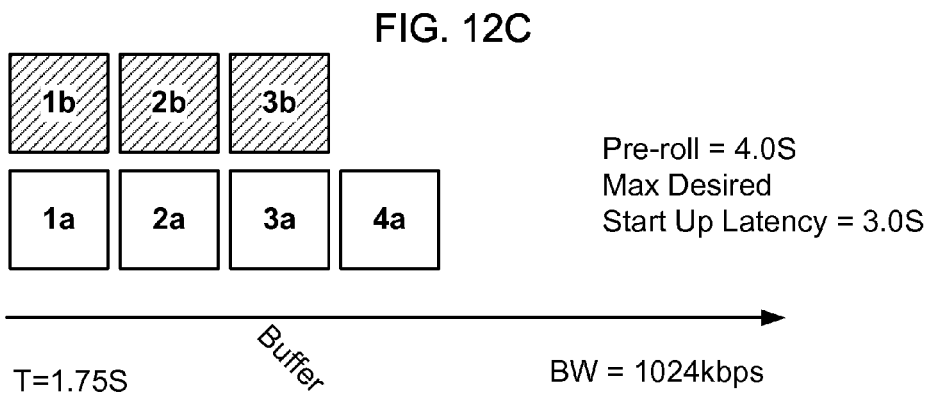
Figure 12E:
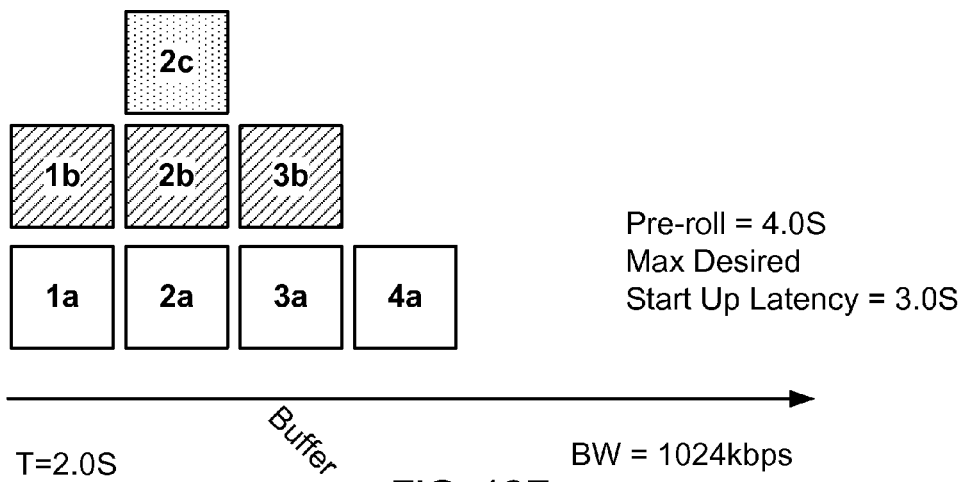
Figure 12F:
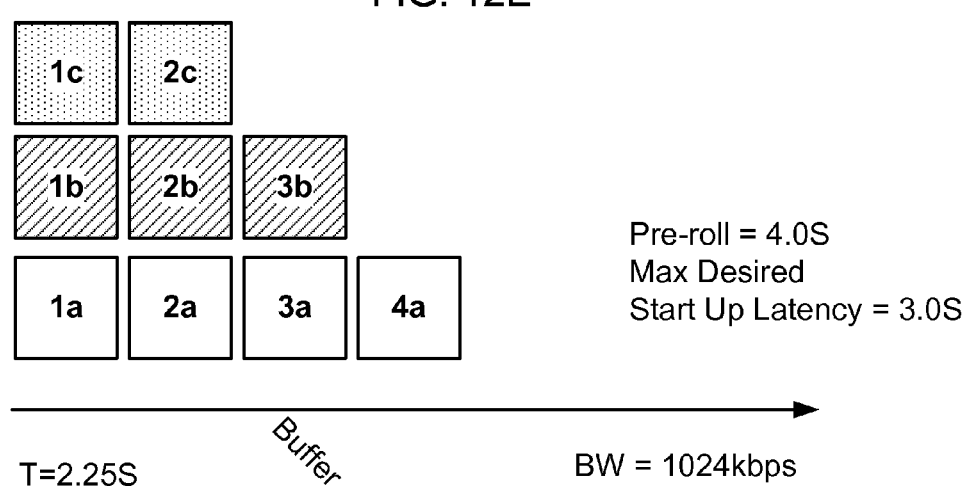
Figure 12G:
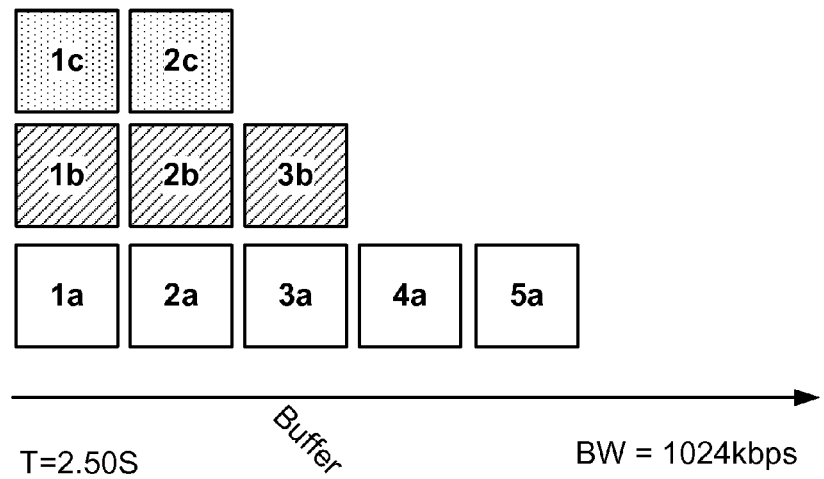
Figure 12H:
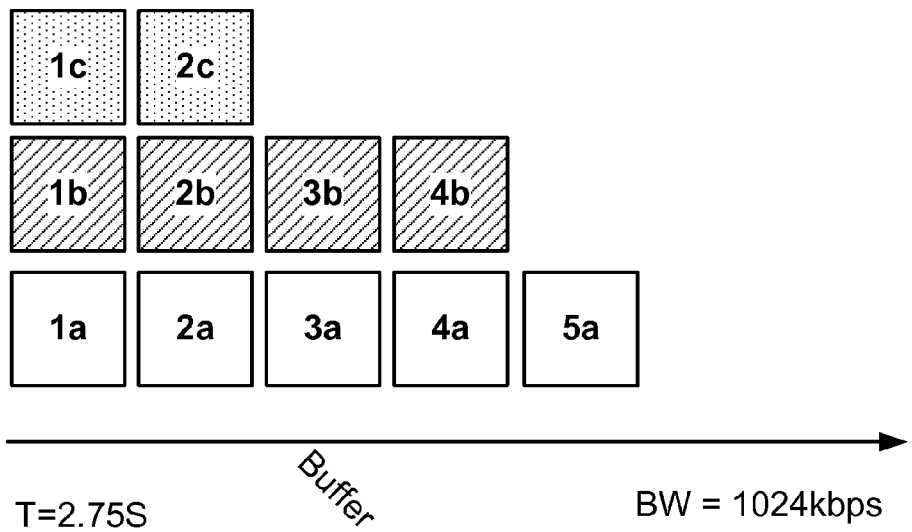
Figure 12I:
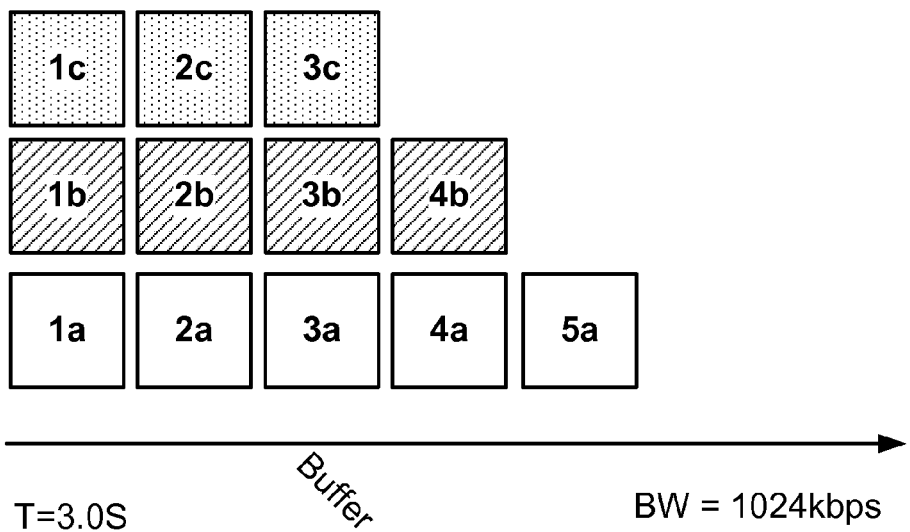

FIGS. 12A-12I illustrate a scenario in which the network bandwidth may be 1024 Kbps at start up. At an elapsed time of 1 second the buffering-rule 1 discussed above may be satisfied and pre-roll of 4.0 seconds may have been accumulated. At this time the download-constraint-while-buffering may be satisfied for both the buffering-rule 1 and buffering-rule 2 and all other constraints may be satisfied for downloading layer 2*b* which completes at elapsed time of 1.25 seconds as illustrated in FIG. 12B. Continuing similarly, as depicted in the illustrations, in FIG. 12C layer 1*b* completes downloading at elapsed time of 1.5 seconds, in FIG. 12D layer 3*b* completes downloading at elapsed time of 1.75 seconds, in FIG. 12E layer 2*c* completes downloading at elapsed time of 2.0 seconds, in FIG. 12F layer 1*c* completes downloading at elapsed time of 2.25 seconds, in FIG. 12G layer 5*a* completes downloading at elapsed time of 2.5 seconds, in FIG. 12H layer 4*b* completes downloading at elapsed time of 2.75 seconds, and in FIG. 12I layer 3*c* completes downloading at elapsed time of 3 seconds. Playout starts when elapsed time has reached 3 seconds with a quality associated with 756 Kbps at startup.

Figure 13:
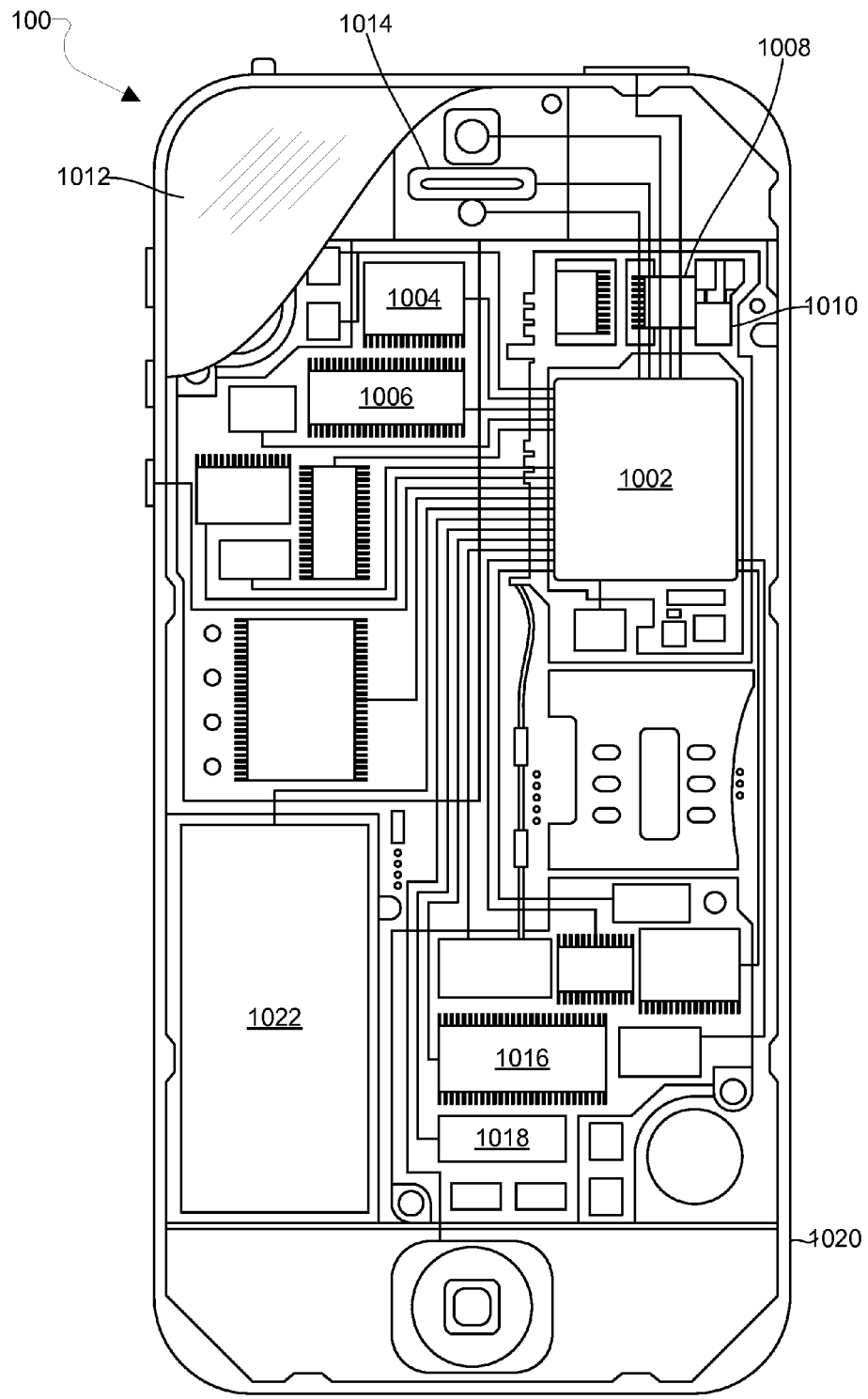
FIG. 13 is a component diagram of an example receiver device suitable for use with the various embodiments.

The various embodiments may be implemented in any of a variety of receiver devices, an example of which is illustrated in FIG. 13. For example, the mobile device 1000 may include a processor 1002 coupled to internal memories 1004 and 1006. Internal memories 1004 and 1006 may be volatile or nonvolatile memories, and may also be secure and/or encrypted memories, or unsecure and/or unencrypted memories, or any combination thereof. The processor 1002 may also be coupled to a touch screen display 1012, such as a resistive-sensing touch screen, capacitive-sensing touch screen infrared sensing touch screen, or the like. Additionally, the display of the receiver device 1000 need not have touch screen capability. The receiver device 1000 may have one or more radio signal transceivers 1008 (e.g., Peanut®, Bluetooth®, Zigbee®, Wi-Fi, RF radio) and antennae 1010, for sending and receiving, coupled to each other and/or to the processor 1002. The receiver device 1000 may include a cellular network interface, such as wireless modem chip 1016, that enables communication via a cellular data network (e.g., CDMA, TDMA, GSM, PCS, 3G, 4G, LTE, or any other type of cellular data network) and is coupled to the processor 1002. The receiver device 1000 may include a peripheral device connection interface 1018 coupled to the processor 1002. The peripheral device connection interface 1018 may be singularly configured to accept one type of connection, or multiply configured to accept various types of physical and communication connections, common or proprietary, such as USB, FireWire, Thunderbolt, or PCIe. The peripheral device connection interface 1018 may also be coupled to a similarly configured peripheral device connection port. The receiver device 1000 may also include speakers 1014 for providing audio outputs. The receiver device 1000 may also include a housing 1020, constructed of a plastic, metal, or a combination of materials, for containing all or some of the components discussed herein. The receiver device 1000 may include a power source 1022 coupled to the processor 1002, such as a disposable or rechargeable battery. The rechargeable battery may also be coupled to the peripheral device connection port to receive a charging current from a source external to the receiver device 1000.

Figure 14:
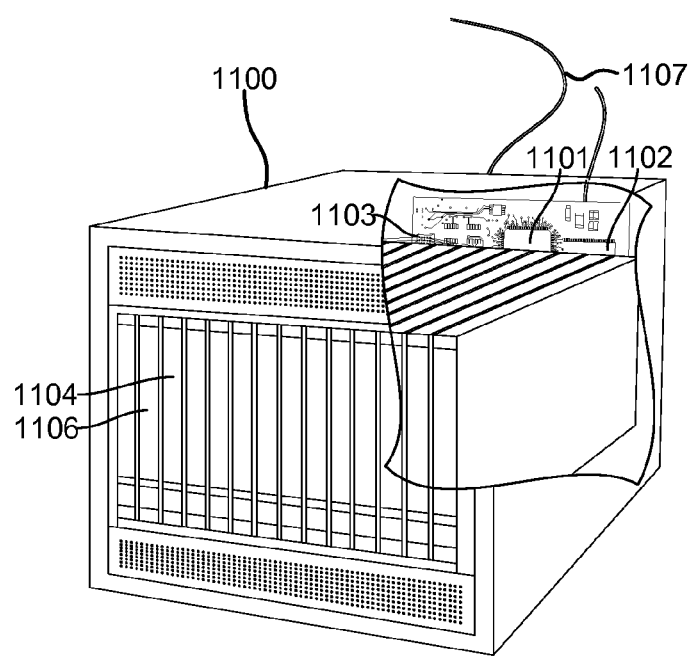
FIG. 14 is a component diagram of an example server suitable for use with the various embodiments.

The various embodiments may also be implemented on any of a variety of commercially available server devices, such as the server 1100 illustrated in FIG. 14. Such a server 1100 typically includes a processor 1101 coupled to volatile memory 1102 and a large capacity nonvolatile memory, such as a disk drive 1104. The server 1100 may also include a floppy disc drive, compact disc (CD) or DVD disc drive 1106 coupled to the processor 1101. The server 1100 may also include network access ports 1103 coupled to the processor 1101 for establishing network interface connections with a network 1107, such as a local area network coupled to other broadcast system computers and servers, the Internet, the public switched telephone network, and/or a cellular data network (e.g., CDMA, TDMA, GSM, PCS, 3G, 4G, LTE, or any other type of cellular data network).

The processors 1002 and 1101 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory 1004, 1006, 1102, 1104 before they are accessed and loaded into the processors 1002 and 1101. The processors 1002 and 1101 may include internal memory sufficient to store the application software instructions. In many devices the internal memory may be a volatile or nonvolatile memory, such as flash memory, or a mixture of both. For the purposes of this description, a general reference to memory refers to memory accessible by the processors 1002 and 1101 including internal memory or removable memory plugged into the device and memory within the processor 1002 and 1101 themselves.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable, server-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for downloading a layered media presentation in a client, comprising:
    determining whether downloading a next layer of a media interval of the layered media presentation will meet criteria including one or more of:
        an adjacent media segment layer number constraint, wherein the adjacent media segment layer number constraint requires that adding the next layer of the media interval of the layered media presentation does not result in a number of layers in the media interval of the layered media presentation being more than one interval greater than a number of layers in an adjacent media interval of the layered media presentation;
        an upswitch constraint, wherein the upswitch constraint requires that a total bandwidth of the media interval of the layered media presentation is not greater than an estimated bandwidth when adding the next layer of the media interval of the layered media presentation results in the number of layers in the media interval of the layered media presentation being higher than a number of layers in a preceding media interval of the layered media presentation; or
        a smoothing constraint, wherein the smoothing constraint requires that an aggregate bandwidth over a period of time exceed a threshold; and
    requesting the next layer of the media interval of the layered media presentation in response to determining that downloading the next layer of the media interval of the layered media presentation will meet the criteria.

2. A method for downloading a layered media presentation in a client, comprising:
    determining whether downloading a next layer of a media interval of the layered media presentation will meet criteria including one or more of:
        an adjacent media segment layer number constraint;
        an upswitch constraint; or
        a smoothing constraint;
    requesting the next layer of the media interval of the layered media presentation in response to determining that downloading the next layer of the media interval of the layered media presentation will meet the criteria;
    determining whether a first period of time after requesting the next layer of the media interval of the layered media presentation has passed in response to requesting the next layer of the media interval of the layered media presentation;
    determining whether downloading a next layer of an earlier in time media interval of the layered media presentation will meet the criteria in response to determining that the first period of time after requesting the next layer of the media interval of the layered media presentation has passed; and
    requesting the next layer of the earlier in time media interval of the layered media presentation in response to determining that downloading the next layer of the earlier in time media interval of the layered media presentation will meet the criteria.

3. The method of claim 2, wherein:
    the adjacent media segment layer number constraint is a requirement that adding the next layer of the media interval of the layered media presentation does not result in a number of layers in the media interval of the layered media presentation being more than an interval greater than a number of layers in an adjacent media interval of the layered media presentation;
    the upswitch constraint is a requirement that, when adding the next layer of the media interval of the layered media presentation results in the number of layers in the media interval of the layered media presentation being higher than a number of layers in a preceding media interval of the layered media presentation, a total bandwidth of the media interval of the layered media presentation is not greater than an estimated bandwidth; and
    the smoothing constraint is a requirement that an aggregate bandwidth over a second period of time exceeds a threshold.

4. The method of claim 3, wherein the criteria further includes one or more of:

a base layer constraint that is a requirement that at least one layer of the media interval of the layered media presentation is already downloaded; or a download time constraint that is a requirement that a play out time for the media interval of the layered media presentation is not earlier than a current play out time plus an estimated time of completion of downloading the next layer of the media interval of the layered media presentation.

5. The method of claim 4, further comprising:

requesting a layer for a next media interval for which no layers have yet been downloaded upon determining that downloading the next layer of the media interval of the layered media presentation will not meet the criteria.

6. The method of claim 5, wherein the client is a Dynamic Adaptive Streaming over HTTP (DASH) client and media intervals are DASH segments.

7. A receiver device, comprising:

a network interface; and a processor connected to the network interface, wherein the processor is configured with processor-executable instructions to perform operations comprising:

determining whether downloading a next layer of a media interval of a layered media presentation via the network interface will meet criteria including one or more of:

an adjacent media segment layer number constraint, wherein the adjacent media segment layer number constraint requires that adding the next layer of the media interval of the layered media presentation does not result in a number of layers in the media interval of the layered media presentation being more than one interval greater than a number of layers in an adjacent media interval of the layered media presentation;

an upswitch constraint, wherein the upswitch constraint requires that a total bandwidth of the media interval of the layered media presentation is not greater than an estimated bandwidth when adding the next layer of the media interval of the layered media presentation results in the number of layers in the media interval of the layered media presentation being higher than a number of layers in a preceding media interval of the layered media presentation; or a smoothing constraint, wherein the smoothing constraint requires that an aggregate bandwidth over a period of time exceed a threshold; and requesting the next layer of the media interval of the layered media presentation via the network interface in response to determining that downloading the next layer of the media interval of the layered media presentation via the network interface will meet the criteria.

8. A receiver comprising:

a network interface; and a processor connected to the network interface, wherein the processor is configured with processor-executable instructions to perform operations further comprising:

determining whether downloading a next layer of a media interval of a layered media presentation via the network interface will meet criteria including one or more of:

an adjacent media segment layer number constraint;
an upswitch constraint; or
a smoothing constraint;

requesting the next layer of the media interval of the layered media presentation via the network interface in response to determining that downloading the next layer of the media interval of the layered media presentation via the network interface will meet the criteria;

determining whether a first period of time after requesting the next layer of the media interval of the layered media presentation has passed in response to requesting the next layer of the media interval of the layered media presentation via the network interface;

determining whether downloading a next layer of an earlier in time media interval of the layered media presentation via the network interface will meet the criteria in response to determining that the first period of time after requesting the next layer of the media interval of the layered media presentation has passed; and requesting the next layer of the earlier in time media interval of the layered media presentation via the network interface in response to determining that downloading the next layer of the earlier in time media interval of the layered media presentation via the network interface will meet the criteria.

9. The receiver device of claim 8, wherein:

the adjacent media segment layer number constraint is a requirement that adding the next layer of the media interval of the layered media presentation does not result in a number of layers in the media interval of the layered media presentation being more than an interval greater than a number of layers in an adjacent media interval of the layered media presentation;

the upswitch constraint is a requirement that, when adding the next layer of the media interval of the layered media presentation results in the number of layers in the media interval of the layered media presentation being higher than a number of layers in a preceding media interval of the layered media presentation, a total bandwidth of the media interval of the layered media presentation is not greater than an estimated bandwidth; and the smoothing constraint is a requirement that an aggregate bandwidth over a second period of time exceeds a threshold.

10. The receiver device of claim 9, wherein the processor is configured with processor-executable instructions to perform operations such that the criteria further includes one or more of:

a base layer constraint that is a requirement that at least one layer of the media interval of the layered media presentation is already downloaded; or a download time constraint that is a requirement that a play out time for the media interval of the layered media presentation is not earlier than a current play out time plus an estimated time of completion of downloading the next layer of the media interval of the layered media presentation via the network interface.

11. The receiver device of claim 10, wherein the processor is configured with processor-executable instructions to perform operations further comprising:

requesting a layer for a next media interval for which no layers have yet been downloaded upon determining that downloading the next layer of the media interval of the layered media presentation via the network interface will not meet the criteria.

12. The receiver device of claim 11, wherein media intervals are DASH segments downloaded to a Dynamic Adaptive Streaming over HTTP (DASH) client.

13. A non-transitory processor-readable medium having stored thereon processor-executable instructions configured to cause a receiver device processor to perform operations comprising:
- determining whether downloading a next layer of a media interval of a layered media presentation will meet criteria including one or more of:
  - an adjacent media segment layer number constraint, wherein the adjacent media segment layer number constraint requires that adding the next layer of the media interval of the layered media presentation does not result in a number of layers in the media interval of the layered media presentation being more than one interval greater than a number of layers in an adjacent media interval of the layered media presentation;
  - an upswitch constraint, wherein the upswitch constraint requires that a total bandwidth of the media interval of the layered media presentation is not greater than an estimated bandwidth when adding the next layer of the media interval of the layered media presentation results in the number of layers in the media interval of the layered media presentation being higher than a number of layers in a preceding media interval of the layered media presentation; or
  - a smoothing constraint, wherein the smoothing constraint requires that an aggregate bandwidth over a period of time exceed a threshold; and
- requesting the next layer of the media interval of the layered media presentation in response to determining that downloading the next layer of the media interval of the layered media presentation will meet the criteria.

14. A non-transitory processor-readable medium stored thereon processor-executable instructions configured to cause a receiver device processor to perform operations comprising:
- determining whether downloading a next layer of a media interval of a layered media presentation will meet criteria including one or more of:
  - an adjacent media segment layer number constraint;
  - an upswitch constraint; or
  - a smoothing constraint;
- requesting the next layer of the media interval of the layered media presentation in response to determining that downloading the next layer of the media interval of the layered media presentation will meet the criteria;
- determining whether a first period of time after requesting the next layer of the media interval of the layered media presentation has passed in response to requesting the next layer of the media interval of the layered media presentation;
- determining whether downloading a next layer of an earlier in time media interval of the layered media presentation will meet the criteria in response to determining that the first period of time after requesting the next layer of the media interval of the layered media presentation has passed; and
- requesting the next layer of the earlier in time media interval of the layered media presentation in response to determining that downloading the next layer of the earlier in time media interval of the layered media presentation will meet the criteria.

15. The non-transitory processor-readable medium of claim 14, wherein the stored processor-executable instructions are configured to cause a receiver device processor to perform operations such that:
- the adjacent media segment layer number constraint is a requirement that adding the next layer of the media interval of the layered media presentation does not result in a number of layers in the media interval of the layered media presentation being more than an interval greater than a number of layers in an adjacent media interval of the layered media presentation;
- the upswitch constraint is a requirement that, when adding the next layer of the media interval of the layered media presentation results in the number of layers in the media interval of the layered media presentation being higher than a number of layers in a preceding media interval of the layered media presentation, a total bandwidth of the media interval of the layered media presentation is not greater than an estimated bandwidth; and
- the smoothing constraint is a requirement that an aggregate bandwidth over a second period of time exceeds a threshold.

16. The non-transitory processor-readable medium of claim 15, wherein the stored processor-executable instructions are configured to cause a receiver device processor to perform operations such that the criteria further includes one or more of:
- a base layer constraint that is a requirement that at least one layer of the media interval of the layered media presentation is already downloaded; or
- a download time constraint that is a requirement that a play out time for the media interval of the layered media presentation is not earlier than a current play out time plus an estimated time of completion of downloading the next layer of the media interval of the layered media presentation.

17. The non-transitory processor-readable medium of claim 16, wherein the stored processor-executable instructions are configured to cause a receiver device processor to perform operations further comprising:
- requesting a layer for a next media interval for which no layers have yet been downloaded upon determining that downloading the next layer of the media interval of the layered media presentation will not meet the criteria.

18. The non-transitory processor-readable medium of claim 17, wherein the stored processor-executable instructions are configured to cause a receiver device processor to perform operations such that media intervals are DASH segments downloaded to a Dynamic Adaptive Streaming over HTTP (DASH) client.

* * * * *